(12) United States Patent
Benster et al.

(10) Patent No.: US 12,469,488 B2
(45) Date of Patent: *Nov. 11, 2025

(54) METHODS FOR NON-AUDIBLE SPEECH DETECTION

(71) Applicant: Reflex Technologies, Inc., San Francisco, CA (US)

(72) Inventors: Tyler Stephen Benster, San Francisco, CA (US); Reshef Haim Elisha, Redwood City, CA (US); Guy Halleck Wilson, San Francisco, CA (US); Kaveh Moussakhani, San Francisco, CA (US)

(73) Assignee: REFLEX TECHNOLOGIES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,882

(22) Filed: Jul. 9, 2024

(65) Prior Publication Data

US 2025/0140258 A1      May 1, 2025

Related U.S. Application Data

(60) Provisional application No. 63/594,367, filed on Oct. 30, 2023, provisional application No. 63/611,031, (Continued)

(51) Int. Cl.
  *G10L 15/16*      (2006.01)
  *G01S 13/50*      (2006.01)
  (Continued)

(52) U.S. Cl.
  CPC .............. *G10L 15/16* (2013.01); *G01S 13/50* (2013.01); *G01S 13/89* (2013.01); *G06F 3/012* (2013.01);
  (Continued)

(58) Field of Classification Search
  CPC ............ G10L 15/25; G01S 13/50; G06F 40/58
  See application file for complete search history.

(56) References Cited

U.S. PATENT DOCUMENTS 4,343,969 A * 8/1982 Kellett ................... G10L 15/00
                                                            704/254
4,388,723 A * 6/1983 Keen ...................... H04K 3/827
                                                            375/136

(Continued)

FOREIGN PATENT DOCUMENTS

CA       2923979 A1    3/2014
CA       2942852 A1    9/2014
  (Continued)

OTHER PUBLICATIONS

Wagner, C., Schaffer, P., Amini Digehsara, P. et al. Silent speech command word recognition using stepped frequency continuous wave radar. Sci Rep 12, 4192 (2022). https://doi.org/10.1038/s41598-022-07842-9 (Year: 2022).*

(Continued)

*Primary Examiner* — Fariba Sirjani
(74) *Attorney, Agent, or Firm* — WILSON SONSINI GOODRICH & ROSATI

(57) ABSTRACT

Provided herein is a method for non-audible speech detection and output. The method comprises providing a radio frequency (RF) sensing device configured to be coupled to a head of a user. The method further comprises using the RF sensing device to collect RF signal data associated with movement of one or more speech articulators of the user. The method further comprises outputting or facilitating an output comprising a non-audible speech translation using at least in part processed RF signal data, wherein the non-audible speech of the user comprises continuous speech by the user.

28 Claims, 42 Drawing Sheets

Related U.S. Application Data filed on Dec. 15, 2023, provisional application No. 63/640,814, filed on Apr. 30, 2024.

(51) Int. Cl.
   *G01S 13/89*    (2006.01)
   *G06F 3/01*     (2006.01)
   *G06F 40/58*    (2020.01)
   *G10L 15/18*    (2013.01)
   *G10L 15/22*    (2006.01)
   *G10L 15/25*    (2013.01)
   *G10L 25/75*    (2013.01)

(52) U.S. Cl.
   CPC .............. *G06F 3/013* (2013.01); *G06F 40/58* (2020.01); *G10L 15/1815* (2013.01); *G10L 15/22* (2013.01); *G10L 15/25* (2013.01); *G10L 25/75* (2013.01); *G10L 2015/227* (2013.01)

(56) References Cited

U.S. PATENT DOCUMENTS

| | | | |
|---|---|---|---|
| 4,841,575 A | 6/1989 | Welsh et al. | |
| 5,729,694 A * | 3/1998 | Holzrichter | G06Q 20/204 704/E15.041 |
| 6,006,175 A * | 12/1999 | Holzrichter | G06V 40/10 704/E15.041 |
| 6,404,386 B1 * | 6/2002 | Proctor, Jr. | H01Q 3/2605 342/368 |
| 6,464,386 B1 | 10/2002 | Oota et al. | |
| 6,675,027 B1 | 1/2004 | Huang | |
| 8,498,435 B2 | 7/2013 | Yamada et al. | |
| 8,644,534 B2 | 2/2014 | Yamada et al. | |
| 8,682,012 B2 | 3/2014 | Yamada et al. | |
| 8,942,383 B2 | 1/2015 | Petit et al. | |
| 9,013,264 B2 | 4/2015 | Parshionikar et al. | |
| 9,064,501 B2 | 6/2015 | Yamada et al. | |
| 9,432,778 B2 | 8/2016 | Ma | |
| 9,767,795 B2 | 9/2017 | Konuma et al. | |
| 9,865,255 B2 | 1/2018 | Nomura | |
| 10,205,814 B2 | 2/2019 | Boesen et al. | |
| 10,277,382 B2 | 4/2019 | Eltawil et al. | |
| 10,283,120 B2 | 5/2019 | Gilbert et al. | |
| 10,446,151 B2 | 10/2019 | Nomura | |
| 10,559,145 B1 | 2/2020 | Almehmadi | |
| 10,579,742 B1 | 3/2020 | Fernandez | |
| 10,621,973 B1 | 4/2020 | McVicker et al. | |
| 10,789,951 B2 | 9/2020 | Ushio et al. | |
| 11,580,978 B2 | 2/2023 | Volovich et al. | |
| 11,709,548 B2 | 7/2023 | Tadi et al. | |
| 11,842,736 B2 | 12/2023 | Volovich et al. | |
| 11,908,478 B2 | 2/2024 | Maizels et al. | |
| 11,953,583 B2 | 4/2024 | Laabs et al. | |
| 12,198,698 B1 * | 1/2025 | Benster | G10L 21/02 |
| 2001/0021905 A1 * | 9/2001 | Burnett | G10L 13/04 704/E15.041 |
| 2002/0033803 A1 * | 3/2002 | Holzrichter | G06F 3/012 345/158 |
| 2002/0198690 A1 * | 12/2002 | Holzrichter | G01H 9/00 703/2 |
| 2003/0097254 A1 * | 5/2003 | Holzrichter | G10L 19/00 704/201 |
| 2005/0244020 A1 * | 11/2005 | Nakajima | G10L 21/06 704/E15.041 |
| 2010/0195812 A1 | 8/2010 | Florencio et al. | |
| 2011/0152965 A1 | 6/2011 | Mashiach et al. | |
| 2012/0053931 A1 * | 3/2012 | Holzrichter | H04R 3/002 704/E19.001 |
| 2012/0212380 A1 | 8/2012 | Theobold et al. | |
| 2012/0290950 A1 | 11/2012 | Rapaport et al. | |
| 2013/0211270 A1 | 8/2013 | St. Laurent et al. | |
| 2014/0119548 A1 | 5/2014 | Kechichian et al. | |
| 2015/0086052 A1 | 3/2015 | Park et al. | |
| 2015/0313496 A1 | 11/2015 | Connor et al. | |
| 2016/0226620 A1 * | 8/2016 | Zinser | H04K 3/228 |
| 2017/0061034 A1 | 3/2017 | Ritchey et al. | |
| 2017/0092259 A1 | 3/2017 | Jeon | |
| 2017/0131768 A1 | 5/2017 | Budavari et al. | |
| 2017/0135598 A1 | 5/2017 | Weinstein et al. | |
| 2017/0171261 A1 | 6/2017 | Smus | |
| 2017/0229763 A1 | 8/2017 | Barak | |
| 2017/0249942 A1 | 8/2017 | Gilbert et al. | |
| 2017/0263237 A1 * | 9/2017 | Green | G10L 13/04 |
| 2017/0323485 A1 | 11/2017 | Samec et al. | |
| 2018/0046851 A1 | 2/2018 | Kienzle et al. | |
| 2018/0239956 A1 | 8/2018 | Tadi et al. | |
| 2018/0366120 A1 | 12/2018 | Ushio et al. | |
| 2019/0034038 A1 | 1/2019 | Rudchenko et al. | |
| 2019/0074012 A1 | 3/2019 | Kapur et al. | |
| 2019/0348025 A1 | 11/2019 | Berenzweig et al. | |
| 2019/0348027 A1 | 11/2019 | Berenzweig et al. | |
| 2020/0014096 A1 * | 1/2020 | Chou | H01Q 21/0025 |
| 2020/0126557 A1 | 4/2020 | Lee et al. | |
| 2020/0258535 A1 * | 8/2020 | Vatanparvar | A61B 5/4803 |
| 2021/0124422 A1 | 4/2021 | Forsland | |
| 2021/0183383 A1 * | 6/2021 | Volovich | H04R 1/1016 |
| 2021/0223377 A1 | 7/2021 | Kasser | |
| 2021/0270953 A1 | 9/2021 | Laabs et al. | |
| 2021/0327431 A1 | 10/2021 | Stewart et al. | |
| 2022/0084522 A1 | 3/2022 | Im et al. | |
| 2022/0137702 A1 | 5/2022 | Min et al. | |
| 2022/0160296 A1 | 5/2022 | Rahmani et al. | |
| 2022/0208173 A1 | 6/2022 | Chang et al. | |
| 2022/0208194 A1 | 6/2022 | Rameau et al. | |
| 2023/0023321 A1 | 1/2023 | Harada et al. | |
| 2023/0059691 A1 * | 2/2023 | Kennedy | G06F 3/015 |
| 2023/0072423 A1 | 3/2023 | Osborn et al. | |
| 2023/0077010 A1 * | 3/2023 | Zhang | G06V 40/171 |
| 2023/0078978 A1 | 3/2023 | Tadi et al. | |
| 2023/0090763 A1 * | 3/2023 | Ozturk | H04W 4/027 455/456.1 |
| 2023/0130770 A1 | 4/2023 | Miller et al. | |
| 2023/0154450 A1 * | 5/2023 | Murai Von Bünau | G10L 21/00 704/259 |
| 2023/0157757 A1 | 5/2023 | Braido et al. | |
| 2023/0157762 A1 | 5/2023 | Braido et al. | |
| 2023/0186917 A1 | 6/2023 | Volovich et al. | |
| 2023/0267914 A1 | 8/2023 | Maizels et al. | |
| 2023/0412236 A1 * | 12/2023 | Kalantari | H04B 7/088 |
| 2024/0070251 A1 | 2/2024 | Maizels et al. | |
| 2024/0082032 A1 * | 3/2024 | Sebkhi | A61B 5/682 |
| 2024/0187772 A1 * | 6/2024 | Stankovic | H04R 1/1041 |
| 2024/0220016 A1 | 7/2024 | Garg et al. | |
| 2024/0220811 A1 | 7/2024 | Garg et al. | |
| 2024/0221718 A1 | 7/2024 | Kothari et al. | |
| 2024/0221719 A1 | 7/2024 | Kothari et al. | |
| 2024/0221738 A1 | 7/2024 | Garg et al. | |
| 2024/0221741 A1 | 7/2024 | Kothari et al. | |
| 2024/0221751 A1 | 7/2024 | Garg et al. | |
| 2024/0221753 A1 | 7/2024 | Garg et al. | |
| 2024/0221762 A1 | 7/2024 | Garg et al. | |
| 2024/0223507 A1 | 7/2024 | Han et al. | |
| 2024/0296833 A1 | 9/2024 | Garg et al. | |
| 2025/0140241 A1 | 5/2025 | Benster et al. | |

FOREIGN PATENT DOCUMENTS

| | | |
|---|---|---|
| CA | 2998687 A1 | 5/2018 |
| CA | 3164001 A1 | 7/2021 |
| CA | 2942852 C | 3/2023 |
| CA | 2957766 C | 10/2023 |
| CN | 101902960 | 12/2010 |
| CN | 112424859 A | 2/2021 |
| CN | 114730391 A | 7/2022 |
| DE | 102020110901 A1 | 10/2021 |
| DE | 102022115032 A1 | 12/2023 |
| KR | 102662981 | 5/2024 |
| WO | WO-2014045243 | 3/2014 |
| WO | WO-2014130571 A1 | 8/2014 |
| WO | WO-2017223095 A1 | 12/2017 |
| WO | WO-2018232414 A1 | 12/2018 |
| WO | WO-2019040669 | 2/2019 |

(56) References Cited

FOREIGN PATENT DOCUMENTS

| | | |
|---|---|---|
| WO | WO-2021163138 | 8/2021 |
| WO | WO-2021214065 A1 | 10/2021 |
| WO | WO-2021231900 | 11/2021 |
| WO | WO-2022020968 | 2/2022 |
| WO | WO-2022245833 | 11/2022 |
| WO | WO-2023084366 | 5/2023 |
| WO | WO-2023242282 A1 | 12/2023 |
| WO | WO-2023242283 A1 | 12/2023 |
| WO | WO-2023242292 A1 | 12/2023 |
| WO | WO-2024018400 A2 | 1/2024 |
| WO | WO-2024073803 | 4/2024 |
| WO | WO-2024148141 A1 | 7/2024 |
| WO | WO-2025012073 A1 | 1/2025 |
| WO | WO-2025096357 A1 | 5/2025 |

OTHER PUBLICATIONS

Shin, Y. H. & Seo, J. Towards contactless silent speech recognition based on detection of active and visible articulators using IRUWB radar. Sensors 16, 1812. https://doi.org/10.3390/s16111812 (2016) (Year: 2016).*

Laabs translation (Year: 2023).*

Laabs in German (Year: 2023).*

Diener, Lorenz, et al. An Initial Investigation into the Real-Time Conversion fo Facial Surface EMG Signals to Audible Speech. 38th Annual International Conference of the IEEE Engineering in Medicine and Biological Society, 1-4 (2016).

Gaddy, David Marshall. Voicing Silent Speech. Dissertation, University of California, 1-72 (2022).

Maier-Hein, Lena. Speech Recognition Using Surface Electromyography. Thesis, University of Karlsruhe, 1-127 (2005).

PCT/US2024/010268 International Search Report and Written Opinion dated Jul. 11, 2024.

Screen captures from YouTube video clip entitled CBS News 60 Minutes: Making ideas into reality at MIT's "Future Factory". Uploaded on May 4, 2018, by user Innovation Radar: pp. 1-3. Retrieved from Internet: https://www.youtube.com/watch?v=3Un7yI6KmUM Aug. 14, 2024.

Bentley, Jon, et al. The Continuing Evolution of Radar, From Rotating Dish to Digital Beamforming. Microwave Journal, Article 38830, 1-7 (2022).

Betts, Bradley J., et al. Small-vocabulary speech recognition using surface electromyography. Interacting with Computers, vol. 18, 1242-1259 (2006).

Birkholz, Peter, et al. Non-Invasive Silent Phoneme Recognition Using Microwave Signals. IEEE/ACM Transactions on Audio Speech and Language Processing, vol. 26, 2404-2411 (2018).

Csapo, Tamás Gábo, et al. DNN-Based Ultrasound-to-Speech Conversion for a Silent Speech Interface. In Proceedings of 18th Annual Conference of the International Speech Communication Association (Interspeech), 3672-3676 (2017).

Denby, B., et al. Silent speech interfaces. Speech Communication, vol. 52, 270-287 (2010).

Digehsara, Pouriya Amini, et al. On the Optimal Set of Features and the Robustness of Classifiers in Radar-based Silent Phoneme Recognition. University of Dresden, 112-119 (2021).

Eid, Ahmed M., et al. Ultrawideband Speech Sensing. IEEE Antennas and Wireless Propagation Letters, vol. 8, 1414-1417 (2009).

Fagan, M.J., et al. Development of a (silent) speech recognition system for patients following laryngectomy. Medical Engineering & Physics, vol. 30, 419-425 (2008).

Geiger, Martin, et al. Improved Throat Vibration Sensing with a Flexible 160-GHz Radar through Harmonic Generation. In Proceedings of IEEE/MTT-S International Microwave Symposium (IMS), 123-126 (2018).

Gilbert, J.M., et al. Isolated word recognition of silent speech using magnetic implants and sensors. Medical Engineering & Physics, vol. 32, 1189-1197 (2010).

Gonzalez, Jose A., et al. A Silent Speech System based on Permanent Magnet Articulography and Direct Synthesis. Computer Speech & Language, vol. 39, 67-87 (2016).

Gonzalez-Lopez, Jose Luis, et al. Silent Speech Interfaces for Speech Restoration: A Review. IEEE Access, vol. 8, 77995-178021 (2020).

Hofe, Robin, et al. Small-vocabulary Speech recognition using a silent speech interface based on magnetic sensing. Speech Communication, vol. 55, 22-32 (2013).

Holzrichter, J.F, et al. Speech articulator measurements using low power EM-wave sensors. The Journal of the Acoustical Society of America, vol. 103, 622-625 (1998).

Hueber, Thomas, et al. Development of a silent speech interface driven by ultrasound and optical images of the tongue and lips. Speech Communication, vol. 52, 288-300 (2010).

Kim, Myungjong, et al. Speaker-Independent Silent Speech Recognition from Flesh-Point Articulatory Movements Using an LSTM Neural Network. IEEE/ACM Trans Audio, Speech, and Language Processing, vol. 25, 2323-2336 (2017).

Lee, Ki-Seung. EMG-Based Speech Recognition Using Hidden Markov Models With Global Control Variables. IEEE Transactions on Biomedical Engineering, vol. 55, 930-940 (2008).

Li, Richard, et al. TongueBoard: An Oral Interface for Subtle Input. The 10th Augmented Human International Conference, 1-9 (2019).

Mehrotra, Parikha, et al. EM-Wave Biosensors: A Review of RF, Microwave, mm-Wave and Optical Sensing, vol. 19, 1-46 (2019).

Meltzner, Geoffrey S., et al. Development of sEMG sensors and algorithms for silent speech recognition. Journal of Neural Engineering, vol. 15, 1-23 (2018).

Meltzner, Geoffrey S., et al. Silent Speech Recognition as an Alternative Communication Device for Persons With Laryngectomy. IEEE/ACM Transactions on Audio, Speech, and Language Processing, vol. 25, 2386-2398 (2017).

Schultz, Tanja, et al. Biosignal-Based Spoken Communication: A Survey. IEEE/ACM Transactions on Audio, Speech, and Language Processing, vol. 25, 2257-2271 (2017).

Sharif, Khairul Khaizi Mohd, et al. Silent Speech Interface using Continuous-Wave Radar and Optimized AlexNet. IEEE Symposium on Wireless Technology & Applications (ISWTA), 1-6 (2022).

Shillingford, Brendan, et al. Large-Scale Visual Speech Recognition, retrieved at: https://arxiv.org/abs/1807.05162, 1-21 (2018).

Shin, Young Hoon, et al. Towards Contactless Silent Speech Recognition Based on Detection of Active and Visible Articulators Using IR-UWB Radar. Sensors, vol. 16, 1-19 (2016).

Stone, Simon, et al. Cross-Speaker Silent-Speech Command Word Recognition Using Electro-Optical Stomatography, IEEE International Conference on Acoustics, Speech and Signal Processing (ICASSP), 7849-7853 (2020).

Stone, Simon, et al. Silent-Speech Command Word Recognition using Electro-Optical Stomatography. In Proceedings of 17th Annual Conference of the International Speech Communication Association (Interspeech), 2350-2351 (2016).

Toth, Arthur R, et al. Synthesizing Speech From Doppler Signals. In Proceedings of 35th IEEE International Conference on Acoustics, Speech and Signal Processing (ICASSP), 4638-4641 (2010).

Wagner, Christoph, et al. Evaluation of a non-personalized optopalatographic device for prospective use in functional poststroke dysphagia therapy. Journal of IEEE Transactions on Biomedical Engineering, vol. 69, 356-365 (2022).

Wagner, Christoph. et al. Silent speech command word recognition using stepped frequency continuous wave radar. Scientific reports 12(1):4192, 1-12 (2022).

Wand, Michael, et al. Lipreading With Long Short-Term Memory. Proceedings of 41st IEEE International Conference on Acoustics, Speech and Signal Processing (ICASSP), 1-5 (2016).

Wand, Michael, et al. Towards Real-life Application of EMG-based Speech Recognition by using Unsupervised Adaptation. In Proceedings of 15th Annual Conference of the International Speech Communication Association (Interspeech), 1189-1193 (2014).

Wang, Jun, et al. An Optimal Set of Flesh Points on Tongue and Lips for Speech-Movement Classification. Journal of Speech, Language, and Hearing Research, vol. 59, 15-26 (2016).

(56) References Cited

OTHER PUBLICATIONS

Wang, Jun, et al. Articulatory Distinctiveness of Vowels and Consonants: A Data-Driven Approach. Journal of Speech, Language, and Hearing Research, vol. 56, 1539-1551 (2013).
Wang, Youhua, et al. All-weather, natural silent speech recognition via machine-learning-assisted tattoo-like electronics. Nature Partner Journals, Flexible Electronics, vol. 5, 1-9 (2021).
Wen, Li, et al. Silent Speech Recognition based on Short-range Millimeter-Wave Sensing. In Proceedings of IEEE/ MTT-S International Microwave Symposium (IMS), 779-782 (2020).
Wrench, Alan A., et al. Continuous Speech Recognition Using Articulatory Data. Sixth International Conference on Spoken Language Processing, ICSLP, 1-4 (2000).
Zin, Syatirah Mat., et al. The technology of tongue and hard palate contact detection: a review. BioMedical Engineering OnLine, vol. 20, 1-19 (2021).
Menezes, J. et al. Exploring Antenna Placement Configurations with a Radar-based Silent Speech Interface. ICASSP 2025—2025 IEEE International Conference on Acoustics, Speech and Signal Processing (ICASSP), Hyderabad, India. Available at https://ieeexplore.ieee.org/abstract/document/10890284 (pp. 1-5) (2025).
Menezes, J. et al. Non-invasive Speaker-dependent Continuous Phoneme Recognition with a Radar-based Silent Speech Interface. ICASSP 2025—2025 IEEE International Conference on Acoustics, Speech and Signal Processing (ICASSP), Hyderabad, India, Available at https://ieeexplore.ieee.org/abstract/document/10887719 (pp. 1-5) (2025).
PCT/US2024/053289 International Invitation to Pay Additional Fees dated Jan. 2, 2025.
PCT/US2024/053289 International Search Report and Written Opinion dated Feb. 21, 2025.
U.S. Appl. No. 18/767,896 Office Action dated Dec. 12, 2024.
Benster, Tyler et al. A Cross-Modal Approach to Silent Speech with LLM-Enhanced Recognition. arXiv:2403.05583 [cs.HC]. Available at https://doi.org/10.48550/arXiv.2403.05583 (pp. 1-15) (2024).
Lee, Sunghwa et al. Word Error Rate Comparison between Single and Double Radar Solutions for Silent Speech Recognition. 2019 19th International Conference On Control, Automation And Systems (Iccas), Institute Of Control, Robotics And Systems. ICROS 2019. ICC Jeju, Jeju, Korea (Oct. 15, 2019).
Milne, Stefan et al. AI headphones let wearer listen to a single person in a crowd, by looking at them just once. UW News Available at https://www.washington.edu/news/2024/05/23/ai-headphones-noise-cancelling-target-speech-hearing/ (May 23, 2024).
Samra, Chris on X (@crsamra). Introducing MAMO. https://x.com/crsamra/status/1805754278432456976 (last edit Jun. 25, 2024).
Co-pending U.S. Appl. No. 18/767,896, inventors Benster; Tyler Stephen et al., filed Jul. 9, 2024.
Co-pending U.S. Appl. No. 18/767,905, inventors Benster; Tyler Stephen et al., filed Jul. 9, 2024.
U.S. Appl. No. 18/767,896 Office Action dated Sep. 27, 2024.
U.S. Appl. No. 18/767,905 Office Action dated Sep. 20, 2024.
Cherukuri, Akhila Sai Sree et al. Microwave-based dielectric properties as an electrophysiological biomarker: Future perspectives. Electronics 12(15):3276 (2023).
Chowdhury, Adiba Tabassum et al. Decoding silent speech: a machine learning perspective on data, methods, and frameworks. Neural Computing and Applications 37(10):6995-7013 (2025).
Huang, Yuanhui et al. Blood vessel imaging using radiofrequency-induced second harmonic acoustic response. Scientific reports 8(1):15522 (2018).
Igarashi, Yuya et al. Silent Speech Eyewear Interface: Silent Speech Recognition Method Using Eyewear and an Ear-Mounted Microphone with Infrared Distance Sensors. Sensors 24(22):7368 (2024).
Origlia, Cristina et al. Review of microwave near-field sensing and imaging devices in medical applications. Sensors 24(14):4515 (2024).
Ravenscroft, Dafydd et al. Machine learning methods for automatic silent speech recognition using a wearable graphene strain gauge sensor. Sensors 22(1):299 (2021).
U.S. Appl. No. 18/767,896 Office Action dated Apr. 9, 2025.
Yilmaz, Tuba et al. Radio-frequency and microwave techniques for non-invasive measurement of blood glucose levels. Diagnostics 9(1):6 (2019).
Zeng, Shang et al. mSilent: Towards general corpus silent speech recognition using COTS mmWave radar. Proceedings of the ACM on Interactive, Mobile, Wearable and Ubiquitous Technologies 7(1):1-28 (2023).
Zhang, Qian et al. Lipwatch: Enabling Silent Speech Recognition on Smartwatches using Acoustic Sensing. Proceedings of the ACM on Interactive, Mobile, Wearable and Ubiquitous Technologies 8(2):1-29 (2024).

\* cited by examiner

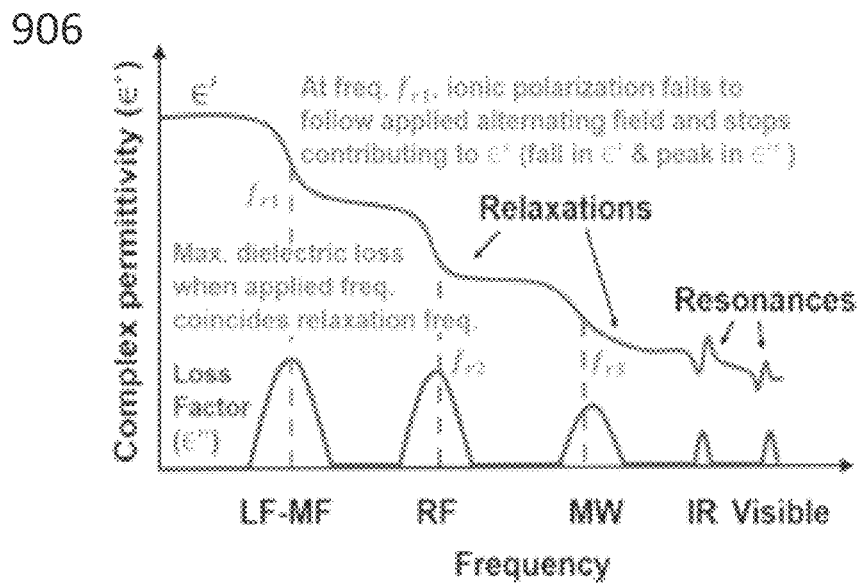
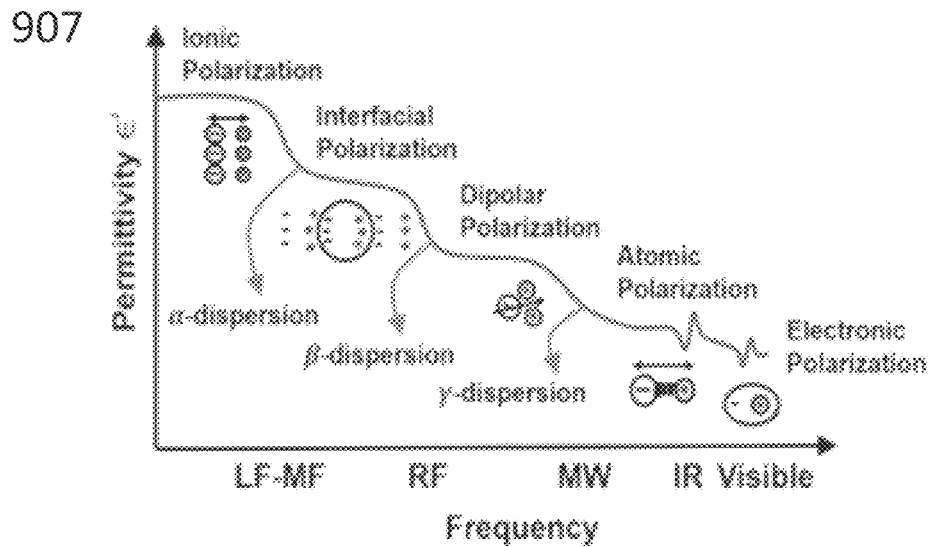
FIG. 9B

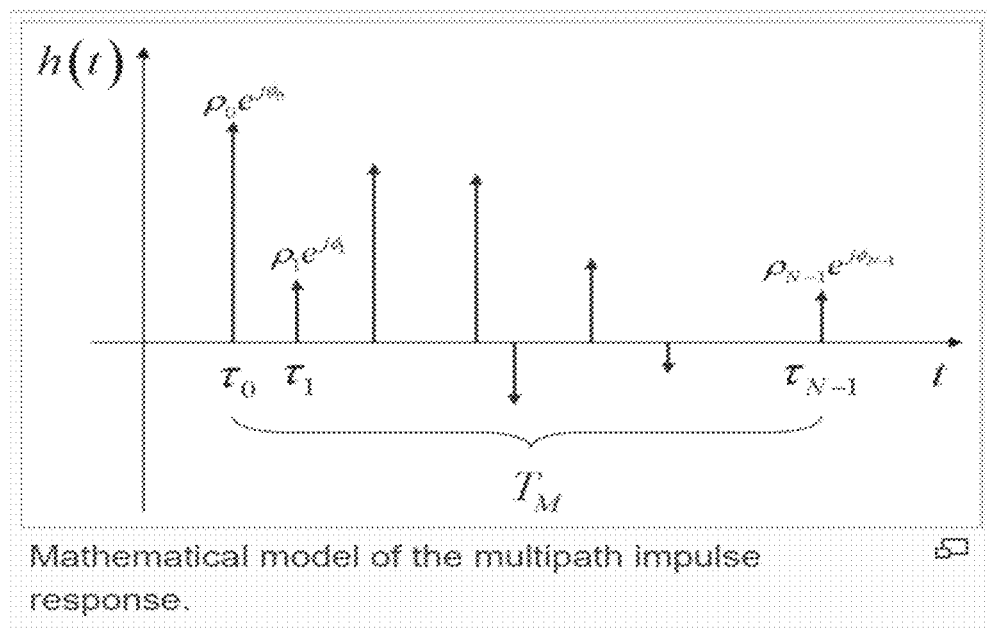
910
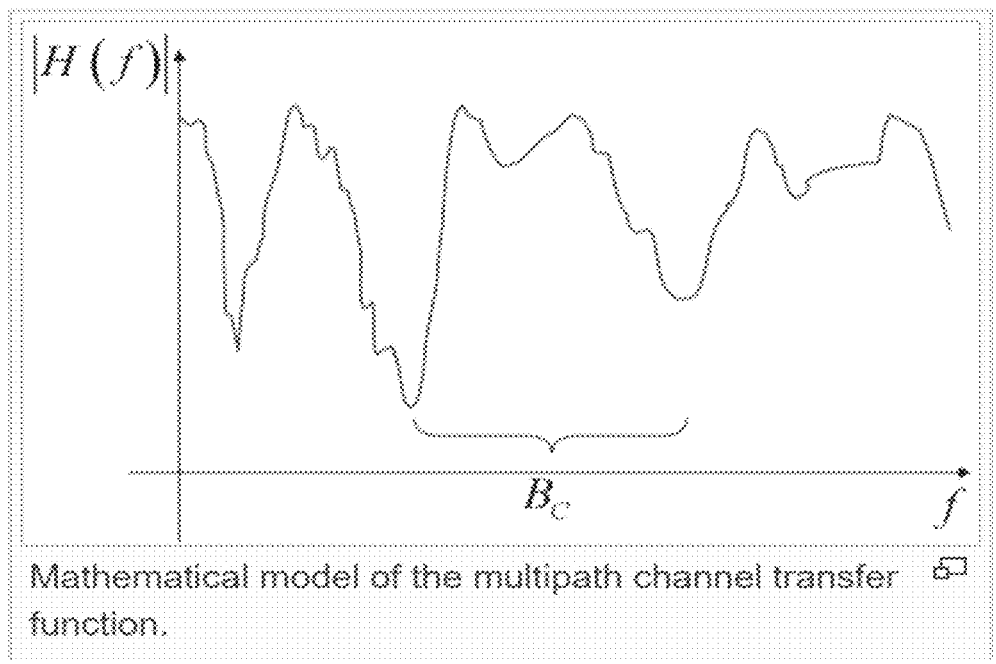
920
FIG. 9C

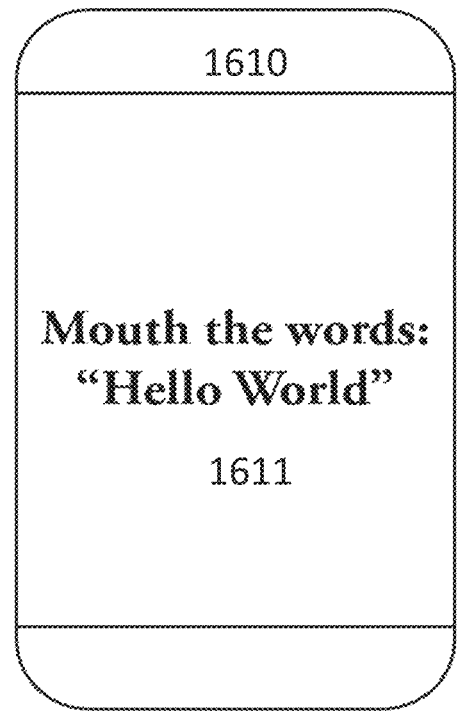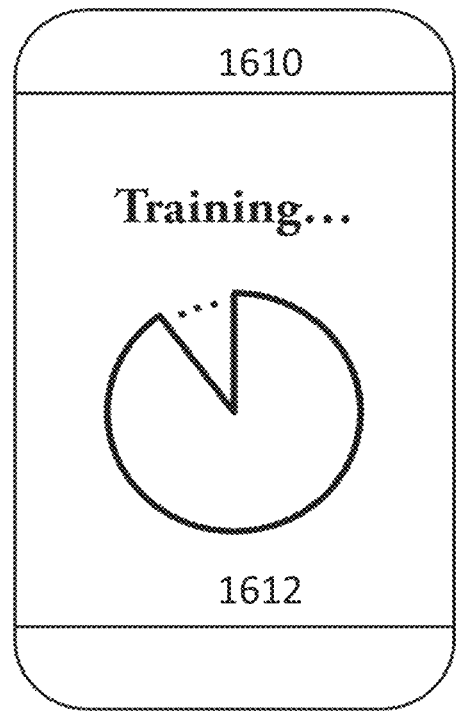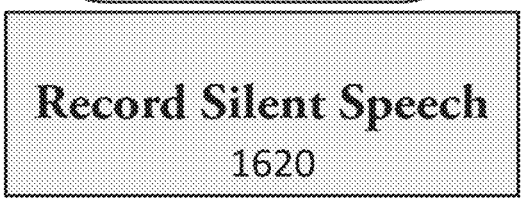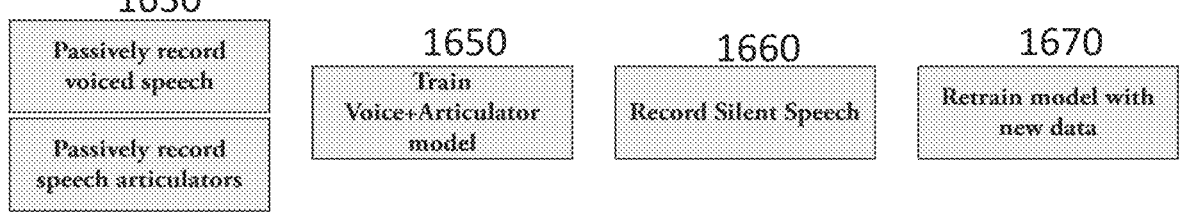
FIG. 16

```
Predicted: i used to be real big cowboy un
Truth:     i used to be a real big cowboy fan
Predicted: problem with the people on drugs
Truth:     problem with the people on drugs
Predicted: there wasn't anything on my channel
Truth:     there wasn't anything on my channel
Predicted: in fact unde uhh lotts anh acheli change
Truth:     has affected a lot of social change
Predicted: you don't have to have tvon atun everything
Truth:     you don't have to have forens for everything
Predicted: because e may have been ine good president
Truth:     because he may have been a good president
Predicted: thirteen uhh anders
Truth:     thirteen standard
Predicted: you really have to watch your
Truth:     you really have to watch your
```

FIG. 26

```
Predicted:  i have absolutely no problem with and i'm nesting
True:       i have absolutely no problem with random testing
Predicted:  they don't just run with your food
True:       they don't just run with your food
Predicted:  just open bed throw stuff in
True:       just an open bed to throw stuff in
Predicted:  to go places and play sport
True:       to go places and play sports
Predicted:  your name is
True:       your name is lynn
Predicted:  those are us factors
True:       those are risk factors
Predicted:  what kind of news are normally interest you
True:       what kind of news normally interests you
Predicted:  it just doesn't seem to want to
True:       it just doesn't seem to want to
Predicted:  my wife from the western part of virginia
True:       my wife's from the western part of virginia
Predicted:  they know all the procedures
True:       they know all the procedures
Predicted:  public colleges a produce of lee needn't student
True:       public colleges produce a fairly decent student
Predicted:  had a huge garden
True:       had a huge garden
```

*FIG. 31*

| Hyp Words | aa | ae | ah | b | d | eh | g | ih | iy | k | n | p | s | t | z |
|---|---|---|---|---|---|---|---|---|---|---|---|---|---|---|---|
| ae |  | 1 |  | 5 |  | 1 | 14 |  | 6 |  |  | 7 |  | 1 | 1 |
| ah | 13 | 5 |  | 1 |  | 10 | 1 | 22 | 2 | 2 | 5 | 1 | 1 | 5 | 4 |
| ao | 10 |  | 1 |  |  | 1 |  |  | 1 |  |  |  |  | 1 |  |
| b |  |  |  |  |  |  |  |  |  |  |  | 19 |  | 1 |  |
| d | 1 |  | 1 |  |  | 1 |  | 1 |  |  | 11 | 1 | 6 | 26 | 4 |
| eh | 1 | 14 | 8 |  | 1 |  | 1 | 9 | 1 | 1 |  |  | 2 | 1 |  |
| g |  |  |  |  |  |  |  | 1 |  | 13 |  |  |  | 1 |  |
| ih | 1 | 8 | 17 |  | 2 | 8 |  |  | 11 | 3 | 9 | 2 | 1 | 4 |  |
| k |  |  | 1 |  |  |  | 14 | 2 |  |  |  |  |  | 3 |  |
| n |  | 6 | 11 | 2 | 9 |  | 1 | 7 | 2 | 3 |  |  | 2 | 22 | 1 |
| p |  | 1 | 1 | 14 | 1 |  |  |  |  | 1 | 1 |  |  |  |  |
| s | 1 | 1 | 3 |  | 2 | 2 |  | 2 | 1 |  | 3 |  |  | 6 | 13 |
| t | 2 | 1 | 6 | 2 | 35 | 2 |  | 5 | 5 | 2 | 24 | 2 | 6 |  | 15 |
| z |  |  | 1 |  | 3 |  |  | 2 | 1 |  |  |  | 17 | 2 |  |

*FIG. 32*

METHODS FOR NON-AUDIBLE SPEECH DETECTION

CROSS-REFERENCE

This application claims priority to U.S. Provisional Application No. 63/594,367, filed Oct. 30, 2023, U.S. Provisional Application No. 63/611,031, filed Dec. 15, 2023, and U.S. Provisional Application No. 63/640,814, filed Apr. 30, 2024, all of which are incorporated herein by reference in their entirety.

BACKGROUND

Silent speech interfaces may be directed to restoring or enhancing oral communication from coexistent, non-audible (bio)signals which are generated during speech production, even in the absence of the acoustic speech signal itself. Invasive measuring techniques include permanent magnetic articulography (PMA), electromagnetic articulography (EMA), electropalatography (EPG), and electro-optical stomatography (EOS), a combination of EPG and optopalatography. Whereas only implant-based PMA is truly invasive, the remaining techniques require at least some components of the measuring device to reside inside the oral cavity, either by attaching magnets or coils to the tongue and lips (PMA, EMA) or by placing the sensing device against the hard palate (EPG, OPG, EOS). Non-invasive measuring techniques are surface electromyography (sEMG), ultrasound (US) doppler, US imaging, video imaging (or a combination of both) and radar-based sensing (RBS). For sEMG, the electrodes are placed on specific locations on the neck, face, and chin (above the muscles involved in speech production), whereas for US, the ultrasound probe is either placed below the chin, facing upwards, to capture tongue movements, or in front of the mouth. Video imaging captures the lips and for RBS, one or several antennas are placed on the facial skin or in front of the mouth, as well. In some cases, RBS may also utilize one or more remotely placed sensors near or directed the users head such that the antenna is not required to contact the user.

SUMMARY

The present disclosure provides a method for enabling communications between a user and one or more recipients, the method comprising: (a) using one or more sensors to track at least one position or motion characteristic of the user thereby generating sensor data, wherein the at least one position or motion characteristic is associated with an eye or a head of the user; (b) processing the sensor data to identify the one or more recipients with whom the user intends to communicate; and (c) processing data associated with non-audible speech of the user to generate one or more utterances, wherein the one or more utterances comprises audio or text intended by the user for the one or more recipients. In some embodiments, the one or more recipients comprise a first recipient and a second recipient, wherein the one or more utterances comprise a first utterance intended by the user for the first recipient and a second utterance intended by the user for the second recipient. In some embodiments, the one or more recipients are in physical or visual proximity to the user permitting the one or more sensors to track the at least one position or motion characteristic of the user. In some embodiments, the gaze direction of the user is directed towards the one or more graphical elements representative of the one or more recipients. In some embodiments, the one or more utterances by the user comprises at least 10 words. In some embodiments, (c) further comprises generating the one or more utterances comprising the audio or the text in one or more languages, based at least in part on a preferred language of each recipient of the one or more recipients. In some embodiments, (c) further comprises generating the one or more utterances comprising the audio or the text in one or more communication styles or formats, based at least in part on a preferred communication style or format of each recipient of the one or more recipients. In some embodiments, the one or more sensors comprises at least one of a radio beacon, a camera, or a radar sensor. In some embodiments, the non-audible speech comprises silent speech. In some embodiments, the non-audible speech comprises non-audible murmur. In some embodiments, prior to (c), using a radio frequency (RF) sensing device coupled to a head of the user to collect the data associated with the non-audible speech of the user. In some embodiments, the data associated with the non-audible speech of the user comprises RF signal data associated with movement of one or more speech articulators of the user. In some embodiments, the RF sensing device comprises one or more antennas. In some embodiments, the RF sensing device has a headphone form factor. In some embodiments, the RF sensing device is coupled to the head of the user absent of contact with a face of the user, which face comprises a mouth, lip, chin, jaw or cheek of the user. In some embodiments, the RF sensing device is coupled to the head of the user by being supported on ears of the user. In some embodiments, the RF sensing device is used to form and shape one or more RF signals to target the one or more speech articulators, which one or more speech articulators include a lip, tongue, jaw, larynx or vocal tract of the user.

The present disclosure provides a method for non-audible speech detection and output, the method comprising: providing a radio frequency (RF) sensing device configured to be coupled to a head of a user; using the RF sensing device to collect RF signal data associated with movement of one or more speech articulators of the user; and outputting or facilitating an output comprising a non-audible speech translation using at least in part processed RF signal data, wherein the non-audible speech of the user comprises continuous speech by the user. In some embodiments, the non-audible speech translation has a word error rate of less than about 50%. In some embodiments, the RF sensing device comprises one or more antennas, which one or more antennas comprise at least one transmitting antenna and at least one receiving antenna. In some embodiments, (b) comprises (i) using the at least one transmitting antenna to transmit a plurality of RF signals and (ii) using the at least one receiving antenna to collect the RF signal data. In some embodiments, the plurality of RF signals comprises a plurality of radiation patterns, and wherein the RF signal data comprises a modulation of the plurality of RF signals by the one or more speech articulators with the plurality of radiation patterns. In some embodiments, the plurality of radiation patterns comprises a plurality of frequency-dependent radiation patterns. In some embodiments, the modulation of the plurality of RF signals is proportional to an overlap between the one or more speech articulators and the plurality of radiation patterns. In some embodiments, (b)(i) further comprises using the at least one transmitting antenna to target the one or more speech articulators by individually scanning each speech articulator of the one or more speech articulators across a range of frequencies to effect a change in the plurality of radiation patterns. In some embodiments, the change in the plurality of radiation patterns results in one or more overlaps between the one or more speech articulators and the plurality of radiation patterns. In some embodiments, (b)(i) comprises using the at least one transmitting antenna to dynamically shape the plurality of radiation patterns. In some embodiments, (b)(ii) comprises using the at least one receiving antenna to dynamically shape at least one of an RF reception or an RF sensitivity pattern of the RF signal data. In some embodiments, the RF sensing device comprises at least two directional antennas pointed at or towards each other. In some embodiments, the at least two directional antennas are positioned on at least two different portions of the head of the user. In some embodiments, the at least two different portions of the head of the user comprises an auditory portion on the head of the user. In some embodiments, the at least two different portions of the head of the user are located on opposite sides of the head of the user. In some embodiments, the RF sensing device has a headphone form factor. In some embodiments, the RF sensing device is coupled to the head of the user absent of contact with a face of the user, which face comprises a mouth, lip, chin, jaw or cheek of the user. In some embodiments, the RF sensing device is coupled to the head of the user by being supported on ears of the user. In some embodiments, the transmission of the one or more RF signals is maximized based at least in part on a relative positioning between the at least two directional antennas. In some embodiments, the continuous speech by the user comprises a vocabulary of at least 50 words. In some embodiments, the continuous speech by the user has no substantial temporal or semantic breaks between word articulations. In some embodiments, (c) is performed substantially in real-time. In some embodiments, the non-audible speech translation has a word delay of no more than about 10 words. In some embodiments, the non-audible speech translation has a time delay of no more about 5 seconds. In some embodiments, the processed RF signal data is generated at least in part by processing one or more chunks of the continuous speech, wherein each chunk of the one or more chunks has a defined length of time. In some embodiments, said each chunk of the one or more chunks comprises a corresponding data sample from the RF signal data. In some embodiments, the non-audible speech comprises silent speech. In some embodiments, the non-audible speech comprises non-audible murmur. In some embodiments, (b) comprises using the RF sensing device to form and shape one or more RF signals to target the one or more speech articulators, which one or more speech articulators include a lip, tongue, jaw, larynx or vocal tract of the user.

The present disclosure provides a device for non-audible speech detection, the device comprising: at least one transmitting antenna configured to transmit a plurality of radio frequency (RF) signals, and at least one receiving antenna configured to collect RF signal data associated with movement of one or more speech articulators of a user, wherein the device is configured to be coupled to a head of the user, wherein the RF signal data is processed to determine a non-audible speech of the user, and wherein the non-audible speech of the user comprises continuous speech by the user. In some embodiments, the device is configured to be worn on, over, or around an auditory portion on the head of the user. In some embodiments, the device has a shape or form factor similar to a hearing aid, a headphone, or a pair of earbuds. In some embodiments, the device is configured to be coupled to the head of the user absent of contact with a face of the user, which face comprises a mouth, lip, chin, jaw or cheek of the user. In some embodiments, the plurality of RF signals comprises a plurality of radiation patterns, and wherein the RF signal data comprises a modulation of the plurality of RF signals by the one or more speech articulators with the plurality of radiation patterns. In some embodiments, the plurality of radiation patterns comprises a plurality of frequency-dependent radiation patterns. In some embodiments, the modulation of the plurality of RF signals is substantially proportional to an overlap between the one or more speech articulators and the plurality of radiation patterns. In some embodiments, the device is configured to target the one or more speech articulators individually by at least in part configuring the at least one transmitting antenna to scan across a range of frequencies to effect a change in the plurality of radiation patterns. In some embodiments, the change in the plurality of radiation patterns results in one or more overlaps between the one or more speech articulators and the plurality of radiation patterns, and wherein the RF signal data comprises data indicative of the one or more overlaps. In some embodiments, the device is configured to form and shape the plurality of RF signals for targeting the one or more speech articulators of the user. In some embodiments, the at least one transmitting antenna is configured to shape a plurality of radiation patterns of the plurality of RF signals. In some embodiments, the device is configured to form and shape the plurality of RF signals based at least in part on a frequency or a phase of the plurality of RF signals. In some embodiments, the device is configured to form and shape the plurality of RF signals based at least in part on a difference in power detected between two or more RF signals of the plurality of RF signals, wherein the two or RF signals are targeted at or towards a same speech articular of the one or more speech articulators. In some embodiments, the at least one receiving antenna is configured to shape at least one of an RF reception or an RF sensitivity pattern of the RF signal data. In some embodiments, the plurality of RF signals comprises a range of frequencies from about 500 MHz to about 1.5 GHz. In some embodiments, the device is configured to sweep the plurality of RF signals across a range of frequencies at a minimum sweep rate of about 100 Hz. In some embodiments, the device comprises at least two directional antennas pointed at or towards each other. In some embodiments, the at least two directional antennas comprise the at least one transmitting antenna and the at least one receiving antenna. In some embodiments, the at least two directional antennas are configured to be positioned on at least two different portions of the head of the user, which at least two different portions comprise the auditory portion on the head of the user. In some embodiments, the at least two different portions of the head of the user are located on opposite sides of the head of the user. In some embodiments, the at least two directional antennas are configured to maximize transmission of the plurality of RF signals through the one or more speech articulators. In some embodiments, the at least two directional antennas are configured to maximize the transmission of the plurality of RF signals based at least in part on a relative positioning between the at least two directional antennas. In some embodiments, the device further comprises an absorptive or shielding material configured to minimize contamination of the plurality of RF signals due to external environmental RF noise. In some embodiments, the device is configured to form and shape the plurality of RF signals to target the one or more speech articulators of the user, which one or more speech articulators include a lip, tongue, jaw, larynx or vocal tract of the user. In some embodiments, the auditory portion comprises an ear of the user, and wherein the device is configured to conform to a shape of the ear of the user. In some embodiments, the device has a shape or form factor similar to a pair of glasses. In some embodiments, the non-audible speech of the user is determined at a word error rate of less than about 50%. In some embodiments, the non-audible speech of the user is determined with a word delay of no more than about 10 words. In some embodiments, the non-audible speech of the user is determined with a time delay of no more about 5 seconds.

The present disclosure provides a system comprising: one or more sensors configured to detect at least one of a head orientation, a head position, or a gaze direction of a user relative to a text entry interface, and capture sensor data representing speech of the user; and one or more processors configured to process the sensor data and generate an input to the text entry interface. In some embodiments, the sensor data comprises measurements of radiofrequency. In some embodiments, the sensor data comprises one or more focal points of the user's gaze on or projected onto the text entry interface. In some embodiments, the sensor data is associated with a movement of one or more speech articulators within a head of the user. In some embodiments, the system is configured to enable the user to construct a word or sentence via the text entry interface. In some embodiments, the system is configured to enable the user to silently communicate with one or more other users using the text entry interface, without requiring the user to physically type, perform typing gestures, or produce audible sounds in order to communicate with the one or more other users. The present disclosure provides a method comprising: using one or more sensors to detect at least one of a head orientation, a head position, or a gaze direction of a user relative to a text entry interface; generating sensor data based at least in part on (a), wherein the sensor data comprises (i) one or more focal points of the user's gaze on, or projected onto the text entry interface and (ii) radio frequency (RF) data associated with a movement of one or more speech articulators within the head of the user; extracting a set of language signals from the sensor data, wherein the set of language signals is associated with silent speech that the user is articulating or wishes to articulate; and generating an input selection command based at least in part on the one or more focal points and the set of language signals, wherein the input selection command corresponds to an input that the user intends to remotely enter into the text entry interface. In some embodiments, the text entry interface is provided in a virtual (VR) or augmented reality (AR) environment or as a physical keyboard device. In some embodiments, the method further comprises: (e) executing the input selection command to provide the input to the text entry interface, and (f) generating and providing one or more feedback signals to the user, wherein the one or more feedback signals comprises at least one of a visual signal, a haptic signal or an auditory signal associated with the input. The present disclosure provides a method comprising: using one or more sensors to track eye movement or head movement of a user; processing sensor data to identify one or more individual recipients to whom the user intends to communicate with; and processing data associated with silent speech of the user to generate one or more utterances, wherein the one or more utterances comprises audio or text which the user intends to transmit to the one or more individual recipients. In some embodiments, the method further comprises: (d) transmitting the one or more utterances to the one or more individual recipients, based at least in part on a gaze direction of the user towards the one or more individual recipients. In some embodiments, the one or more individual recipients comprise a first recipient and a second recipient, wherein the one or more utterances comprise a first utterance intended by the user for the first recipient and a second utterance intended by the user for the second recipient, wherein the first utterance is transmitted solely to the first recipient without the second recipient having access to or information about the first utterance, and wherein the second utterance transmitted solely to the second recipient without the first recipient having access to or information about the second utterance. In some embodiments, the one or more individual recipients are in physical and visual proximity to the user. In some embodiments, the gaze direction of the user is directed towards a graphical display comprising one or more graphical elements representative of the one or more individual recipients. The present disclosure provides a system comprising: a wearable device configured to be worn on a user's head, wherein the wearable device comprises at least two directional antennas pointed at each other and located on at least two different portions of the user's head, wherein the at least two directional antennas are configured to generate radio frequency (RF) data associated with non-vocal speech; and one or more processors configured to process the RF data by at least in part decoding the RF data into text or audio signals representative of the non-vocal speech. In some embodiments, the at least two directional antennas are configured to maximize RF signal transmission through one or more speech articulators of the user. In some embodiments, the RF signal transmission is maximized through relative positioning between the at least two directional antennas. In some embodiments, the wearable device comprises an absorptive or shielding material configured to minimize signal contamination due to environmental RF noise. The present disclosure provides a system comprising: one or more transmission modules configured to operate across a range of frequencies; and a controller configured to adjust substantially in real-time one or more settings of the one or more transmission modules to optimize signal integrity and reduce noise for silent speech detection of a user, wherein the one or more settings are associated with at least one of power, phase or a filter function. In some embodiments, the range of frequencies is from 500 MHz to 1.5 GHz. In some embodiments, the plurality of transmission modules is configured to sweep across the range of frequencies at a minimum sweep rate of 100 Hz. The present disclosure provides a system comprising: a wearable device configured to be worn on a user's head, wherein the wearable device comprises one or more antennas configured to generate radio frequency (RF) data associated with non-vocal speech of the user; an audio sensor configured to obtain audible speech data of the user; and one or more processors configured to process the RF data, by at least in part decoding the RF data as modulated by the audible speech data, to generate text or audio signals representative of the non-vocal speech. The present disclosure provides a system comprising: a first antenna located near a user's left ear and a second antenna located near the user's right ear, wherein the first antenna and the second antenna are integrated into a wearable device; a transceiver comprising a transmitter and a receiver, wherein the transceiver is configured to perform frequency sweeps and capture transmitted or received signals; a processor configured to process magnitude information of the received signals and generate processed data; and a machine learning model configured to interpret the processed data and to output an intended speech or silent speech of the user as text or audio. In some embodiments, the machine learning model is further configured to adjust based at least in part on individual speech patterns and silent speech nuances of the user. In some embodiments, the machine learning model is adjusted using user-specific data to refine decoding accuracy over time. The present disclosure provides a method for controlling a computing device using silent speech, the method comprising: detecting at least one of non-vocal speech or a facial gesture using a radar-based system; associating the non-vocal speech or the facial gesture with a set of predefined commands stored in a memory; and executing a set of actions on the computing device based at least in part on an association of the non-vocal speech or the facial gesture with the set of predefined commands. The present disclosure provides a system comprising: a device configured to decode silent speech of a user into text or audio; a conversational artificial intelligence (AI) system configured to use the text or audio decoded from the device as inputs to generate a set of audio or text responses; and a user interactive module configured to provide the set of audio or text responses to the user. In some embodiments, the conversational AI system comprises a large language model. In some embodiments, the device is configured to decode the silent speech using radio frequency (RF) or radar signals. In some embodiments, the RF sensing device has a headphones, hearing aid, or earbuds form factor. The present disclosure provides a system comprising: an interface configured to receive and send data to one or more software applications; a conversational artificial intelligence (AI) engine configured to use silent speech of a user as inputs to facilitate the user's interactions with the one or more software applications; and a user interactive module configured to receive contextual information from one or more external sources, and use the contextual information to enhance an interaction experience of the user with the one or more software applications. The present disclosure provides a method comprising: providing a wearable device that measures radar data characteristics; providing an authentication model that determines if the radar data characteristics are likely to be associated with a particular user; and enabling one or more events to occur upon determining that the radar data characteristics are likely to be associated with the particular user, wherein the one or more events comprise unlocking or locking of one or more devices, enabling access to sensitive electronic information, or authorizing of one or more transactions. The present disclosure provides a method for automatic language translation, comprising: capturing data from non-vocal speech in a first language using a silent speech system that is based at least in part on radio frequency technology; utilizing a machine learning model to translate the data captured in (a) from the first language to a second language; and outputting the translated data as speech in at least one of text form or synthesized audio in the second language. In some embodiments, the silent speech system automatically identifies the first language based at least in part on user settings or contextual clues. In some embodiments, the silent speech system automatically selects the second language based on a recipient's preferred language or user settings. The present disclosure provides a system comprising: a wearable device configured to detect silent speech of a user; one or more processors configured to convert the detected silent speech into digital data representing speech of the user; and a communication module configured to transmit the digital data to a connected device, wherein the communication module is configured to be displayed as a digital microphone or a digital keyboard to the connected device. The present disclosure provides a method comprising: providing a wearable device that detects silent speech of a user; using one or more processors to convert the detected silent speech into digital data representing speech of the user; providing a voice synthesis module that synthesizes audio in a style of the user's voice; and outputting the digital data from (b) as synthesized voice audio using (c) via an audio playback device or wireless communication interface. The present disclosure provides a system for silent speech, the system comprising: an array of radio frequency emitters, the array forming a phased array for intra-body sensing. The present disclosure provides a system for silent speech, the system comprising: an array of radio frequency emitters, the array forming a phased array for silent speech detection. The present disclosure provides a method of silent speech detection, the method comprising providing a plurality of metamaterial antennas for covering broader frequency range in smaller form factor. The present disclosure provides a method of silent speech detection, the method comprising providing dynamic beam shaping to spatially sweep across the vocal tract. In some embodiments, the method further comprises creating a physical sweep in addition to a frequency sweep to generate a 3D model over time. The present disclosure provides a system for silent speech, the system comprising: a smart surface to dynamically tune wavelength and phase. The present disclosure provides a system for silent speech, the system comprising: a dozen or more antennas for beam shaping and angular decomposition of RF, similar to Light Field technology in optics. In some embodiments, the array of antennas is configured to use beamforming to target the lips. The present disclosure provides a system for silent speech, the system comprising: an adaptive beamforming array. In some embodiments, the system is configured to optimize power and phase offset of the antenna array transmission to match a phase and power received by the corresponding antenna array across the head. The present disclosure provides a method of silent speech detection, the method comprising using a linear dynamics electronic measurement to image: using S11, S12, S22, S21 measurements to create model of vocal tract. The present disclosure provides a method of silent speech detection, the method comprising nonlinear dynamics electronic measurement, the non-linear dynamics measurement comprising using multipath propagation and phase distortion/response to image intra-body effects. The present disclosure provides a method of silent speech detection, the method comprising tracking physical motion of speech articulators or other targets in the body, and focusing power on those, to get better time-resolution of their movements. The present disclosure provides a method of silent speech detection, the method comprising preempting where muscles and actions will happen and recording in that direction. The present disclosure provides a method of silent speech detection, the method comprising performing spatial scanning of speech articulators using a phased array, MIMO, or stepped-frequency radar for silent speech detection/decoding. The present disclosure provides a method of silent speech detection, the method comprising performing surface wave detection on human skin for shape detection. The present disclosure provides a method of silent speech detection, the method comprising creating a surface EM wave on the human skin, watch how it changes, and recording it as speech. In some embodiments, the wavefront is substantially not sent through the body. The present disclosure provides a method of silent speech detection, the method comprising providing electric field tomography of speech articulators. The present disclosure provides a method of silent speech detection, the method comprising detecting a radar based silent speech data set and using machine learning or tomography models to recreate spatial model of the imaged area. The present disclosure provides a method of silent speech detection, the method comprising providing Frequency Division Multiple Access (FDMA) for signal multiplexing.

In some embodiments, each antenna broadcasts a separate frequency simultaneously, enabling multiplexed measurements. In some embodiments, the method further comprises using frequency hopping spread spectrum (FHSS), including adaptive frequency hopping (AFH), to improve resilience to variable environmental RF conditions by e.g., Bluetooth. In some embodiments, the system or method further comprises: online Calibration of radio power to adapt to ambient environments. In some embodiments, the system or method further comprises: active RF noise canceling/RF interference cancellation: cancel noise of ambient RF. In some embodiments, the system or method further comprises: passive RF noise subtraction or passive RF interference cancellation: sample receiver without transmission turned on before and/or after sampling during transmission. In some embodiments, the system or method further comprises: interleaved sampling blocks & radar calibration blocks. In some embodiments, the system or method further comprises: sampling silent speech/articulator position while transmitting, and then sampling noise while not transmitting. In some embodiments, the system or method further comprises: the noise samples are used as post-hoc calibration in software pipeline. In some embodiments, the system or method further comprises: performing spectral density estimation on the received signals using techniques including Fourier transform, Wavelet analysis, or the Multitaper method. In some embodiments, the system or method further comprises: dynamically choosing frequency bands or adjusting amount of time spent on each frequency band to minimize electromagnetic interference. The present disclosure provides a machine learning model for silent speech detection, the machine learning model comprising: use of artificial neural networks to analyze magnitude and phase information of each transmitted frequency band (S11, S12, S21, S22, . . . S44, etc.) to synthesize audio/speech. The present disclosure provides a machine learning model for silent speech detection, the machine learning model comprising: session adaptation via device position-aware neural network. The present disclosure provides a machine learning model for silent speech detection, the machine learning model comprising: adapting radar signals depending on the angle of the array with respect to body orientation. The present disclosure provides a machine learning model for silent speech detection, the machine learning model comprising: a supplied array orientation with respect to body (e.g., angle and distance from center of head) to provide it a way to learn what signals look like for different orientations. In some embodiments, a silent speech decoder works more immediately on a new session (where the user's device may have a different angle with respect to the head). The present disclosure provides a machine learning model for silent speech detection, the machine learning model comprising: a per-user static calibration. In some embodiments, a user is instructed not to move mouth, and the machine learning model is adapted to user-specific features like metal tooth implants, or session-specific features like presence of retainer or facial hair. The present disclosure provides a machine learning model for silent speech detection, the machine learning model comprising: a nonlinear machine learning for automatic electric calibration of RF measurement system. The present disclosure provides a machine learning model for silent speech detection, the machine learning model comprising: a specific application on tracking speech articulators and silent speech detection. The present disclosure provides a machine learning model for silent speech detection, the machine learning model comprising: silent speech, voiced speech, or no speech detection for power savings. The present disclosure provides a machine learning model for silent speech detection, the machine learning model comprising: a small, low-power neural network which runs continuously to detect if a user is silently speaking vs engaging in overt speech or no speech. In some embodiments, if silent speech is detected, then the silent speech decoder (a larger, more power-intensive model) is turned on and begins transcribing the user's silent speech. The present disclosure provides a machine learning model for silent speech detection, the machine learning model comprising: user-specific embeddings for input to multi-user decoder. The present disclosure provides a machine learning model for silent speech detection, the machine learning model comprising: a separate neural network encoder used for each user, to adjust for user-specific differences, before data are fed into a common silent speech decoder. The present disclosure provides a system for silent speech, the system comprising: steerable antennas. The present disclosure provides a system for silent speech, the system comprising: 3D Antennas for miniaturized form factor. The present disclosure provides a system for silent speech, the system comprising: headphone or earbud form factors, or a combination of both. The present disclosure provides a system for silent speech, the system comprising: time-interleaved sampling and calibration: The present disclosure provides a system for silent speech, the system comprising: Simultaneous Transmission & reception of multiple RF bands+bandpass filtering for multiplexed sensing. The present disclosure provides a system for silent speech, the system comprising: a Phone or computer form factor for sensing of vocal track using dynamic beam shaping. The present disclosure provides a system for silent speech, the system comprising: an antenna on a magnetic clip-on shirt or clothing (similar form factor to Humane AI Pin), and a wireless interface like Bluetooth or higher bandwidth like Wi-Fi to move antenna off of the underside of chin. The present disclosure provides a method of silent speech detection, the method comprising doppler-based analysis of RF imaging/mapping of vocal cavity, musculature, etc. The present disclosure provides a method of silent speech detection, the method comprising radar-based sensing of nervous system signals including action potentials and local field potentials from peripheral nervous system. The present disclosure provides a method of silent speech detection, the method comprising radar-based sensing of nervous system signals including action potentials and local field potentials from the brain. The present disclosure provides a method of silent speech detection, the method comprising radar-based sensing of adaptive beamforming to adjust beam direction in real time based on detected head or device movement. The present disclosure provides a method of silent speech detection, the method comprising radar-based sensing of and dynamic adjustment of power control based on environmental factors, battery voltage, individual users, and across-time variability. The present disclosure provides a method of silent speech detection, the method comprising using standard or known phrases to rapidly calibrate system, adjusting for user-to-user variability or variability over time. The present disclosure provides a method of silent speech detection, the method comprising using supervised audio calibration, wherein the supervised audio calibration uses data from microphone of verbalized audio data to feedback system for user training. In some embodiments, the method further comprises, while users wear the system, provide feedback via synthesized audio, to teach them to use the system. The present disclosure provides a method of silent speech detection, the method comprising depth mapping of vocal tract. In some embodiments, the method comprising creating per-user depth maps of vocal tract, using reconstructed (tomography) 3D representation, and using it to tune a generated voice. The present disclosure provides a method of silent speech detection, the method comprising combining radar-based detection with sEMG to augment machine-learning training. The present disclosure provides a method of silent speech detection, the method comprising a privacy mode where decoded speech is not saved to training data. The present disclosure provides a method of silent speech detection, the method comprising adaptive learning for speech styles. The present disclosure provides a method of silent speech detection, the method comprising a gesture interface, wherein the gesture interface is configured to recognize mouth gestures as meaningful commands. In some embodiments, a closed mouth means "mute." The present disclosure provides a method of silent speech detection, the method comprising dynamic placement feedback, wherein the feedback comprises notifying a user if they need to readjust the placement on or around the ear, based on calibration sensing. In some embodiments, the silent speech interface is configured to integrate with a voice assistant such as Siri, Alexa, or ChatGPT. In some embodiments, the silent speech interface is configured to integrate with other devices to understand the context in which a user is speaking. In some embodiments, a store can broadcast a signal to the device, allowing the user to search through its inventory using silent speech or wherein a home appliance can broadcast its signal, letting users control it with silent speech. The present disclosure provides a system for silent speech, the system comprising: an array of radio frequency emitters, the array forming a phased array for silent speech detection. The present disclosure provides a system for radar-based silent speech, the system comprising: an adaptive beamforming array for radar-based sensing of one or more speech articulators. The present disclosure provides a method of silent speech detection, the method comprising detecting a radar based silent speech data set and using machine learning or tomography models to recreate a spatial model of the imaged area. The present disclosure provides a method of radar based silent speech detection, the method comprising using standard or known phrases to rapidly calibrate system, adjusting for user-to-user variability or variability over time. The present disclosure provides a silent speech detection device comprising a shape or form factor that allows the speech detection device to be worn on or over an ear of a subject. The present disclosure provides a speech detection device comprising: one or more transceivers configured to enable motion detection of one or more speech articulators within a head of a subject and to detect speech outside of an auditory range of the subject, wherein the speech detection device is configured to be worn on or over a side portion of the subject's head. The present disclosure provides a speech detection device comprising: an array of antennas configured to form and dynamically shape one or more radar beams for targeting one or more speech articulators of a subject. The present disclosure provides a speech detection method comprising: predicting a location and a movement of one or more speech articulators within a head of a subject, wherein the location and a movement of one or more speech articulators are predicted based at least in part of a detection of muscular activity in the one or more speech articulators. The present disclosure provides a method for speech spatial generation comprising: obtaining radio frequency (RF) sensor data of a region of a head of a subject, wherein the region comprises one or more speech articulators; and generating a three-dimensional (3D) spatial model of the region based at least in part on the RF sensor data using the 3D spatial model to predict speech. The present disclosure provides a speech management system comprising: a speech detection device configured to detect speech by a subject using radio frequency sensor data; and one or more application programmatic interfaces (APIs) operably coupling the speech detection device to one or more artificial intelligence (AI) chatbots, for enabling the subject to communicate with the one or more AI chatbots. The present disclosure provides a speech management system comprising: a speech detection device configured to detect speech by a subject; and one or more application programmatic interfaces (APIs) operably coupling the speech detection device to one or more artificial intelligence (AI) chatbots, for enabling the subject to communicate with the one or more AI chatbots. The present disclosure provides a method for determining a thought or an intent of a user, comprising: detecting non-audio signals from said user using a non-invasive device, to determine said thought or said intent of said user at an accuracy of at least 90%. The present disclosure provides a silent speech detection device comprising a shape or form factor that allows the speech detection device to be worn on or over an ear of a subject. The present disclosure provides a speech detection device comprising: one or more transceivers configured to enable motion detection of one or more speech articulators within a head of a subject, wherein the speech detection device is configured to be worn on or over a side portion of the subject's head. In some embodiments, the side portion comprises an ear of the subject. In some embodiments, the side portion is proximal to an auditory system of the subject. In some embodiments, the side portion is proximal to a temporal lobe of the subject. In some embodiments, the side portion is not located on a frontal portion of a face of the subject, In some embodiments, the side portion does not comprise a mouth, chin or cheek of the subject. In some embodiments, the one or more transceivers comprises one or more antennas. In some embodiments, the one or more speech articulators include a lip, tongue, jaw, larynx or vocal tract of the subject. In some embodiments, speech comprises vocalized speech, silent speech, intended speech, or imagined speech. The present disclosure provides a speech detection device configured to detect speech by a subject, wherein the speech detection device has a length of about 5 mm to about 300 mm, and a weight of no more than 2 kilograms. In some embodiments, the speech detection device has a volume of about 10 mm$^3$ to about 1 m$^3$. The present disclosure provides a speech detection device configured to detect speech by a subject, wherein the speech detection device is configured to conform to a shape of the subject's ear. The speech detection device of any proceeding claim, wherein the speech detection device is flexible. In some embodiments, the speech detection device has a shape or form factor similar to a hearing aid, a headphone or an earbud. In some embodiments, the RF sensing device may have a headphone form factor. In some embodiments, speech detection device is configured to be supported by the subject's ear. In some embodiments, the RF sensing device may be coupled to the head of the user absent of contact with a face of the user, which face comprising a mouth, lip, chin, jaw, or cheek of the user. In some embodiments, the RF sensing device may be coupled to the head of the user by being supported on ears of the user. In some embodiments, the speech detection device comprises one or more curved portions. The present disclosure provides a method of silent radar based speech detection, the method comprising using supervised audio calibration, wherein the supervised audio calibration uses data from microphone of verbalized audio data to feedback system for user training. In some embodiments, the array of antennas is further configured to steer and target the one or more radar beams at the one or more speech articulators as the subject is engaging in speech or about to engage in speech. In some embodiments, the system comprises: headphone or earbud form factors, or a combination of both. In some embodiments, the speech detection device further comprises: focusing a speech detection device at the predicted location of the one or more speech articulators to detect actual movement of one or more speech articulators for recording speech by the subject. The present disclosure provides a method for speech spatial generation comprising: obtaining radio frequency (RF) sensor data of a region of a head of a subject, wherein the region comprises one or more speech articulators; and generating a three-dimensional (3D) spatial model of the region based at least in part on the RF sensor data. The present disclosure provides a speech detection device configured to detect speech by a subject, wherein the speech detection device comprises an energy source and has a power consumption of no more than a threshold value. The present disclosure provides a speech management system comprising: a speech detection device configured to detect speech by a subject; and one or more application programmatic interfaces (APIs) operably coupling the speech detection device to one or more artificial intelligence (AI) chatbots, for enabling the subject to communicate with the one or more AI chatbots. The present disclosure provides a method of silent speech detection, the method comprising providing a plurality of metasurface antennas for covering broader frequency range in smaller form factor. In some embodiments, the voice assistant is a stateful conversational assistant, a world-aware conversational assistant, or both. In some embodiments, the system or method further comprises: using radar-based sensing for speech detection. In some embodiments, the system or method further comprises: online calibration of radio power to adapt to ambient environments. In some embodiments, the system or method further comprises: active RF noise canceling/RF interference cancellation: cancel noise of ambient RF. In some embodiments, the system or method further comprises: passive RF noise subtraction or passive RF interference cancellation: sample receiver without transmission turned on before and/or after sampling during transmission. In some embodiments, the system or method further comprises: interleaved sampling blocks & radar calibration blocks. In some embodiments, the system or method further comprises: sampling silent speech/articulator position while transmitting, and then sampling noise while not transmitting. In some embodiments, the system or method further comprises: the noise samples are used as post-hoc calibration in software pipeline. In some embodiments, the system or method further comprises: performing spectral density estimation on the received signals using techniques including Fourier transform, Wavelet analysis, or the Multitaper method. In some embodiments, the system or method further comprises: dynamically choosing frequency bands or adjusting amount of time spent on each frequency band to minimize electromagnetic interference. In some embodiments, the system or method comprises emitting an ultra-wideband signal and measuring an impulse response of the ultra-wideband signal. In some embodiments, the ultra-wideband signal comprises an impulse containing all frequencies (0-10 GHz). In some embodiments, the ultra-wideband signal is emitted through a user's oral cavity the measured impulse response, measures the response of the ultra-wideband signal through a user's oral cavity. The present disclosure provides a system comprising: a wearable device configured to detect silent speech of a user; one or more processors configured to convert the detected silent speech into digital data representing speech of the user; and a communication module configured to transmit the digital data to a connected device, wherein the communication module is configured to be displayed as a digital microphone or a digital keyboard to the connected device. The present disclosure provides a method comprising: providing a wearable device that detects silent speech of a user; using one or more processors to convert the detected silent speech into digital data representing speech of the user; providing a voice synthesis module that synthesizes audio in a style of the user's voice; and outputting the digital data from (b) as synthesized voice audio using (c) via an audio playback device or wireless communication interface. The present disclosure provides a system for real-time silent speech detection, comprising: a wearable device that transmits and receives radiofrequency, wherein the radiofrequency travels through a user's head; a user that moves their speech articulators, wherein the user intends to speak without producing audible sound; and one or more machine learning models that decode detected signals from the radiofrequency and produces decoded text or audio in real-time. The present disclosure provides a system for silent continuous speech detection, comprising: a wearable device that transmits and receives radiofrequency that travels through a user's head; a user that moves their speech articulators, intending to continuously speak more than one word without producing audible sound; and one or more machine learning models that decode detected signals, producing decoded text or audio of the more than one word. The present disclosure provides a system for private communication with conversational AI, comprising: a wearable device that transmits and receives radiofrequency that travels through a user's head; a user that moves their speech articulators while intending to speak without producing audible sound; one or more machine learning models that decode detected signals, producing decoded text or audio; one or more machine learning models that produce a text or audio response to the decoded text or audio from the user; and a display or speaker that communicates the text or audio response to the user. The present disclosure provides a system for miniaturizing electronics for silent speech detection, comprising: a wearable device that transmits and receives radiofrequency that travels through a user's head; and a user that moves their speech articulators while intending to speak without producing audible sound; wherein a total area of all circuit boards is no greater than 30 square inches, and wherein a power drawn from the wearable device is sufficiently low that the wearable device can be powered by a battery without a total weight exceeding 2 lbs. The present disclosure provides a system for detecting silent speech comprising: a wearable device that transmits and receives radiofrequency that travels through a user's head; and a user that moves their speech articulators while intending to speak without producing audible sound; wherein sensing electronics are placed inside one or more earcups or any on-head component of the system, and wherein data processing and/or signal processing units may be placed inside the one or more earcups or on a headphone or earbud. The present disclosure provides a system for miniaturizing electronics in a silent speech detection system, comprising: a wearable device that transmits and receives radiofrequency that travels through a user's head; a user that moves their speech articulators intending to speak without producing audible sound; and a System on Chip (SoC), wherein the SoC performs multiple functions including radiofrequency transmission, analog to digital conversion, and processing; The present disclosure provides a system for miniaturizing electronics in a silent speech detection system, comprising: a wearable device that transmits and receives radiofrequency that travels through a user's head; a user that moves their speech articulators intending to speak without producing audible sound; and a System in Package (SiP) that houses both digital and RF circuitry. The present disclosure provides a system for miniaturizing electronics in a silent speech detection system, comprising: a wearable device that transmits and receives radiofrequency that travels through a user's head; a user that moves their speech articulators intending to speak without producing audible sound; and one or more chip antennas for transmitting and receiving radiofrequency signals, wherein the one or more chip antennas are integrated onto the main circuit board of the wearable device. The present disclosure provides a method for miniaturizing electronics in a silent speech detection system, comprising: a wearable device that transmits and receives radiofrequency that travels through a user's head; and a user that moves their speech articulators intending to speak without producing audible sound; wherein the wearable device utilizes Antenna in Package (AiP) technology, and wherein an antenna in the AiP technology is integrated within a same package as one or more RF components. The present disclosure provides a system for typing with silent speech, comprising: detecting orientation or position of a user's head or gaze direction relative to a text entry interface; a user that moves their speech articulators without producing audible sound; a wearable device that captures data representing the movement and activity of the speech articulators; one or more processors that decode the sensor data into text; and one or more processors that select the relevant text entry interface and input the decoded text. The present disclosure provides a system for private communication, comprising: detecting orientation or position of a user's head or gaze direction to select a second person as the intended recipient of a communication; a first user that moves their speech articulators without producing audible sound; a wearable device that captures data from the first user representing movement and activity of the speech articulators; one or more processors that decode the data representing movement and activity of the speech articulators into text or audio; and one or more processors that communicate the text or audio to a second user's device. The present disclosure provides a system for connecting a silent speech interface to another device, comprising: a user that moves their speech articulators while intending to speak a first language without producing audible sound; a wearable device that captures data representing movement and activity of the speech articulators; one or more machine learning models that decode detected signals from the wearable device into text or audio; and one or more modules that connect to another device by emulating a keyboard and/or microphone. The present disclosure provides a system for automatic speech translation, comprising: a user that moves their speech articulators while intending to speak a first language without producing audible sound; a wearable device that captures data representing movement and activity of the speech articulators; and one or more machine learning models that decode the data representing movement and activity of the speech articulators into text or audio of a second language.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

FIG. 8 further illustrates a system in which a radar beam is scanned across the voice articulators repeatedly over time, at many frequencies. The system can create a 3D data scan in multiple directions, showing how the broadband frequency responses change over time.

FIG. 9B illustrates electronic polarization and the movement of the electrons around single atoms.

FIG. 9C illustrates impulse responses in time and frequency domains.

FIG. 16 shows a method of training a silent speech system, in accordance with some embodiments of the present disclosure.

FIG. 26 shows a comparison of ground truth utterances with model predictions.

FIG. 27A shows the field strength in the vocal tract at 2 GHz when a directional antenna is used. FIG. 27B shows the field strength in the vocal tract at 2 GHz when an omnidirectional antenna is used.

FIG. 31 shows an example performance of the silent speech system as described herein on various sentences.

FIG. 32 shows some of the top errors in speech sounds made by a prototype of the silent speech system.

FIG. 33A shows results for antennas with non-matched polarity. FIG. 33B shows results for antennas with matched polarity.

DETAILED DESCRIPTION

Figure 1:
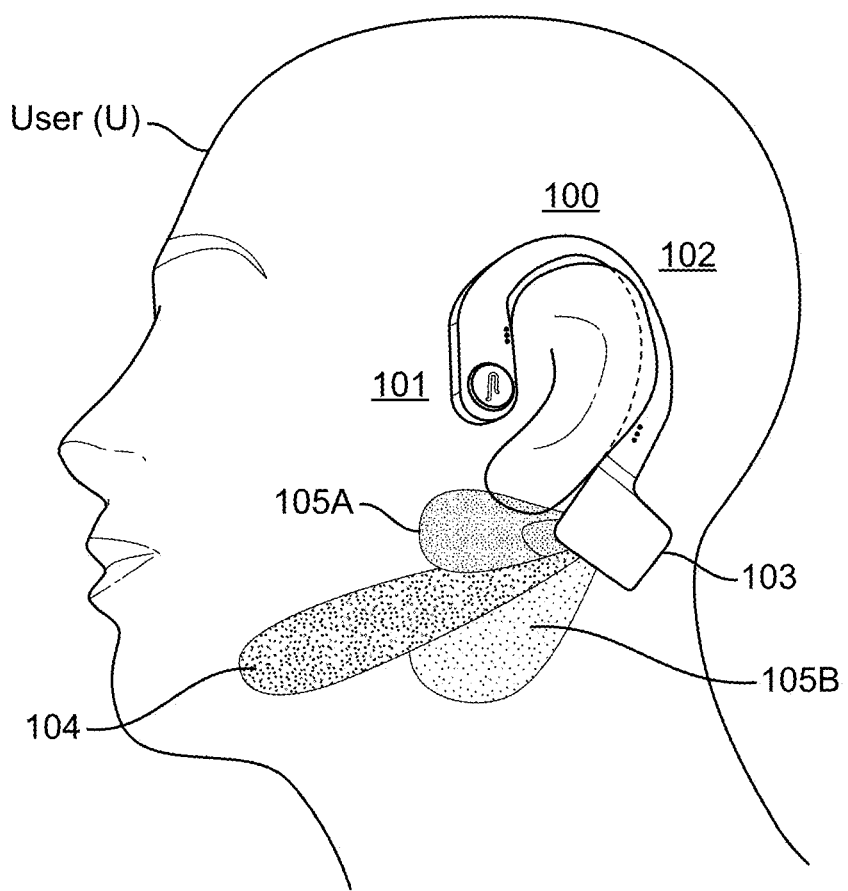
FIG. 1 illustrates beam forming array lobes directed at speech articulators. Antenna placement can be adjusted to be moved forward and backward. Antennas can also be implemented on around-the-ear form factor with antennas integrated.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out.

The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

The term "speech articulators" may mean any or all parts of the body involved in the shaping of vocalized, silent, or intended speech. Speech articulators may include but are not limited to, the tongue, lips, jaw, and larynx.

In context of this patent application, terms "speech," "vocalized speech," "silent speech," "intended speech," "verbal speech," "audible speech," or "imagined speech" may be used for the purposes of providing a non-limiting example of a type of speech used. In some cases, imagined speech may include thinking about speech without trying to make sound or move muscles. In some cases, intended or attempted speech may include trying to produce speech in contexts which do not permit speech production, e.g., due to medical condition (laryngectomy, stroke, ALS, MS, Parkinson's, facial palsy, etc.) or environmental conditions (underwater, intubated, rebreather, mouthpieces, etc.

In an aspect, the present disclosure provides a method for non-audible speech detection and output. In some embodiments, the method may comprise providing a radio frequency (RF) sensing device configured to be coupled to a head of a user; using the RF sensing device to collect RF signal data associated with movement of one or more speech articulators of the user; and outputting or facilitating an output comprising a non-audible speech translation using, at least in part, processed RF signal data, wherein the non-audible speech of the user comprises continuous speech by the user. In some embodiments, the non-audible speech may comprise silent speech. In some embodiments, the non-audible speech may comprise non-audible murmur. A non-audible murmur is a very weak speech sound produced without vocal vibration.

In some cases, a non-audible speech translation may comprise a conversion of non-audible or silent speech to a comprehensible output. The comprehensible output may be spoken audio or a written transcription. The spoken audio or written transcription may be created and/or augmented by a machine learning model. In some cases, the method may comprise outputting or facilitating an output of this non-audible speech translation.

In some cases, the non-audible speech of the user may comprise continuous speech by the user. Speech recognition may generally be described as the process by which a computer or other type of machine identifies spoken words. A speech recognition system may allow a user to talk to a computer or computational system and have it correctly recognize what they say. A speech recognition system may recognize one or more utterances spoken by a user. An utterance may be defined as the vocalization of a word or words that represent a single meaning to the computer or computational system. Utterances may be a single word, a few words, a sentence, or possibly multiple sentences. A speech recognition system may have a vocabulary, with a vocabulary being a list of words or utterances that can be recognized by the speech recognition system.

There are multiple types of speech recognition systems that can recognize different types of utterances. One type of speech recognition system is a system that can recognize isolated utterances. Such recognition systems may only allow for one utterance at a time, with audio breaks before and after that utterance. These systems may require the user to wait between utterances, and frequently will do processing during these pauses.

Another type of speech recognition system is a connected utterance system. This type is similar to the isolated utterances system, but also allows for separate utterances to be spoken together with only a short pause between them.

Another type of speech recognition is continuous speech recognition, which can be more challenging to implement than isolated utterance or connected utterance systems. Continuous speech recognizers can allow users to speak almost naturally. Continuous speech recognition systems can allow a user to talk to the system without stops and pauses. The present disclosure provides methods, systems, and devices that perform non-audible/silent continuous speech recognition. In some embodiments, the continuous speech by the user may have no substantial temporal or semantic breaks between word articulations.

In some embodiments, the methods described herein may be performed substantially in real-time, meaning with minimal time or word delay. In some embodiments, the non-audible speech translation has a word delay of no more than about 1 words. In some embodiments, the non-audible speech translation has a word delay of no more than about 2 words. In some embodiments, the non-audible speech translation has a word delay of no more than about 3 words. In some embodiments, the non-audible speech translation has a word delay of no more than about 5 words. In some embodiments, the non-audible speech translation has a word delay of no more than about 10 words. In some embodiments, the non-audible speech translation has a word delay of no more than about 20 words. In some embodiments, the non-audible speech translation has a word delay of no more than about 30 words. In some embodiments, the non-audible speech translation has a word delay of no more than about 40 words. In some embodiments, the non-audible speech translation has a word delay of no more than about 50 words.

In some embodiments, the non-audible speech translation has a time delay of no more than about 1 second. In some embodiments, the non-audible speech translation has a time delay of no more than about 2 seconds. In some embodiments, the non-audible speech translation has a time delay of no more than about 3 seconds. In some embodiments, the non-audible speech translation has a time delay of no more than about 4 seconds. In some embodiments, the non-audible speech translation has a time delay of no more than about 5 seconds. In some embodiments, the non-audible speech translation has a time delay of no more than about 10 seconds. In some embodiments, the non-audible speech translation has a time delay of no more than about 20 seconds. In some embodiments, the non-audible speech translation has a time delay of no more than about 30 seconds.

In some embodiments, the non-audible speech translation may have a word error rate of less than about 50%. In some embodiments, the non-audible speech translation may have a word error rate of less than about 45%. In some embodiments, the non-audible speech translation may have a word error rate of less than about 40%. In some embodiments, the non-audible speech translation may have a word error rate of less than about 35%. In some embodiments, the non-audible speech translation may have a word error rate of less than about 30%. In some embodiments, the non-audible speech translation may have a word error rate of less than about 25%. In some embodiments, the non-audible speech translation may have a word error rate of less than about 20%. In some embodiments, the non-audible speech translation may have a word error rate of less than about 15%. In some embodiments, the non-audible speech translation may have a word error rate of less than about 10%. In some embodiments, the non-audible speech translation may have a word error rate of less than about 5%. In some embodiments, the non-audible speech translation may have a word error rate of less than about 2%. In some embodiments, the non-audible speech translation may have a word error rate of less than about 1%.

The present disclosure provides system and methods that can improve silent speech detection and the conversion of sensed or recorded speech articulator movement into clear and accurate audible speech, text, or both. A silent speech system as described herein may provide radar-based sensing to measure the activity of one or more speech articulators. The measured activity of the one or more speech articulators may be translated into an audio output and/or text output. In some cases, the audio output and/or text output may match an intended speech of a user. In some cases, the audio output and/or text output may closely match the intended speech of a user. In some cases, the audio output and/or text output may summarize the intended speech of a user. In some cases, the audio output and/or text output may edit the intended speech of a user based on a task or prompt. In some cases, the audio output and/or text output may match the intended speech of a user with an accuracy of at least about 50%. In some cases, the audio output and/or text output may match the intended speech of a user with an accuracy above about 60%. In some cases, the audio output and/or text output may match the intended speech of a user with an accuracy above about 70%. In some cases, the audio output and/or text output may match the intended speech of a user with an accuracy above about 80%. In some cases, the audio output and/or text output may match the intended speech of a user with an accuracy above about 90%. In some cases, the audio output and/or text output may match the intended speech of a user with an accuracy above about 95%. In some cases, the audio output and/or text output may match the intended speech of a user with an accuracy above about 99%. In some cases, the audio output and/or text output may match the intended speech of a user with a word error rate (WER) of less than about 50%. The WER may be defined as the ratio of errors in a transcript to total words spoken. In some cases, the audio output and/or text output may match the intended speech of a user with a WER below about 40%. In some cases, the audio output and/or text output may match the intended speech of a user with a WER below about 30%. In some cases, the audio output and/or text output may match the intended speech of a user with a WER below about 20%. In some cases, the audio output and/or text output may match the intended speech of a user with a WER below about 10%. In some cases, the audio output and/or text output may match the intended speech of a user with a WER below about 5%. In some cases, the audio output and/or text output may match the intended speech of a user with a WER below about 1%.

In some cases, a WER for a user in a silent speech system may decrease over time by using data collected by the silent speech system to train or finetune a machine learning model of the user's speech.

In some cases, the systems and methods for silent speech described herein may have access to a word bank. In some cases, the word bank may comprise a dictionary for one or more languages. In some cases, the word bank may be configured to access the Internet to learn and accumulate new words. In some cases, a user may add custom words, phrases, and vocabulary to the word bank. In some cases, a silent speech interface may access the word bank of one or more silent speech interfaces connected to the same network. In some cases, a silent speech interface may access one or more databases comprising one or more word banks. The one or more word banks may comprise all known words of one or more languages. In some cases, the word bank may comprise all words in the Oxford English dictionary and the Merriam-Webster dictionary.

In some cases, the systems and methods for silent speech described herein may allow for an increased vocabulary size. In some cases, the vocabulary size may be at least 100 words. In some cases, the vocabulary size may be at least 500 words. In some cases, the vocabulary size may be at least 1,000 words. In some cases, the vocabulary size may be at least 10,000 words. In some cases, the vocabulary size may be at least 25,000 words. In some cases, the vocabulary size may be at least 50,000 words.

In some embodiments, the continuous speech by the user may comprise a vocabulary of at least 50 words. In some embodiments, the continuous speech by the user may comprise a vocabulary of at least 100 words. In some embodiments, the continuous speech by the user may comprise a vocabulary of at least 1,000 words. In some embodiments, the continuous speech by the user may comprise a vocabulary of at least 10,000 words. In some embodiments, the continuous speech by the user may comprise a vocabulary of at least 25,000 words. In some embodiments, the continuous speech by the user may comprise a vocabulary of at least 50,000 words.

In some embodiments, the processed RF signal data may be generated at least in part by processing one or more chunks of the continuous speech, wherein each chunk of the one or more chunks has a defined length of time. For example, a user may be speaking continuously and non-audibly, and the system may capture the silent/non-audible speech data in discrete segments with a defined length of time. These discrete segments may be called "chunks". In some embodiments, each chunk of the one or more chunks comprises a corresponding data sample from the RF signal data.

The systems and methods of the present disclosure may use ultra-wideband radar, pulsed-noise radar, impulse radio ultra-wideband radar, frequency-modulated continuous wave radar or stepped-frequency continuous wave radar for measuring silent speech. The radar-based sensing may use broadband imaging in the gigahertz (GHz) radio spectrum to measure the activity of the speech articulators which can then be translated to speech or text.

The systems and methods described herein may emit radio waves through a user's body to map internal structures. Radio signals moving through the body are altered by the presence and makeup of internal structures. For instance, transmitting radio waves through the oral cavity results in differences in the wave pattern because of the location of the tongue, lips, jaw, and larynx. A silent speech system or method as described herein may be configured to measure and detect the changes in radio waves emitted through the internal structures of a user to detect and measure activity of speech articulators. The measured changed may be used to translate activity of the speech articulators into speech, text or both, corresponding to the speech of a user corresponding to the speech articulator activity. The measured changes of the radio waves may comprise changes in the transmission spectra (measuring at the point where the radio waves exit from the body), changes in the reflection spectra (measuring the backscatter of these waves onto the transmission source/point of entry), or any combination thereof. By analyzing the differences in the changes in the transmission spectra and/or the reflection spectra across phonemes/words/mouth positions with machine learning, one can build a "silent speech interface" (SSI).

The systems and methods described herein may result in current or voltage through a user's body to map internal structures, or surface to measure changes in skin position and stretching. Electrical signals moving through the body are altered by the presence and makeup of internal structures. Electrical signals moving on the surface of the skin are altered by changes in impedance of the skin, that may correspond to changes in surface area by movement of the lips, changes in current and voltage on the skin due to muscle or nerve activity, or changes in impedance due to muscle or nerve activity. In some cases, this current corresponds to ionic current. In other cases, it corresponds to changes in the balance of ions at the interfacial layer. By analyzing the differences in the changes in the electrical current and/or voltage across phonemes/words/mouth positions with machine learning, one can build a "silent speech interface" (SSI).

Antennas

In one aspect, the present disclosure provides systems and methods for silent speech detection. In some cases, silent speech detection may further comprise silent speech decoding. In some cases, the systems and methods for silent speech detection and decoding comprise the use of one or more antennas. In some embodiments, the RF sensing device comprises one or more antennas, which one or more antennas comprising at least one transmitting antenna and at least one receiving antenna. In some embodiments, using the RF sensing device to collect RF signal data associated with movement of one or more speech articulators of the user comprises (i) using the at least one transmitting antenna to transmit a plurality of RF signals and (ii) using the at least one receiving antenna to collect the RF signal data. In some embodiments, the plurality of RF signals comprises a plurality of radiation patterns. In some embodiments, the RF signal data comprises a modulation of the plurality of RF signals by the one or more speech articulators with the plurality of radiation patterns. In the field of antenna design, the term radiation pattern generally refers to the pattern of the distance-dependent strengths of the radio waves from the antennas. In the present disclosure, the RF signal data detected may comprise data received when the transmitting antenna transmit radio waves through the head of a user, where the user's speech articulators may interact with these transmitted radio waves and produced a modulated (e.g., changed) signal that is received by the receiving antenna. In some embodiments, the plurality of radiation patterns comprises a plurality of frequency-dependent radiation patterns. In the methods, systems, and devices described herein, the radiation patterns emitted from the transmitting antenna may change as frequency is varied. In some cases, the methods, systems, and devices described herein may scan through a range of frequencies and measure the signals during silent speech detection at various frequencies. In some cases, the plurality of RF signals comprises a range of frequencies from about 500 MHz to about 1.5 GHz. In some embodiments, the RF sensing device is configured to sweep the plurality of RF signals across a range of frequencies at a minimum sweep rate of about 10 Hz. In some embodiments, the RF sensing device is configured to sweep the plurality of RF signals across a range of frequencies at a minimum sweep rate of about 20 Hz. In some embodiments, the RF sensing device is configured to sweep the plurality of RF signals across a range of frequencies at a minimum sweep rate of about 30 Hz. In some embodiments, the RF sensing device is configured to sweep the plurality of RF signals across a range of frequencies at a minimum sweep rate of about 50 Hz. In some embodiments, the RF sensing device is configured to sweep the plurality of RF signals across a range of frequencies at a minimum sweep rate of about 100 Hz. In some embodiments, the RF sensing device is configured to sweep the plurality of RF signals across a range of frequencies at a minimum sweep rate of about 200 Hz. In some embodiments, the RF sensing device is configured to sweep the plurality of RF signals across a range of frequencies at a minimum sweep rate of about 300 Hz. In some embodiments, the RF sensing device is configured to sweep the plurality of RF signals across a range of frequencies at a minimum sweep rate of about 400 Hz. In some embodiments, the RF sensing device is configured to sweep the plurality of RF signals across a range of frequencies at a minimum sweep rate of about 500 Hz. In some embodiments, the modulation of the plurality of RF signals is proportional to an overlap between the one or more speech articulators and the plurality of radiation patterns. Namely, the speech articulators' interaction with the plurality of radiation patterns may vary depending on how, how much, or what part of that speech articulator is interacting with the radiation pattern. In some embodiments, the method further comprises using the at least one transmitting antenna to target the one or more speech articulators by individually scanning each speech articulator of the one or more speech articulators across a range of frequencies to effect a change in the plurality of radiation patterns. For example, the transmitting antenna may scan the different speech articulators one at a time at a variety of frequencies as the user is silently/non-audibly speaking. In some cases, the one or more speech articulators include a lip, tongue, jaw, larynx, or vocal tract of the user. This can allow for the receiving antenna to detect frequency-dependent changes in the plurality of radiation patterns for different speech articulators. In some embodiments, the change in the plurality of radiation patterns results in one or more overlaps between the one or more speech articulators and the plurality of radiation patterns.

In some embodiments, using the at least one transmitting antenna to transmit a plurality of RF signals may comprise using the at least one transmitting antenna to dynamically shape the plurality of radiation patterns. In some embodiments, the methods, systems, and devices described herein may comprise a controller configured to control the shape and direction of the radiation patterns from a phased array. In some embodiments, using the at least one receiving antenna to collect the RF signal data may comprise using the at least one receiving antenna to dynamically shape at least one of an RF reception or an RF sensitivity pattern of the RF signal data.

In some cases, the systems and methods for silent speech detection and decoding may comprise using a radar-based SSI for intra-body sensing. In some cases, radar-based SSI methods include beamforming and/or directional antennas. In some cases, an SSI shapes how the radio waves move. In some cases, an SSI is configured so that one or more transmitters and/or receiver antennas do not have to be positioned opposite of each other. In some cases, an SSI is configured so that one or more transmitter and/or receiver antennas do not have to be aligned with each other across a transmission medium. For example, a transmitter antenna on the left ear of a user may not require that a corresponding receiver antenna is placed on the right ear of the user. This may allow the systems and methods for silent speech detection to avoid placing sensors and antennas on a user's face, e.g., on the user's cheeks.

In some cases, a method of silent speech detection may comprise placing one or more radio wave emitters (a "transmitter") on or near a user. In some cases, a method of silent speech detection may comprise placing one or more receiver antennas on or near the user to record signal changes. For example, one or more transmitters (Tx) may be placed on the face of a user, under the chin of the user, or both. The one or more receivers (Rx) may also be placed on or near the face. In some cases, the one or more transmitters may be configured to form a phased array for silent speech detection. In some cases, a phased radar array may comprise a fully sampled radar antenna array. In some cases, a fully sampled radar antenna array may be a radar antenna array configured such that adjacent antenna elements are separated by at most one-half of a wavelength of the radar signals transmitted and/or received by the transmitters (Tx) and receivers (Rx). In some cases, a phased radar array may comprise a sparse antenna array. In some cases, a sparse antenna array may comprise multiple antennas that are spaced further apart than the antennas in a typical fully sampled array.

In some cases, radar-based SSI methods comprise reflectance methods, multipaths methods, or a combination thereof. For example, an SSI may measure reflectance properties, and create a multi-path model to measure how a 3D structure of the body affects radio waves transmitted through a user's face. In some cases, the wavefront is substantially not sent through the body. In some cases, a method for silent speech detection may comprise using linear dynamics electronic measurements to generate a 3D image of a user's speech articulators. For example, a linear dynamics electronic measurement may comprise using sensor 1 to sensor 1 (S11), sensor 1 to sensor 2 (S12), sensor 2 to sensor 2 (S22), and/or sensor 2 to sensor 1 (S21) measurements to create model of a user's vocal tract. In some cases, a method of silent speech detection may comprise using nonlinear dynamics electronic measurement. The nonlinear dynamics measurement may comprise using multipath propagation and phase distortion and response to image intra-body effects. In some cases, a method for silent speech detection comprises using 3D antennas for radar-based spatial scanning of speech articulators. In some cases, a method for silent speech detection comprises using 3D antennas for improved MIMO channel separation.

In some cases, a system or method for silent speech comprises one or more phased arrays. The one or more phased arrays may be configured for signal steering. In some cases, a system for silent speech may comprise one or more Rx antennas. In some cases, a system for silent speech may comprise one or more Tx antennas. In some cases, a system for silent speech may comprise one or more Rx/Tx antennas. In some cases, each Rx antenna may have a corresponding Tx antenna. In some cases, the RX/TX ratio may be 1:N, N:1, or N:N, wherein N is a number greater than 1. For example, a system for silent speech may comprise 1 TX and 2 or more RX. In another example a system for silent speech may comprise 2 or more TX and 1RX. In another example, a system for silent speech may comprise N TX and N+1 RX. Some non-limiting exemplary TX/RX ratios may include: 1:2, 1:3, 1:4, 1:5, 2:3, 2:5, 3:5, 3:10, 4:5, 4:7, 4:9, 5:7, 5:9, 6:7. It should be understood that the inverse of the presented ratio may be possible or any multiple of the exemplary ratios.

Figure 2:
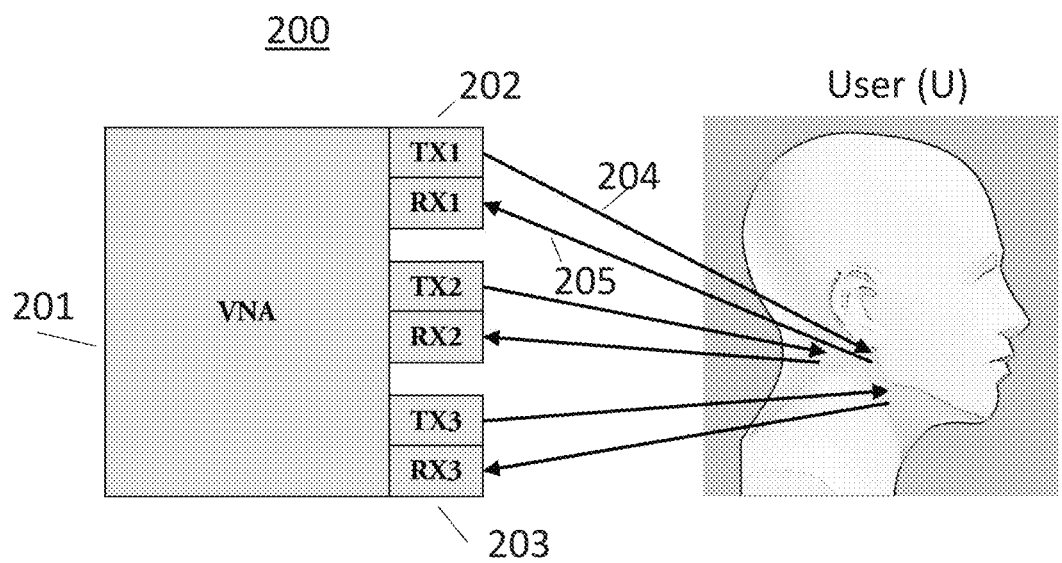
FIG. 2 illustrates a simple system description, using VNA and 3 TX/RX paths. S-parameters used may comprise S11, S12, S13, S21, S22, S23, S31, S32, or S33.

FIG. 2 illustrates a schematic of a non-limiting example of a radar-based SSI 200, wherein the SSI 200 comprises a set of transmitter (TX1, TX2, TX3) 202 on the face of a User (U) configured to transmit radio waves 204 through the User's (U) speech articulators and a set of corresponding receivers (RX1, RX2, RX3) 203 on the face of a User (U) configured to receive transmission and reflectance signals 205. The SSI 200 may comprise a Vector Network Analyzer (VNA) 201 coupled to the RX/TX antennas 202, 203 configured to analyze and measure the received signals 205. Radio waves can be picked up away from the face (as they can transmit through the air). Furthermore, because radio waves travel in many directions, an SSI as described herein may be configured to detect radio waves on other parts of the body after traveling through the mouth.

In some cases, a system or method for silent speech as described herein may comprise using 3D antennas to target specific speech articulators, like the lips, larynx, or tongue. In some cases, a method for silent speech detection may comprise using signal steering. In some cases, one or more antennas may be configured for signal steering. In some cases, a system for silent speech detection may comprise one or more steerable antenna. In some cases, a system for silent speech may control or adjust a position and/or location of one or more antennas. Controlling the location and/or position of each antenna may allow the system to change an emission or receiving direction, angle, or both for one or more antennas. In some cases, a position and location of one or more antennas may be adjusted and/or changed to calibrate an SSI to a user. In some cases, a position and/or location of one or more antennas may be adjusted and/or changed to target one or more different speech articulators. In some cases, a position and/or location and/or selection of one or more antennas may be adjusted and/or changed manually by the user. In some cases, a position and/or location and/or selection of one or more antennas may be adjusted and/or changed using a remote control system. In some cases, a position and/or location and/or selection of one or more antennas may be adjusted and/or changed in response to one or more instructions from the user. In some cases, a position and/or location and/or selection of one or more antennas may be adjusted and/or changed in response to an audio command from the user. In some cases, a position and/or location and/or selection of one or more antennas may be adjusted and/or changed in response to a silent speech command from the user.

Figure 3:
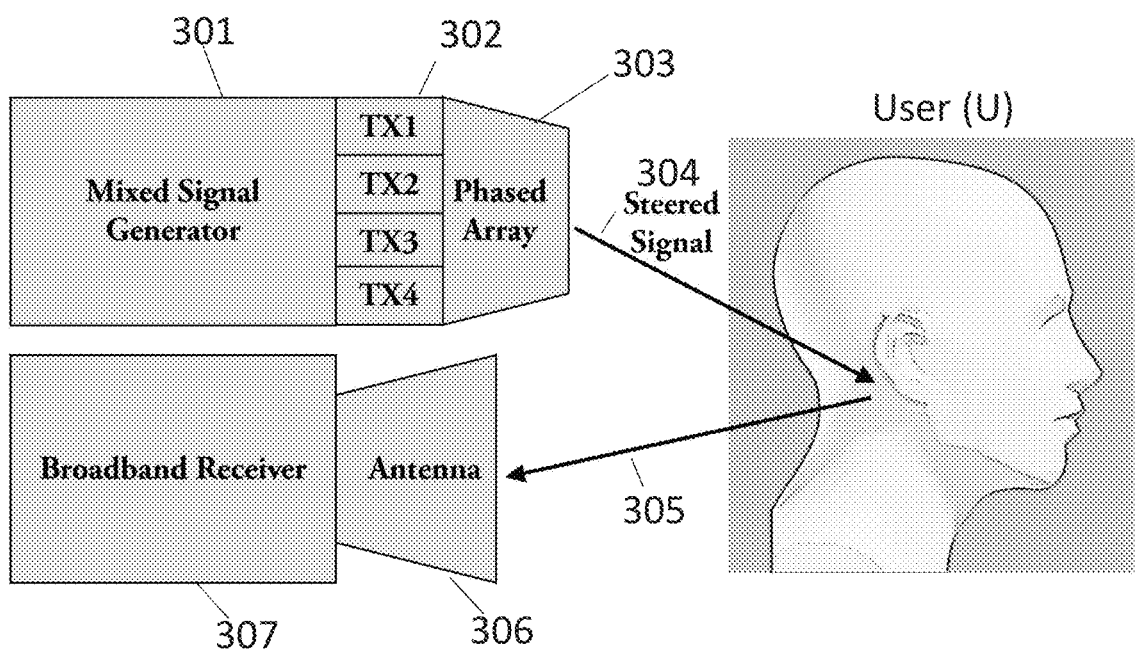
FIG. 3 illustrates a phased array concept image comprising a mixed signal generator, 4×TX, Phased array for steered signal, recorded by an antenna array and passed to a broadband receiver.

In some cases, a silent speech system may comprise a phased array for signal steering. In some cases, a set of transmitters may be configured to emit one or more radio waves at multiple frequencies to form a phased array for signal steering. FIG. 3 illustrates a schematic of a non-limiting example of a radar-based SSI 300 comprising a phase array 303. The radar-based SSI 300 may comprise a mixed signal generator 301 coupled to one or more transmitters (TX) 302 forming a phased array 303. In some cases, a phased array may comprise at least 4 transmitters (TX). For example, the phase array may comprise at least 6, 8, 12, 18, or 20 transmitters (TX). In some cases, the phase array may comprise less than 4 transmitters (TX). For example, the phased array may comprise 2 or 3 transmitters (TX). The phase array 303 may be configured to generate a steered signal 304. The steered signal 304 may be directed to target one or more speech articulators of a user (U). The radar-based SSI 300 may further comprise an antenna 306 configured to receive a transmission and/or reflected signal 305. The received signal 305 may be delivered to a broadband receiver 307 coupled to the antenna 306.

Figure 4:
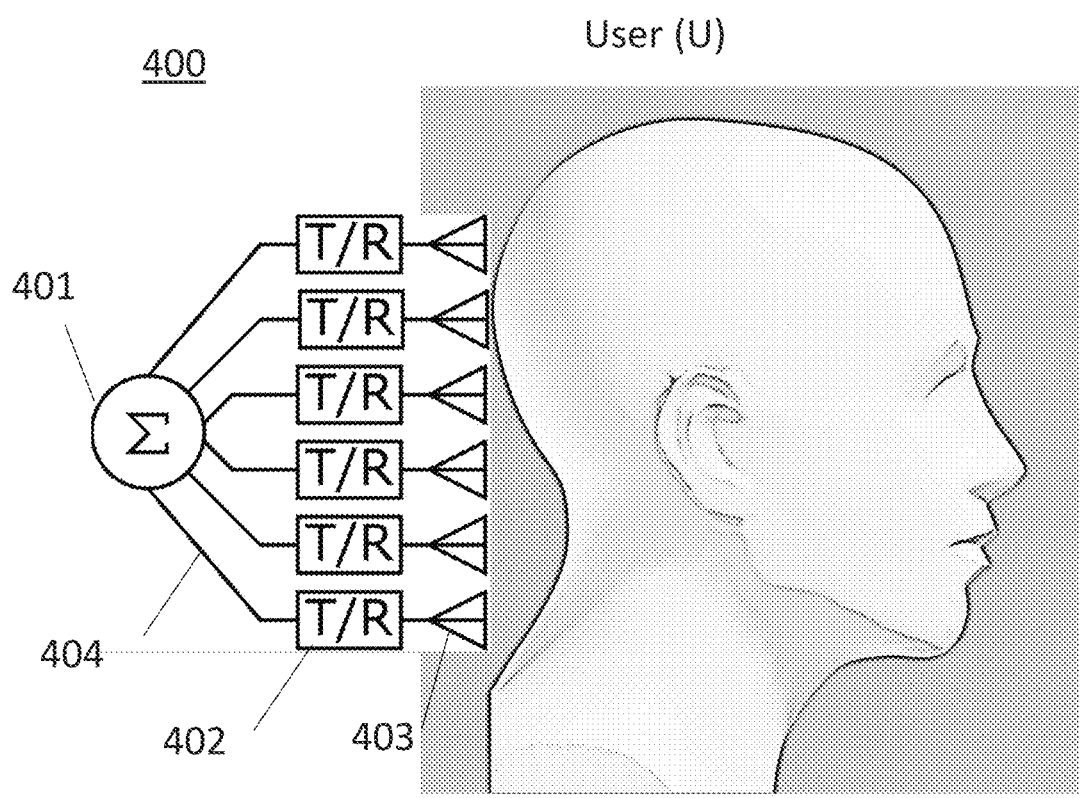
FIG. 4 illustrates Active Electronic Scanned Array for silent speech detection.

In some cases, a system for silent speech detection may comprise an electronic scanned array (ESA). In some cases, the electronic scanned array may comprise an active electronic scanned array (AESA), a passive electronic scanned array (PESA), or both. FIG. 4 illustrates an example of an AESA 400 for silent speech detection. The AESA 400 may be configured to electronically steer the beam of a signal in any direction without physically moving the antenna 402. The AESA comprises an array of antennas 403 each with a separate feed 404. The beam may be steered electronically by controlling a phase of the radio waves transmitted and received by the transmitter and receiver module (T/R) 402 of each of the multiple antennas 403.

In some cases, one or more transmitters, receivers, or T/R modules 402 may each comprise at least one of a duplexer, an isolator, a limiter, amplifiers, a phase shifter, an attenuator, or any combination thereof. The duplexer may be configured to allow the antenna 403 to both transmit and receive radio signals. For example, the duplexer may be a ferrite circulator or a SPDT switch. The limiter may be configured to prevent damage to an amplifier of the T/R module during transmit or whenever stray radiation is present. In some cases, a limiter may provide a termination to the circulator during transmit, wherein the limiter may be configured to absorb power that reflects from the antenna 403. Significant power may be reflected at large scan angles. The amplifiers may comprise one or more low noise amplifiers, one or more high power amplifiers, or both. The phase shifters may be configured to supply incremental phases to each antenna 403, wherein the incremental phases applied to the signal of each feed 404 drive the beams emitted from each antenna 403 in different directions. In some cases, a phase shifter may be configured to tune the phase of a signal over a range of 0-360 degrees. The attenuator maybe configured to add an amplitude taper across the array. In some cases, the attenuator is mainly applied to the receiver. This may help reduce sidelobes. The attenuator may be configured to further align amplitudes of signals from of each individual antenna 403.

Figure 5:
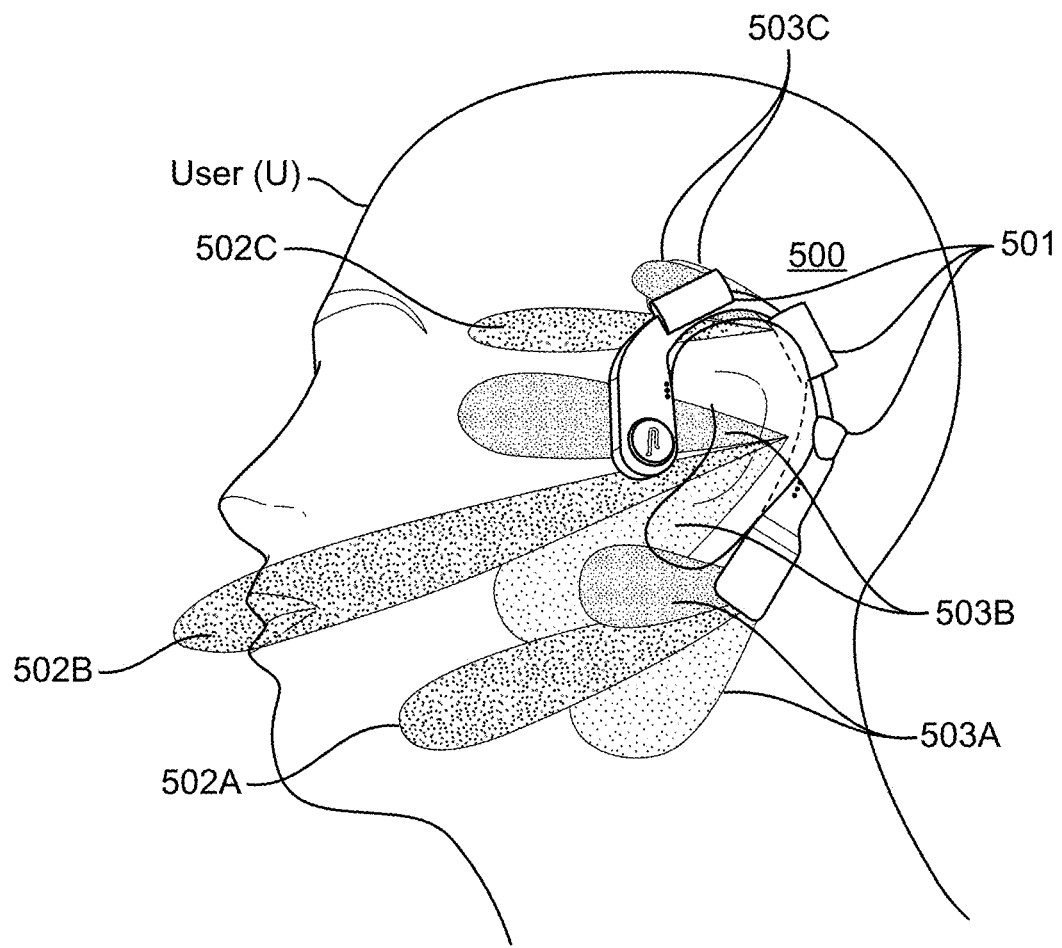
FIG. 5 illustrates a system with many small coil antennas around the ear, to image greater parts of head.

In some cases, a system for silent speech may comprise one or more 3D antennas. The one or more 3D antennas may be configured to support multiple wavelengths with differing lobes as illustrated in FIG. 5. The exemplary SSI earpiece 500 comprises multiple antennas 501 integrated into the SSI earpiece 500. The antennas 501 are located at different locations on the earpiece 500 and configured to emit radio signals having different lobe sizes, shapes and direction. The first main lobe 502A and sidelobes 503A are short and wide and directed and shaped to target the lower jaw and vocal cords of the user (U). The second main lobe 502B and sidelobes 503B are long and narrow and directed and shaped to target the lips of the user (U). The third main lobe 502C and sidelobes 503C are short and narrow and directed and shaped to target the nasal cavity of the user (U). In some cases, a system for silent speech may comprise one or more 3D antennas configured to enable multiple resonant frequencies. For example, the one or more 3D antennas may be configured to enable resonant frequencies such as 2, 3, 5, 7, 10, 12, 15, 25 GHz, or more.

In some cases, a silent speech system may be configured to dynamically adjust a position and location of one or more antennas. In some cases, dynamically adjusting and positioning one or more antennas may improve detection and measurement of speech articulator activity for one or more target speech articulator structure. In some cases, a system for silent speech detection comprises a controller configured to control the radio waves, also referred to as RF signals throughout the specification, emitted and received by one or more antennas. In some cases, a method for silent speech may comprise using closed-loop beam-steering to target movement of the speech articulators. In some cases, a method for silent speech may comprise using an adaptive adjustment of per-antenna antenna transmission phase to maximize synchronicity of phase on the receiving antenna. In some cases, a method for silent speech may comprise using beamforming on receiving antennas to recover spatial or angular information.

In some cases, the controller may control the physical location and position of one or more antenna. The controller may be configured to dynamically adjust the position and location of one or more antenna. For example, the controller may rotate a transmitter to change the emission angle in response to the SSI earpiece shifting while a user is running. This may allow the SSI earpiece to maintain or recover sensing of a target speech articulator when an antenna location is inadvertently moved. In another example, a controller of a silent speech detection system may move one or more receivers from a location under the ear to a location above the ear in response to a user using an object that interferes with the receiver's ability to receive reflected radio signals, e.g., earrings. This may help avoid interference from external objects such as the earrings that may block or interfere with sensing of a target speech articulator. In some cases, a method of silent speech detection may comprise providing a user with dynamic placement feedback. For example, the system may provide feedback comprising a notification to the user if they need to readjust the placement on the ear. In some cases, dynamic placement feedback may be based on calibration sensing.

Figure 6:
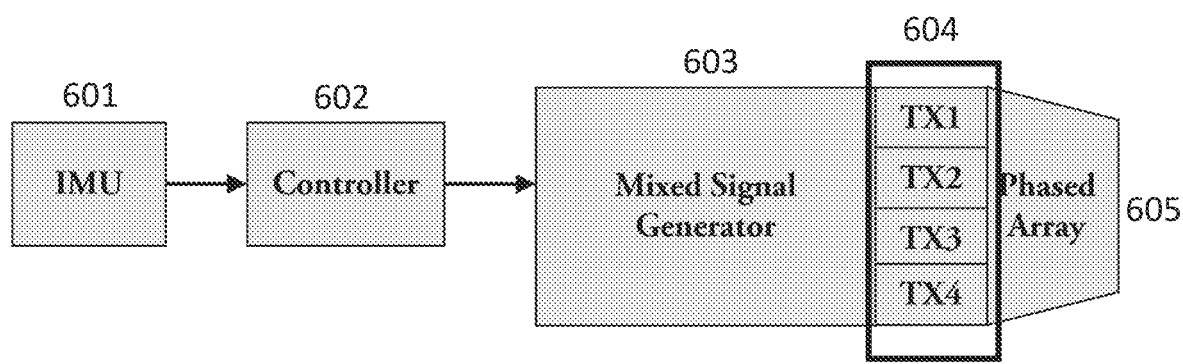
FIG. 6 illustrates user-motion compensation using IMU to control and stabilize a radar beam.

In some cases, a system for silent speech may comprise a controller configured to control the shape and direction of a beam from a phased array. In some cases, the controller may be configured to dynamically adjust or steer a beam. For example, the controller may be configured to control one or more frequencies emitted by one or more transmitters. In another example, the controller may be configured to control one or more phase effectors of one or more antenna of a phased array. The controller maybe configured to dynamically shape and steer one or more radar beams for targeting one or more speech articulators of a subject in response to one or more received signals. In some cases, the controller may be configured to receive environmental data, user data, or both. The controller may be configured to dynamically adjust the shape and steer one or more radar beams based on environmental data, user data, or a combination thereof. In some cases, the controller may be configured as a closed loop system for dynamic beam steering. For example, FIG. 6 illustrates an example of an SSI 600 comprising an inertial measurement unit (IMU) 601 coupled to a controller 602. The IMU 601 may measure the movement and position of the SSI, the user, or both. In some cases, the IMU may include but is not limited to one or more accelerometers, one or more gyroscopes, one or more magnetometers, or a combination thereof. The IMU 601 may deliver location and motion data to the controller 602. The controller 602 may dynamically control the phased array 605 based on the motion data provided by the IMU 601. For example, the controller 602 may dynamically adjust the direction and stabilize the beam in response to user motion sensed by the IMU 601 to maintain sensing focused on one or more target speech articulators. In some cases, the controller may control frequencies generated by the mixed signal generator 603 to control and steer the beam of the phased array 605. In some cases, the controller may control frequencies emitted by each transmitter (TX) 604 of the phased array 605. For example, the controller 602 may initially control TX1 and TX4 to emit a lower frequency than TX2 and TX3, then after a user moves their head, the controller 602 may control TX1 and TX2 to emit a higher frequency signal than TX3 and TX4 to maintain sensing of a target speech articulator. In some cases, the controller 602 may adjust or tune one or more adjustable phase shifters to control and steer the beam of the phased array 605. The controller 602 may stabilize the radar beam of the phased array 605 and compensate for a user motion based on the sensed motion data using a combination of the exemplary methods described above. In some cases, a controller may be configured to stabilize a radar beam in response to environmental changes, external factors, and user motion or a combination thereof. For example, the controller may stabilize the radar beam in response factors including, but not limited to, skin contact, perspiration, muscle tension, (facial) hair, the presence of makeup and skincare products, hydration levels, skin conditions, or a combination thereof. In some cases, a system for silent speech may comprise an array of antennas configured to dynamically steer and target the one or more radar beams at the one or more speech articulators as the subject is engaging in speech or about to engage in speech.

In some cases, a method for silent speech detection may comprise using 3D antennas for intra-body sensing. In some cases, a method for silent speech detection may comprise using 3D antennas for radar-based spatial scanning of speech articulators. The use of 3D antennas may be advantageous in that they may shrink the surface area and enable a small form factor for consumer use. 3D and fractal antennas may create a large electrical length in a small physical shape. For example, the large electrical length of the antenna may be up to ¼ (qtr wave antenna) or ½ (electrical length of a dipole). In some cases, methods of radar-based SSI may comprise using 3D antennas. The 3D antennas may allow the SSI to have an improved form factor. For example, using 3D antenna may allow for a miniaturized form factor of the SSI system. In some cases, the radar-based SSI systems as described herein may further comprise utilizing device miniaturization to make compact SSI systems. For example, any SSI system as described herein may be configured as a compact earpiece system as illustrated in FIG. 1. In some cases, a method for radar-based SSI may comprise using 4D antennas. In some cases, a method for radar-based SSI may comprise using a 4D imaging radar to simultaneously sense multiple static and dynamic objects.

The 4D antennas may comprise one or more offset antennas configured to separate detection in the elevation level. This may allow for localization in a 3D environment.

In some cases, any system or method for silent speech as described herein may comprise waveguide(s) for filtering pathways between TX and antennas to a desired frequency bandwidth. In some cases, any system or method for silent speech as described herein may comprise tunable waveguide(s) for filtering pathways between TX and antennas to a desired frequency bandwidth. For examples, the waveguides may be configured to filter the signals to have a desired frequency bandwidth in the range of 1-12 GHz. In some cases, the waveguide(s) may be tuned to allow 1 MHz-40 MHz bandpass. In some cases, tunable waveguide(s) may be implemented as a metamaterial waveguide. For example, a tunable waveguide may comprise a metamaterial silicone waveguide. In some cases, any system for silent speech may comprise a plurality of metamaterial antennas, metasurface antennas, or a combination of both, for covering a broader frequency range in smaller form factor. In some cases, any system or method for silent speech as described herein may comprise simple slotted waveguide antennas.

In some cases, a system for silent speech detection may comprise one or more antennas and one or more additional sensors. In some cases, the additional sensor may be configured for one or more different sensing modalities. For example, an additional sensor may be configured for sensing audio signals, electrical sensing, chemical signals, thermal signals, or mechanical signals. In some cases, additional sensors may include, but are not limited to, cameras, ultrasound, sEMG, EEG, MEG, fMRI, spectroscopy, accelerometers, audio recorders, heartrate monitors, pressure sensors, or a combination thereof. In some cases, a method for silent speech detection may comprise using additional sensor data to enhance or supplement radar data. In some cases, an additional sensor may be integrated into the SSI form factor comprising one or more antennas. For example, an SSI earpiece system may comprise at least an audio recorder, an accelerometer, or the like. In some cases, an additional sensor may be implemented as separate sensing element located remote from the SSI form factor. For example, a phone camera may be used to record a user wearing an SSI earpiece and configured to transmit the video to the silent speech system. The system may use video and audio data provided by the remote camera to provide additional speech articulator data and context to the system to help decode the radar data collected by the SSI earpiece.

In some cases, an additional sensor may comprise a microphone, a bone conduction sensor, an inertial measurement unit (IMU), an accelerometer, or an electromyography (EMG) sensor. In some cases, the additional sensor may be used to detect whether a user is attempting or starting to speak. In some cases, the additional sensor may be used to turn RF sensing on or off depending on whether the user is starting to speak.

In some cases, an additional sensor or radar may be used to detect whether a user is using the silent speech system. To prevent interference between the silent speech system and other devices, it may be necessary to turn broadcasting of the silent speech system off when not in use. A sensor may be used to automatically turn off the silent speech system when not in use.

In some cases, a method for silent speech detection comprises using 3D antenna radar-based spatial scanning of speech articulators. For example, the method of silent speech detection may comprise performing spatial scanning of speech articulators using a phased array, MIMO, or stepped-frequency radar for silent speech detection and decoding.

In some cases, any system for silent speech, may be configured to harvest ambient RF, transmitted RF, or both for battery charging of the SSI.

SSI Form Factor

Figure 9A:
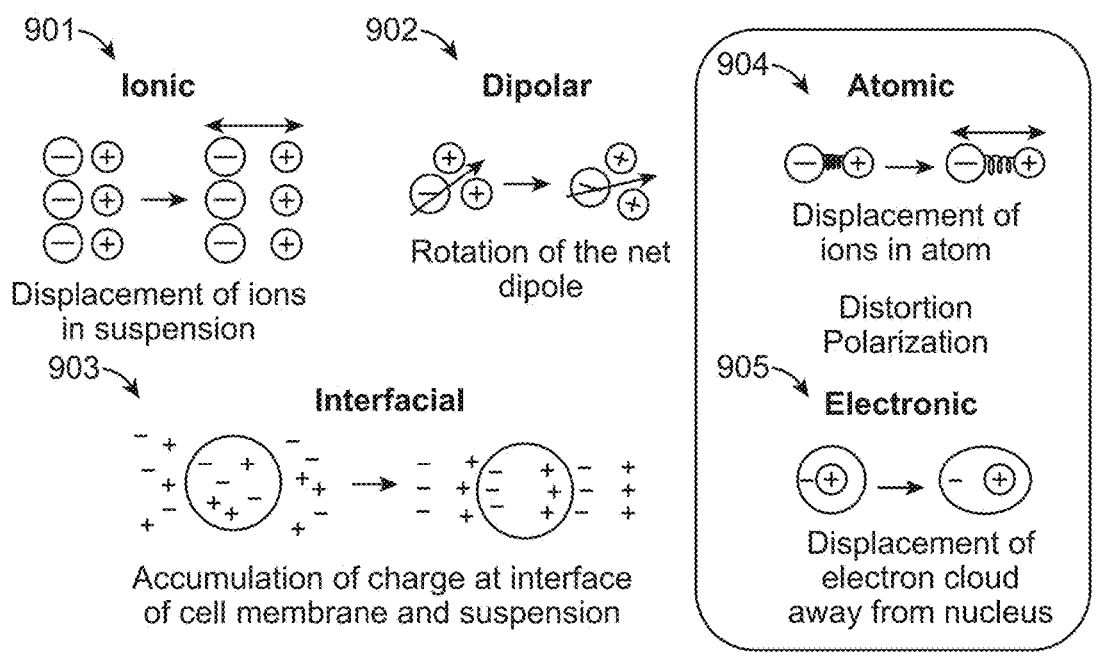
FIG. 9A illustrates how different RF bands interact with biology.

In one aspect, the present disclosure provides a silent speech interface (SSI) configured for silent speech detection and decoding. In some cases, the SSI may comprise one or more antennas. The one or more antennas may be configured to transmit and receive signals through a user's body. The signals may include radio waves. The antennas may be configured to transmit and receive signals through at least a user's head. In some examples, the signals may be transmitted and received through the head of a user. For example, the antennas may comprise one or more transmitters (Tx) configured to transmit radio waves through at least an oral cavity of the user and one or more receivers (Rx) configured to receive the radio signals transmitted through the user's oral cavity. The received radio signals may be altered by structures of the user's oral cavity. For example, the tongue or jaw may alter the emitted radio waves from the transmitter. The facial and neck tissues comprise proteins, cells, nerves, muscles, and tissues, and undergo various activities and movements which lead to changes in their relative permittivity. This property, which measures how a material becomes polarized in response to an electric field, affects the transmission and phase of RF signals. In some cases, as tissues become more polarized, they store more energy, impacting the RF transmission efficiency through these tissues, which the system described herein can measure and analyze to perform silent speech decoding. As illustrated in FIG. 9A there are various ways a user's biology may interact with the electromagnetic domain and different frequencies at which it can happen. For example, 901 of FIG. 9A shows that ionic displacement or the physical motion of charged particles (e.g., salt molecules) causes shifts in charge measurable in the below-medium-frequency ranges (Hz to kHz). For example, 1 Hz-100 Hz range, 100 Hz-1 kHz range, 1 kHz-100 kHz, 1 kHz-500 kHz range, or 100 kHz-1 MHz range. This includes salts moving inside neurons in the brain or muscle activation patterns. 903 of FIG. 9A shows that interfacial motion causes the accumulation of electric charges on cells. A cell's membrane can have a charge imbalance that can change and may be measured in the low frequencies of RF (kHz to MHz). For example, low frequencies of RF may be in the 1 kHz-10 kHz, 10 kHz-50 kHz, 1 kHz-100 kHz, 1 kHz-500 kHz range, 100 kHz-1 MHz, 1 MHz-10 Mhz, 1 MHz-50 MHz, or 1 MHz-200 MHz range.

902 of FIG. 9A shows that dipolar shifts or the rotation of polarization of molecules, which can happen physically rapidly enough to track the low-mid frequencies of RF (MHz to GHz). MRI may work at the low-mid frequencies of RF. For example, low-mid frequencies of RF may be in the, for example, 1 MHz-10 Mhz, 1 MHz-50 MHz, or 1 MHz-500 MHz range, 100 MHz-1 GHz, 500 MHz-1 GHz, 1 GHz-10 GHz, or 1 GHz-1000 GHz range. 904 of FIG. 9A shows atomic displacement involved in the stretch and compression of charged atoms in molecules and may be measured in the microwave to infrared domain (GHz to THz). In FIG. 9B, graphs 906 and 907 show electronic polarization and the movement of the electrons around single atoms, which may be measured at much higher frequencies.

In some cases, the systems and methods for silent speech decoding described herein may be configured to emit RF signals and rapidly measure multiple frequencies and analyze how RF signals are influenced by polarization types, such as dipolar and interfacial polarization. For example, the system may be configured to track and analyze simple movements like the tongue's motion from the mouth's floor to its roof, as these movements may significantly alter the relative permittivity of the RF signals along the signal path through the oral cavity. These changes in relative signal permeability may be due to the displacement of air (with a low relative permittivity of about 1) by the tongue (with a higher relative permittivity of around 45 near 1 GHz), which can affect the transmitted wave's spectrum. In some cases, the SSI may be configured to observe an impulse response of a signal for decoding silent speech, given that the impact on the wavefront varies, causing it to slow down or speed up in different areas. In some cases, the system may be configured to measure an impulse response by sending an ultra-wideband signal through a user's oral cavity. For example, the ultra-wideband signal may comprise a single impulse containing all frequencies (0-10 GHz). Changes to the biology of the user's tissue, movement of speech articulators, and other factors as described herein may then result in many delayed impulses as each part of the system responds at different times due to different frequency responses as the signal travels through the user's oral cavity. For example, as illustrated in FIG. 9C, the graph on the left 910 shows the impulse response measured in the time domain for multiple reflections/transmission events that were measured, and the graph on the right 930 shows the impulse response measured in the frequency domain, with varying frequency response magnitudes across many frequencies.

In some cases, the SSI may be a radar-based SSI, wherein one or more antennas are placed on or near the user. In some cases, the antennas may include antennas configured to emit radio waves or RF signals (a "transmitter") and antennas configured to receive radio waves or RF signals (a "receiver"). In some cases, the radar-based SSIs may work by placing one or more transmitter(s) along the face or under the chin and receiver(s) along the face, emitting an RF signal from the transmitter(s) to the receiver(s), and recording one or more signal changes. In some cases, a radar-based SSI may be configured to use wireless sensing. For example, a first SSI earpiece may be placed on a first ear of the user and a second SSI earpiece may be configured to be placed on a second ear of the user. One or more transmitters of the first SSI earpiece may emit an RF signal through one or more speech articulators of a user, wherein one or more receivers of the second SSI earpiece may receive the RF signal after it has travelled through the oral cavity of the user. The system may be configured to measure and analyze transmission spectra data of the RF signals through the oral cavity for decoding silent speech. In some cases, the system may additionally measure and analyze reflectance spectra of the RF signals reflected back in the direction of the transmitter for decoding silent speech.

In some cases, a radar-based SSI may comprise beamforming and directional antennas. In some cases, an SSI may shape how the radio waves move so that the transmitter and receiver antennas do not have to be opposite of each other. This can allow for the antenna to be placed on one or more preferred locations of a user's head. For example, a user may avoid placing antennas on the cheeks of their face. In some embodiments, the method may further comprise using the at least two directional antennas to maximize transmission of one or more RF signals through the one or more speech articulators. In some embodiments, the transmission of the one or more RF signals may be maximized based at least in part on a relative positioning between the at least two directional antennas.

Figure 27A:
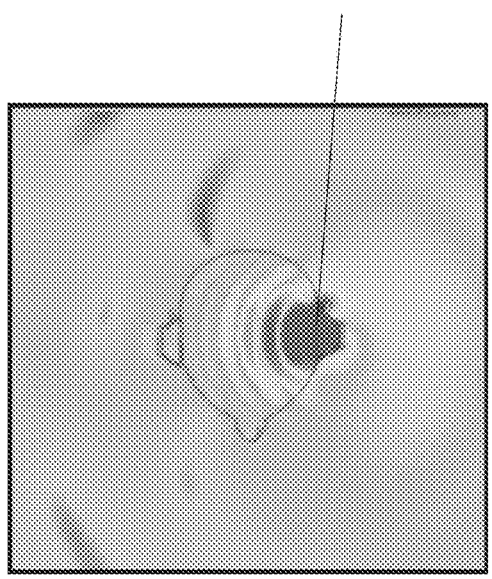
FIGS. 27A-27B show the RF field strength in the vocal tract for directional antenna vs. omnidirectional antenna.
Figure 27B:
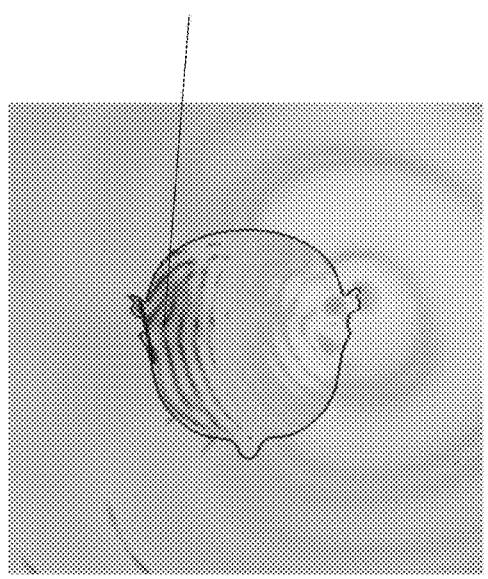

In some cases, a directional antenna may increase RF field strength in the vocal tract while reducing field strength in the air. For example, FIG. 27A shows the field strength in the vocal tract at 2 GHz when a directional antenna is used. The area of increased field strength is indicated by 2701. By contrast, FIG. 27B shows the field strength in the vocal tract at 2 GHz when an omnidirectional antenna is used. The vocal tract has a decreased field strength, the area of which is indicated by 2702.

Figure 28:
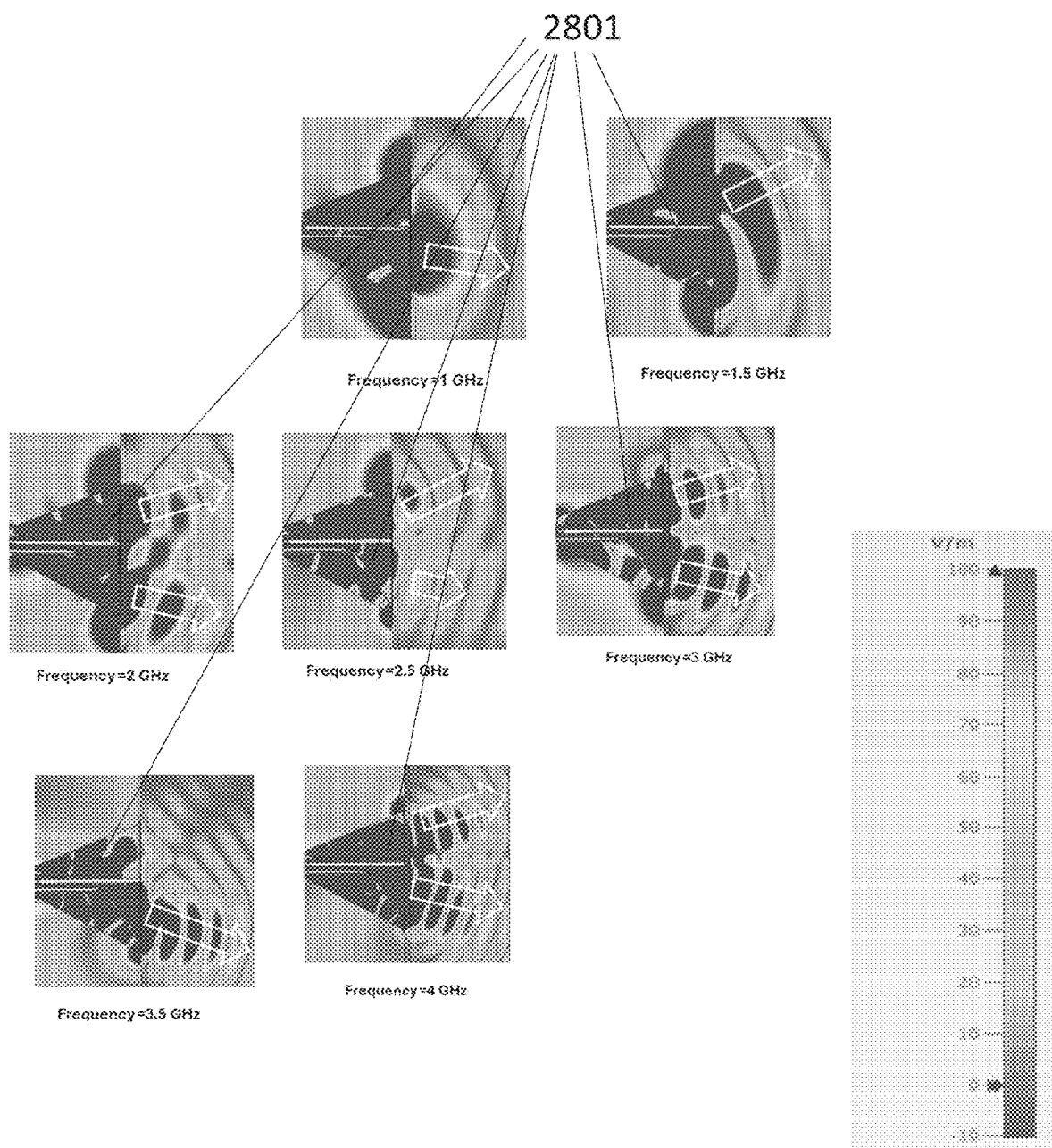
FIG. 28 shows that the orientation of a beam formed by the antennas changes at different frequencies.

In some cases, the orientation of a beam formed by the antennas may change at different frequencies. This is shown in FIG. 28. Beams at 1 GHz, 1.5 GHz, 2 GHz, 2.5 GHz, 3 GHz, 3.5 GHz, and 4 GHz are shown. These beams are oriented toward different directions at different frequencies. 2801 indicates areas of increased field strength in V/m.

In some cases, a radar-based SSI may include 3D antennas, fractal antennas, or a combination thereof. Most antennas for radar-based tracking and measuring are quite large, because they need to capture enough radio signals. 3D antennas may be considered advantageous in that they may shrink the surface area and enable a small form factor for consumer use. 3D and fractal antennas may create a large electrical length in a comparably small physical shape. In some cases, one or more antennas may be configured to create an electrical length equivalent to or smaller than one-quarter wavelength of 37.5 mm at a minimum frequency of 2 GHz.

In some cases, a radar-based SSI as described herein may include an improved form factor. The improved form factor may have a reduced size configured to be worn by a user. In some cases, an SSI form factor as described herein may be used in combination with device miniaturization to make a compact, earpiece-based system. In some cases, the SSI may be configured to have an around the ear form factor, an over the ear form factor, an in-ear form factor, or a combination thereof. The antennas may be positioned in one or more locations of the SSI.

Figure 18:
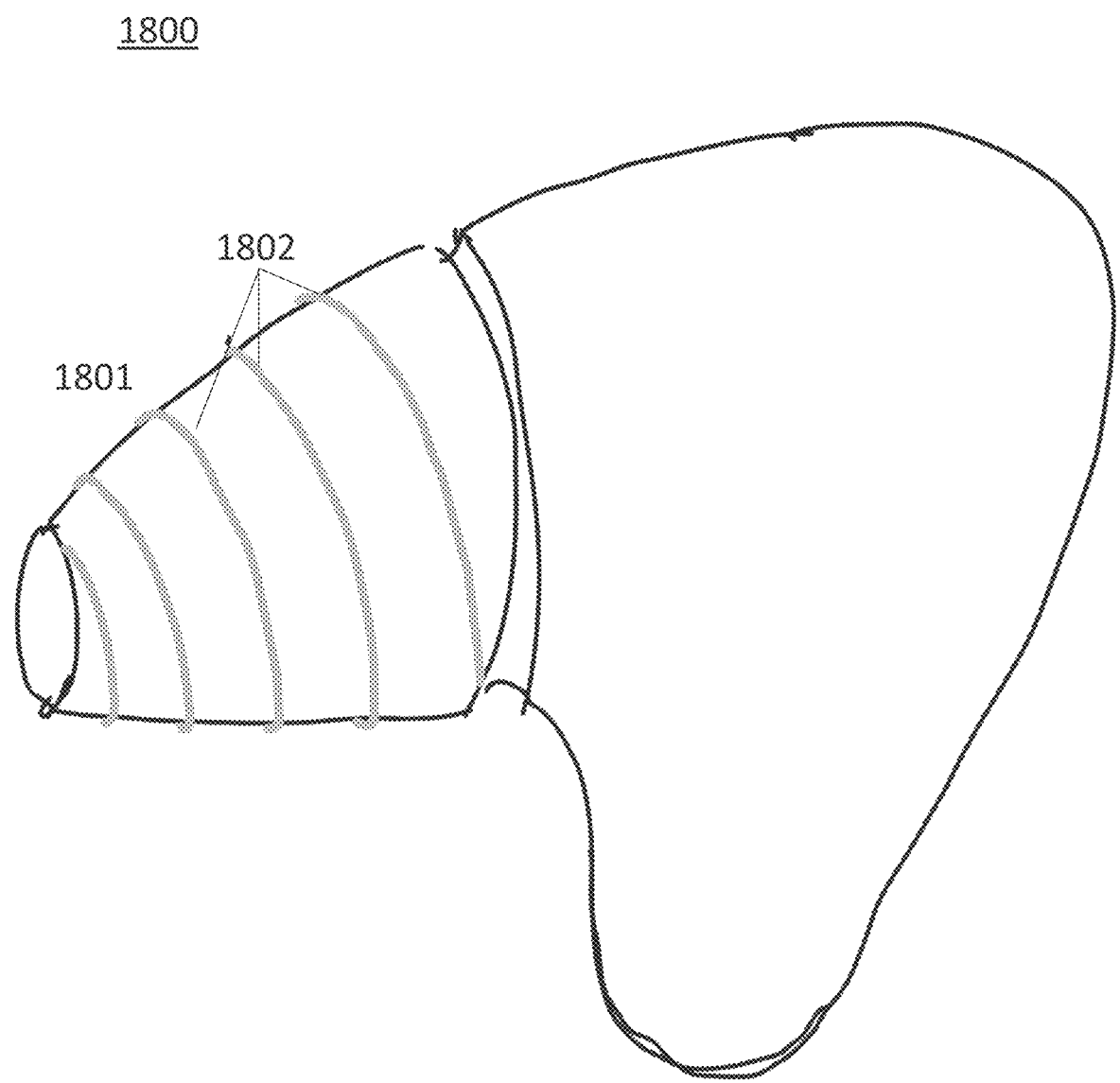
FIG. 18 illustrates a silent speech system with an ear insert element comprising a copper Archimedean spiral antenna, in accordance with some embodiments of the present disclosure.

In some cases, a system for silent speech as described herein may comprise an in-ear SSI form factor. For example, the in-ear form factor may be an earpiece comprising an earplug inserted into the ear. The in-ear earpiece may comprise an ear insert element, configured to be inserted at least partially into a user's ear. The ear insert element may be configured to be an earphone, earplug, earbud, or hearing aid-like device. In some cases, the ear insert element may comprise a spiral antenna around the ear insert element. For example, FIG. 18 illustrates an SSI earpiece system comprising a pair of in-ear earpieces 1800 (corresponding second earpiece not shown). The earpiece 1800 may comprise an ear insert element 1801. In some cases, the ear insert element 1801 may comprise a copper Archimedean spiral antenna 1802. In some cases, the ear insert element 1801 may configured to be inserted at least partially in the ear. In some cases, the ear insert element 1801 may comprise a silicone rubber tip. In some cases, the ear insert element may have a relative permeability to match the skin of the user (e.g., about 20). In some cases, the copper Archimedean spiral antenna 1802 may be disposed on the exterior surface of the tip.

Figure 14:
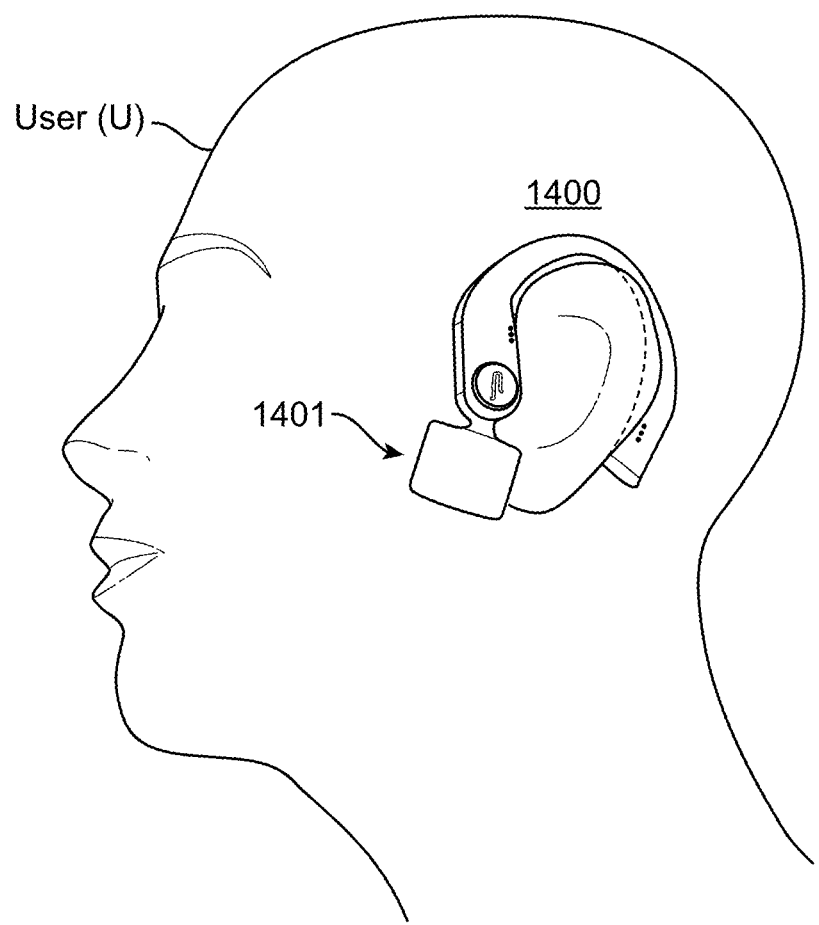
FIG. 14 illustrates a silent speech system with an antenna placement at the front of the ear, in accordance with some embodiments of the present disclosure.

In some cases, an in-ear form factor may comprise one or more implantable components. In some cases, a system for silent speech as described herein may comprise an around-ear SSI form factor. For example, FIG. 1 illustrates an SSI earpiece system comprising a pair of around-ear earpieces 100 (corresponding second earpiece not shown). In some cases, the earpieces 100 may comprise a support structure 102 coupled to the front-ear component 101, wherein the on-ear support structure 102 wraps around the back of the ear. In some cases, the support structure 102 may help secure and stabilize a position of one or more antennas 103 of the earpiece 100. The one or more antenna, 103 may be configured to emit radio waves to record one or more speech articulators, wherein the emitted radio wave defines the shape and direction of a main lobe 104 and side lobes 105. In some cases, one or more antennas may be located on the on-ear support structure 102 as illustrated in FIG. 5. In some cases, an around-ear form factor may be configured to place the antenna in front of the ear. For example, FIG. 14 shows an around-ear SSI form factor 1400 wherein the antenna 1401 is configured to be positioned in front of the user's (U) ear when worn.

Figure 11A:
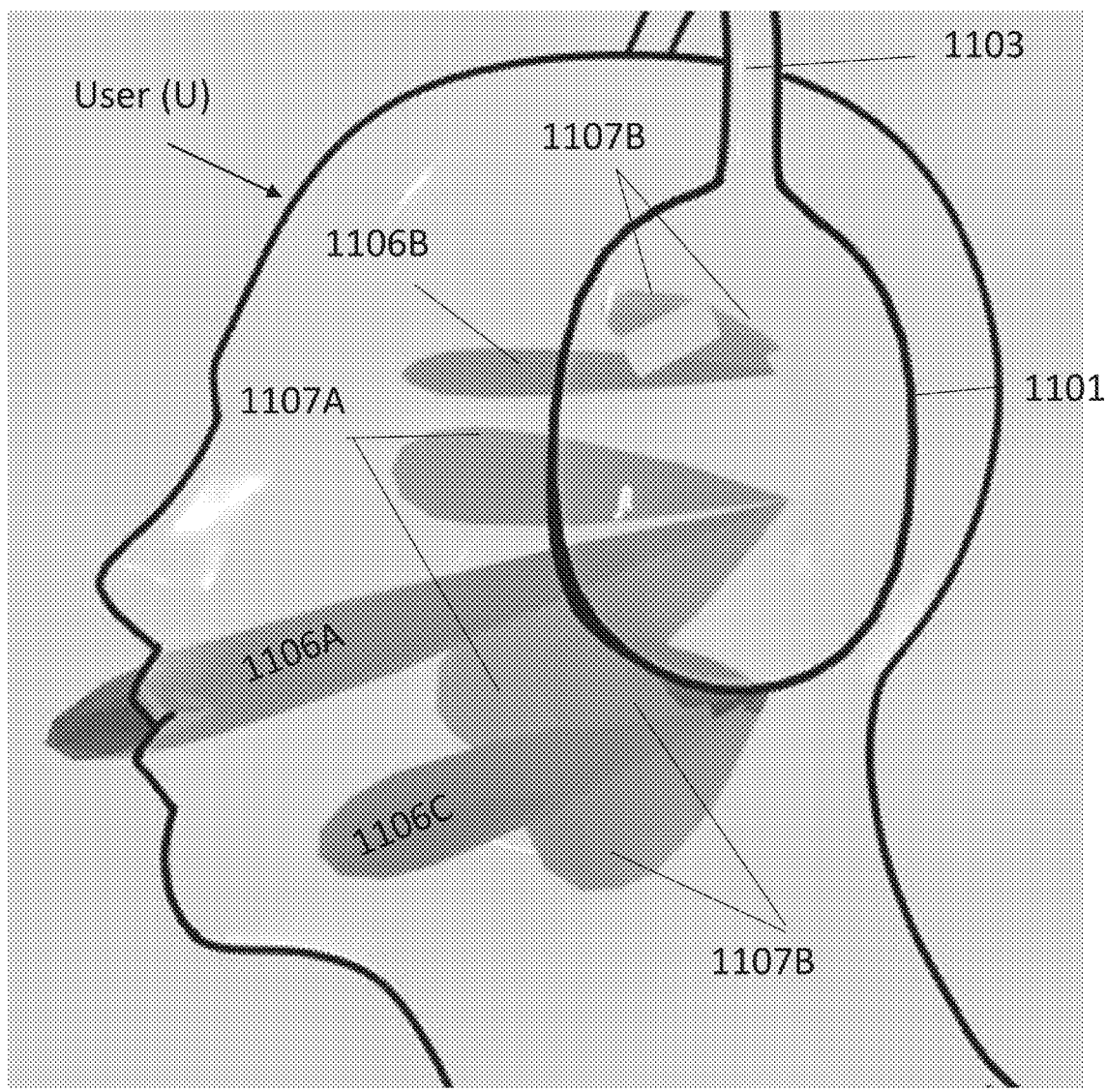
FIG. 11A shows a side view of a silent speech interface with phased-array lobes directed at speech articulators, in accordance with some embodiments of the present disclosure.
Figure 11B:
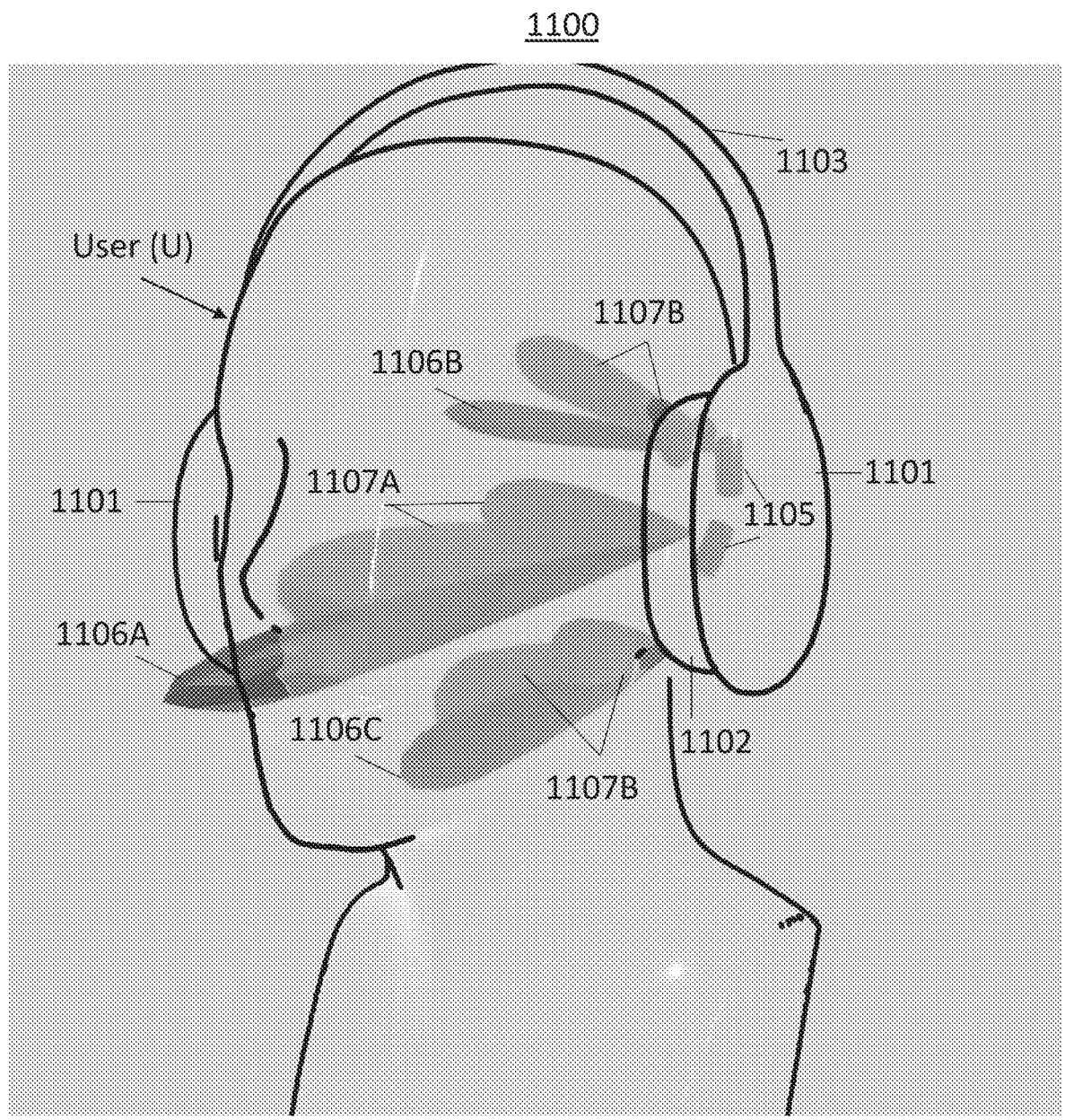
FIG. 11B shows an isometric view of a silent speech interface with phased-array lobes directed at speech articulators, in accordance with some embodiments of the present disclosure.

In some cases, a system for silent speech as described herein may comprise an over-ear SSI form factor. In some cases, the over ear form factor SSI may be configured as headset. For example, FIGS. 11A-11B illustrate an SSI headset system 1100, comprising headphone cups 1101, wherein one or more antennas 1105 are configured to be located in the headphone cups 1101 in a phased array. The SSI headset may comprise a support strap 1103 couple to the headphone cups 1101. In some cases, the headphone cups 1101, may further comprise a cushion 1102 wherein the cushion contacts the user around the ear. The cushion 1102 may comprise a soft or compressible material. For example, the cushion may comprise, but is not limited to, rubber, cloth, foam, plastic, silicone, or a compressible synthetic material. In some cases, one or more antennas may be located in or on any location of the SSI headset 1100, for example, in/on the headphone cups 1101, in/on the cushion 1102, or in/on the strap 1103. It will be understood that one or more antennas 1105 may be located and positioned in or on any other structure of an over ear or in ear SSI form factor. In some cases, an SSI system as described herein may comprise one or more antennas placed in or behind the earphone cups 1101. In some cases, one or more antennas may have a spacings of between 1-10 cm between antennas. The one or more antennas may have a spacings of less than 1 cm between antennas. The one or more antennas may have uniform spacing. The one or more antennas may have non-uniform spacing. In a non-limiting example, a first antenna may be spaced 5 cm or more from a set of antennas comprising a plurality of other antennas, wherein a set of other antennas may be spaced less than 1 cm away from one or more of the plurality of antennas in the set. In some cases, where a high dielectric constant material is used, spacings between the antenna may be further reduced. For example, the free-space wavelength at 5 GHz is 0.06 meters (60 millimeters). In a material with a high dielectric constant of 10, the guided wavelength may be reduced to approximately 0.01897 meters (about 18.97 millimeters), and the minimum antenna spacing may be about half the guided wavelength, or approximately 0.00949 meters (about 9.49 millimeters).

Figure 19:
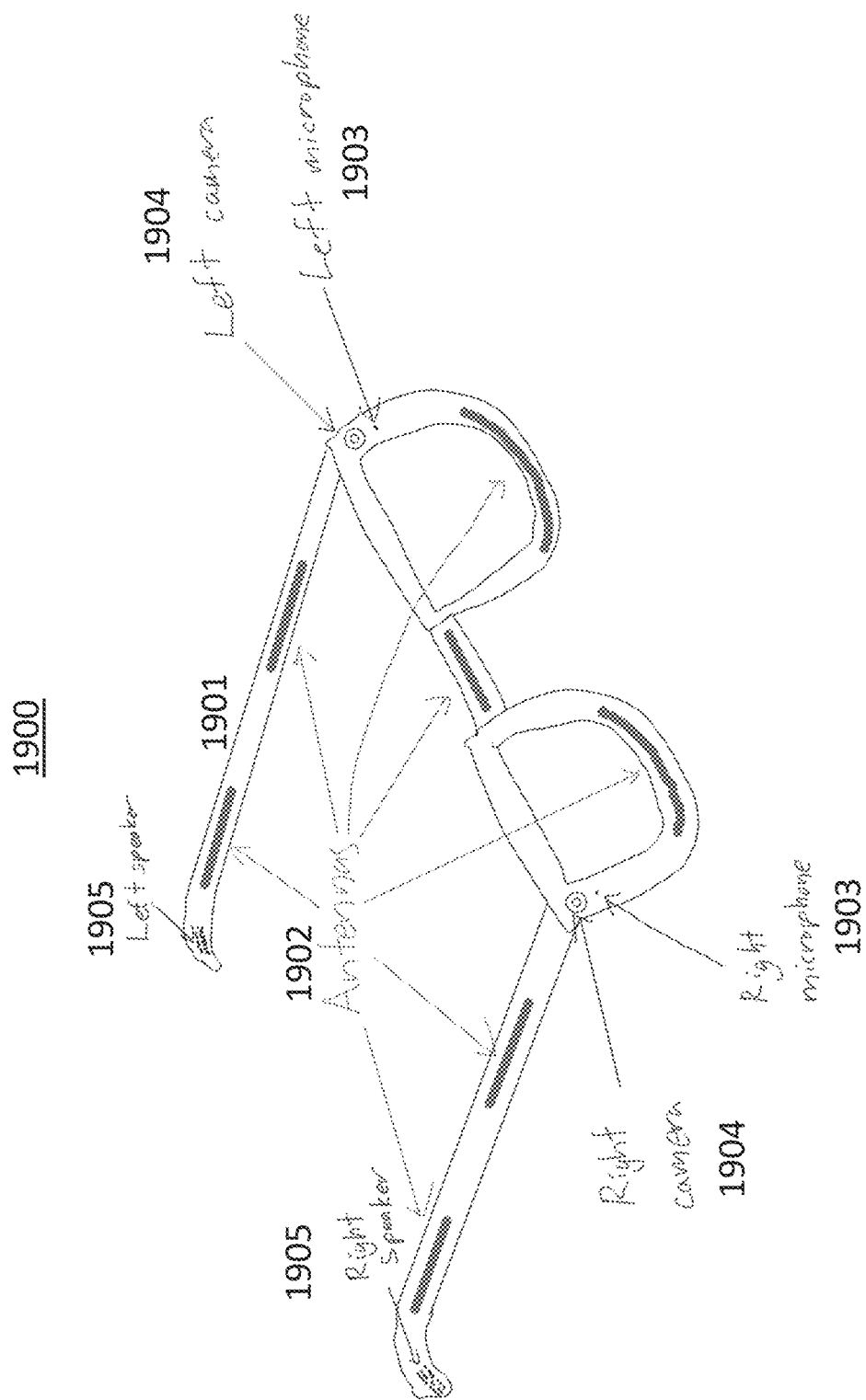
FIG. 19 illustrates a radar based silent speech system with glasses form factor, in accordance with some embodiments of the present disclosure.

In some cases, an over-ear SSI form factor may be in the form of a helmet form factor. For example, the helmet SSI may be configured as a bike helmet, a ski helmet, a motorcycle helmet, football helmet, pilot helmet, or the like. In some cases, an over-ear SSI form factor may be in the form of a hooded form factor. For example, the hooded SSI may be configured as a hoodie sweatshirt, a head covering, or the like. In some cases, an over-ear SSI form factor may be in the form of a hat form factor. For example, the hat SSI may be configured as a baseball cap, a beanie, an ushanka, or the like. In some cases, the SSI may be integrated into the frame of eyewear or glasses. For example, FIG. 19 illustrates a non-limiting example of a radar-based SSI glasses system 1900 may comprise a glasses frame 1901 comprising at least one or more antennas 1902, one or more microphones 1903, one or more cameras 1904, one or more speaker, or a combination thereof. In some cases, the one or more antennas may be integrated into the side of the frame 1901. In some cases, the one or more antennas may be integrated into rim(s) of the frame 1901, around a user's eye(s). For example, the antenna may be located above the user's eyes, below the user's eyes (as illustrated), or both. In some cases, the one or more antenna 1902 may be integrated into bridge of the frame 1901, between the user's eye(s). In some cases, the one or more microphones 1903 may be integrated into rim of the frame 1901. In some cases, the one or more microphones 1903 may be positioned in the front of the frame 1901 to allow the microphone(s) 1903 to be closer to the user's mouth. This may also make it easier for the microphone(s) 1903 to pick up sounds or words from a person the user is speaking too. In some cases, the frame 1901 may additionally comprise one or more microphone(s) (not shown) along the proximal or distal portion of the sides of the frame 1901. In some cases, one or more microphones 1903 may be located on the left and right side of the frame 1901. In some cases, the one or more cameras 1904 may be integrated into rim of the frame 1901. In some cases, the one or more cameras 1904 may be positioned in the front of the frame 1901 to allow the camera(s) 1904 to record what the user is seeing. This may also make it easier for the camera(s) 1904 to track and record the movement of a person the user is speaking too. For example, the camera may record a user's mouth to track the words being said or the person's body language to provide context information regarding the conversation. In some cases, the frame 1901 may additionally comprise one or more camera(s) (not shown) along the proximal or distal portion of the sides of the frame 1901. In some cases, one or more cameras 1904 may be located on the left and right side of the frame 1901. In some cases, the one or more speakers 1905 may be integrated into the sides of the frame 1901. In some cases, the one or more speakers 1905 may be positioned at the distal tip of the frame 1901 to allow the speaker(s) 1905 to be closer to the user's ears. This may make it easier for user to hear audio from speaker(s) 1905 and reduce the volume needed to hear the speakers. In some cases, the frame 1901 may additionally comprise one or more speaker(s) (not shown) along the proximal sides of the frame 1901 or in the rims of the frame 1901. In some cases, one or more speakers 1905 may be located on the left and right side of the frame 1901. In some cases, a user may control the volume of a right and left speaker independently of each other. This may help hearing impaired users adjust the speaker volume to best accommodate their hearing impairment. In some cases, an RBS system for silent speech may be integrated into a pair of glasses. In some cases, the glasses may comprise one or more antennas integrated into the frame, allowing for RBS for silent speech as well as gaze tracking. In some cases, the glasses may further comprise stereo cameras, microphones, or both, to allow for recording as well as integration of additional context into machine learning models. In some cases, the stereo speakers integrated into the glasses may be configured to function as headphones and allow for audio feedback.

In some cases, a system for silent speech as described herein may comprise an accessory form factor. For example, the accessory may comprise an antenna on a magnetic clip-on shirt or other clothing. In some cases, the accessory may be a head accessory. For example, a facial accessory SSI system may be configured as glasses, a headset, a mask, jewelry, or the like. In some cases, a system for silent speech as described herein may comprise an implantable form factor. In some cases, a system for silent speech as described herein may comprise an antenna on a magnetic clip-on shirt or clothing. In some cases, a system for silent speech may further comprise a wireless interface like Bluetooth or higher bandwidth like Wi-Fi to move the one or more antennas off of the underside of the chin.

In some cases, an SSI system as described herein may comprise one or more form factors used together or in combination. For example, an SSI system may comprise an earpiece SSI system, wherein one or more antennas are located in the earpiece, and a facial accessory SSI system, wherein one or more antennas are located on a necklace. The earpiece SSI and the necklace SSI may work in tandem to detect and measure speech articulator activity. In some cases, one or more receivers on the necklace SSI may be configured to receive and process signals emitted from one or more transmitters of the earpiece SSI and vice versa. In another example, an SSI system as described herein may comprise a headset SSI system, wherein one or more antennas are located in at least the headphone cups or the strap, and a hat SSI system, wherein one or more antennas are located on the back of the hat. The antennas on the hat SSI may be located posterior to one or more antennas of the headset SSI, wherein the one or more antennas of the headset SSI are configured to receive and process signals emitted from one or more transmitters of the hat SSI and vice versa.

In some cases, a position or location of an antenna of any SSI system as described here may be adjusted or changed. For example, an antenna in an earphone cup of a headset SSI may be moved from a location in front of the ear to a location behind the ear. In another example the position of a transmitter may adjusted or rotated to change the direction of radio waves emitted by the transmitter. The position may be adjusted to target or avoid one or more internal structure or to align with one or more receivers. In some cases, the position and location of one or more antennas of an SSI system worn by a user may be adjusted or changed to configure the SSI system to better transmit or receive signals of another SSI system worn by the user.

In some cases, one or more form factors may be combined or used in combination.

Figure 12:
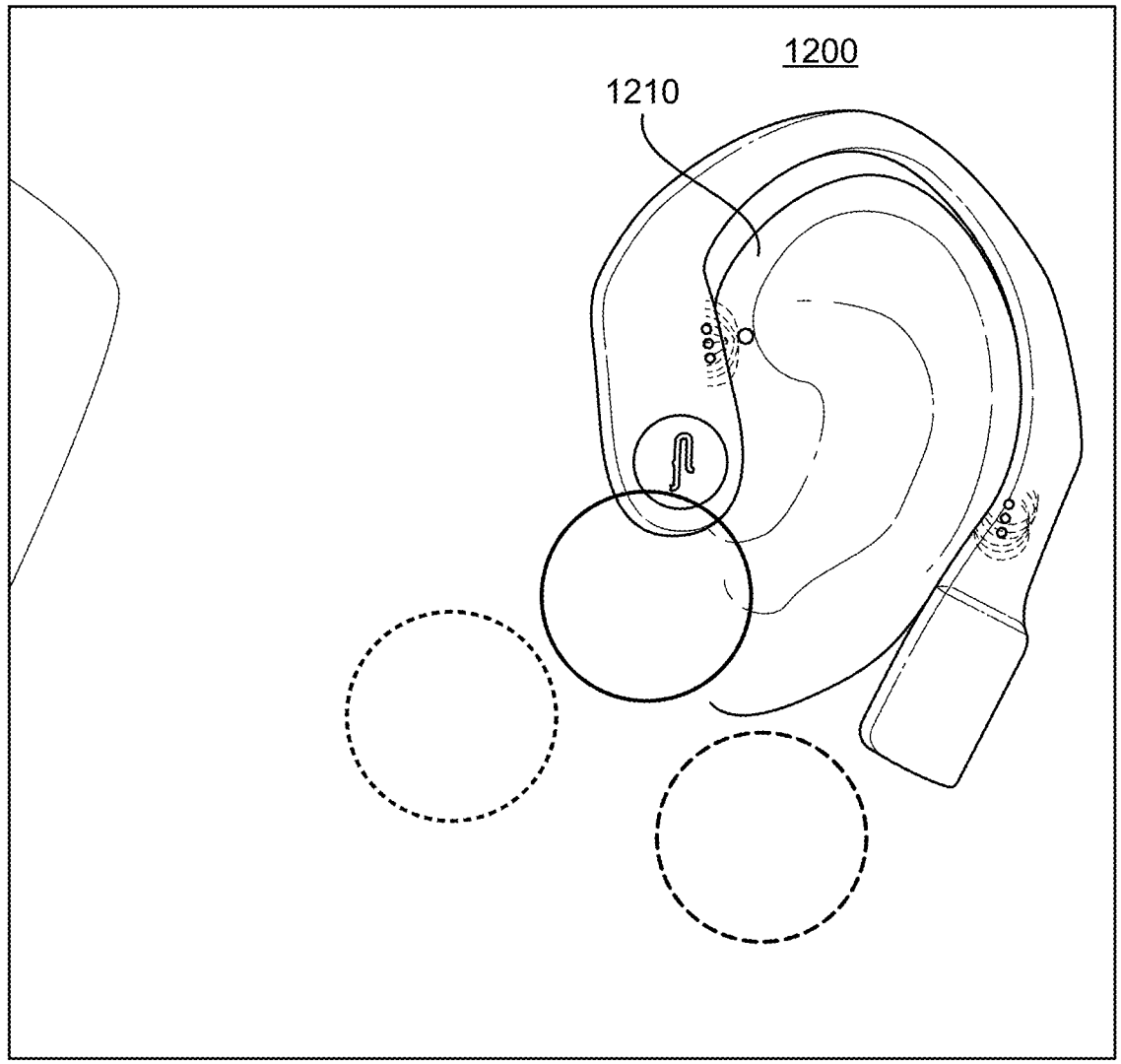
FIG. 12 illustrates a placement of a silent speech interface on a user, in accordance with some embodiments of the present disclosure.

In a non-limiting example, an over the ear form factor may use headphone cups as location for antennas in a phased array, as illustrated in FIGS. 11A and 11B. In another non-limiting example, an around-ear form factor 1200 may use a wrapped headphone band 1210 as locations for one or more antennas, as illustrated in FIG. 12.

In some cases, an SSI form factor may comprise a flexible material. For example, a flexible material may comprise fabrics, flexible plastics, rubbers, silicone, fabrics, or the like. In some cases, one or more antennas and/or sensors may be integrated into the flexible material.

In some cases, any SSI system described above may be a radar-based SSI. The radar-based SSI may be configured to detect the movement of speech articulators such as the lips and tongue without needing to be placed directly on a user's face. This may help reduce the attention and burden of the use while wearing the SSI as well as provide improved comfort during use.

Figure 13:
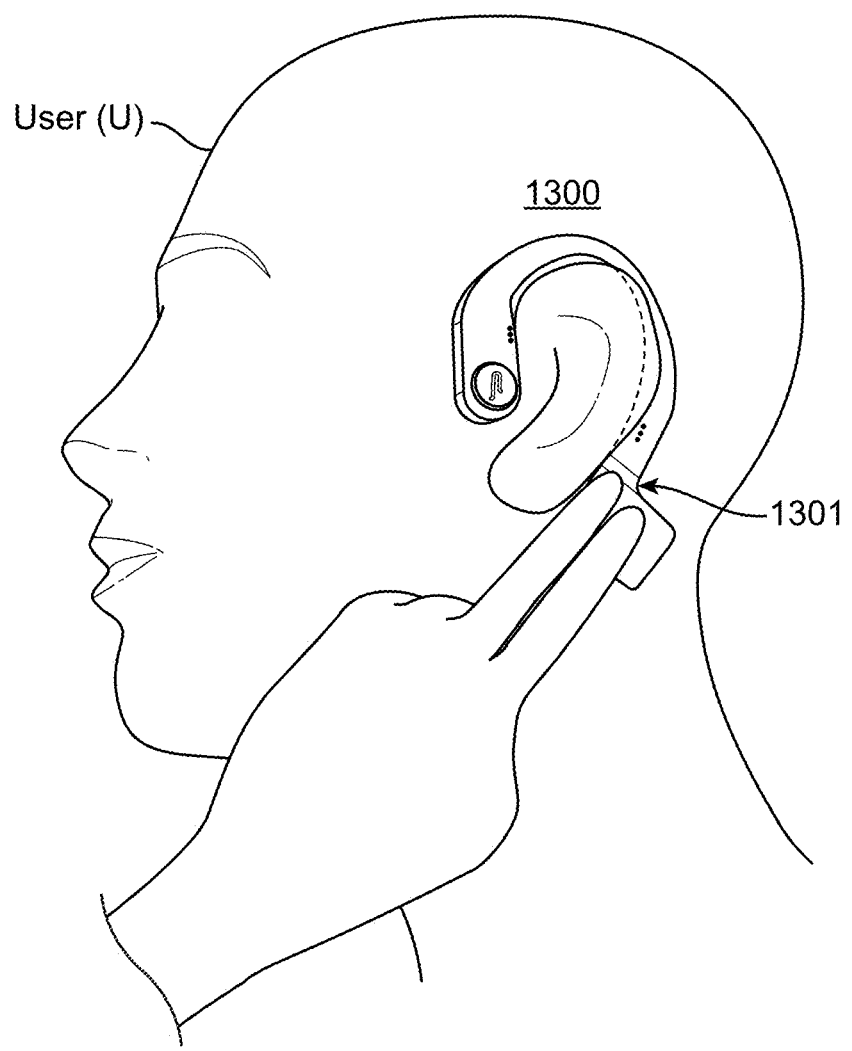
FIG. 13 illustrates a touch to engage function of a silent speech system, in accordance with some embodiments of the present disclosure.

In some cases, an SSI system as described herein may comprise a touch to engage component. For example, FIG. 13 illustrates and around ear SSI form factor 1300 wherein user may control one or more functions of the system using a touch to engage element 1301. In some cases, a user may use the touch to engage feature to turn the SSI on or off. In another example, a user may use the touch to engage feature to start or end audio recording, radar sensing, or both. In another example, a user may use the touch to engage feature to change between device modes. Changing device modes may include switching between one or more application as described later herein; changing between one or more translation languages; changing between generating a synthesized audio voice or text; or any other feature or mode of the device.

Radar

In one aspect, the present disclosure provides a radar-based SSI for silent speech detection and decoding. In some cases, the radar-based SSI methods may comprise using antennas for sensing and mapping movement of one or more speech articulators. In some cases, the radar-based SSI methods may comprise depth mapping of the vocal tract. In some cases, the method may further comprises creating per-user depth maps of the vocal tract, using reconstructed (tomography) 3D representation, and using it to tune a generated voice. In some cases, the radar-based SSI methods may comprise emitting signals and measuring reflectance properties of the signals. In some cases, the radar-based SSI methods may comprise creating a multi-path model to measure how the 3D structure of the body affects the signal. In some cases, a method of silent speech detection may comprise detecting a radar based silent speech data set and using machine learning or tomography models to recreate spatial model of the imaged area.

In some cases, a radar-based SSI may be configured as an SAR-based SSI. The SAR-based SSI may include a radar antenna array. In some cases, the radar antenna array may comprise a virtual antenna. In some cases, the virtual antenna may be an antenna and/or an antenna array configured to be simulated by a Synthetic Aperture Radar (SAR). In some cases, an SAR-based SSI may operate similarly to a phased array radar-based SSI, but instead of many parallel antenna elements, a single antenna may be configured to process multiple raw received radar signals from different geometric positions of the SSI form factor to generate coherent focused images. In some cases, the virtual antenna may be an antenna and/or an antenna array that is simulated by a multiple-input-multiple-output (MIMO) radar-based SSI. A MIMO radar-based SSI may comprise multiple transmitting antennas configured to transmit signals independently of other transmitting antennas (Tx), and multiple receiving antennas (Rx) to receive signals independently of other receiving antennas. In some cases, MIMO radar-based SSI may comprise multiple transmitting antennas M and multiple receiving antennas N to simulate a virtual array of M×N transmitting and/or receiving antennas. In some cases, a virtual antenna may be an antenna and/or an antenna array that is simulated by an SAR radar-based SSI, a MIMO radar-based SSI, or any system that includes one or more features of a SAR-based SSI and/or a MIMO-based SSI.

In some cases, the radar-based SSI antenna array may have an effective sensitivity pattern associated with the radar antenna array. The effective sensitivity pattern may be a radio wave pattern generated by the radar antenna array. In some cases, a radio wave pattern may be a pattern showing the directivity or gain of a radar antenna array as a function of azimuth and/or elevation angle. In some cases, the radiation intensity may be a function of power radiated or received by the radar antenna array per unit solid angle. A solid angle may be a unit of area corresponding to a portion of the surface area of a sphere. In some cases, a radiation pattern may include one or more lobes. A lobe may be a region within the radiation pattern where the directivity or gain of the antenna attains a local maximum value. In some cases, a lobe may be oriented in any direction ranging from 0 degrees to 360 degrees in azimuth angle and/or elevation angle relative to a pre-defined orientation of a radar antenna array.

As illustrated in FIG. 1, the effective sensitivity pattern may include a main lobe 104 and one or more side lobes 105A, 105B. In some cases, a main lobe 104 may be a lobe within the radiation pattern with the largest directivity or gain relative to other lobes in the radiation pattern. In some cases, a main lobe 104 may indicate the presence of a target speech articulator in a direction that the main lobe 104 is oriented. A side lobe 105 may be any lobe that is not a main lobe 105. In some cases, a side lobe 105A, 105B may represent a region of unwanted or unintended radiation. In some cases, a side lobe 105A, 105B may be an aliasing side lobe. An aliasing side lobe may be a side lobe with a directivity or gain that approaches the magnitude of the directivity or gain of a main lobe 104 due to aliasing effects during signal sampling. In some cases, aliasing effects may be distortions or artifacts created when a signal is reconstructed from sample signals. For example, aliasing may include spatial aliasing and/or temporal aliasing. Spatial aliasing may include the degradation of image shapes, definitions, and/or details that occurs due to limited spatial resolution. Temporal aliasing may include strobing or flickering effects that occur in an image due to limited temporal resolution.

In some cases, a method for silent speech detection comprises using 3D antenna radar-based spatial scanning of speech articulators. For example, the method of silent speech detection may comprise performing spatial scanning of speech articulators using a phased array, MIMO, or stepped-frequency radar for silent speech detection and decoding. In some cases, a radar-based SSI system may comprise one or more transmitter (Tx) and one or more receiver (Rx) antennas.

In some cases, the radar-based SSI methods may comprise configuring one or more transmitters and receivers from a phased array antenna. The phased array antenna may comprise a radiating element, a signal generator, a control unit, and/or a phase shifter. In some cases, the phased array antenna may be configured to scan a radiation pattern in space by changing the current phase of each of the arranged element antennas and tracking a plurality of targets in one phase arrangement.

In some cases, multiple transmitters and receivers may be configured to form a MIMO radar. in some cases, the MIMO radar may comprise a statistical MIMO. In some cases, the MIMO radar may be configured as a beamforming MIMO. The beamforming MIMO antennas may be placed close to one another to form a beamforming array. The antenna gain of any array of an antenna is directly proportional to the number of antenna elements. Therefore, a beam forming MIMO arrangement is advantageous given that the number of elements in the virtual array of the beamforming MIMO is NTx×NRx, where NTx is the number of transmitters and NRx is the number of receivers, but the number of transmitters and receivers is only NTx+NRx. The virtual antenna formed by the beam forming MIMO arrangement may correspond to a combination of transmitters and receivers of the radar-based SSI. In some cases, each received signal from every transmitter and receiver combination needs to be multiplexed to the correct complex (beam forming) weight to steer the beam in the correct direction and at the correct angle. In some cases, a radar-based SSI method comprises one or more multipliers for multiplying the different received signals with an individual beam forming weight and a submission module for summing up the outputs of the one or more multipliers. In some cases, a radar-based SSI system may comprise NTx×NRx multipliers for multiplying every possible signal combination between each transmitter and receiver of the SSI system.

In some cases, a radar-based SSI method may comprise using a SAR-MIMO radar for sensing and mapping movement of one or more speech articulators.

In some cases, a radar-based SSI method may comprise using a Stepped frequency continuous wave (SFCW) radar for sensing and mapping movement of one or more speech articulators. For example, a radar-based SSI method may comprise using a SFCW-MIMO radar for sensing and mapping movement of one or more speech articulators.

In some cases, a radar-based SSI method may comprise using a frequency-modulated continuous wave (FMCW) radar for sensing and mapping movement of one or more speech articulators. In some cases, a radar-based SSI method may comprise using time-of-flight sensing for distance measuring and ranging of speech articulators. In some cases, a radar-based SSI method may comprise using a pulse-doppler radar for sensing and mapping movement of one or more speech articulators. In some cases, a radar-based SSI method may comprise using a pulse compression radar or pulsed radar. In some cases, a pulse compression radar or pulsed radar may be used as an alternate approach to a continuous-wave radar.

In some cases, an FMCW radar SSI system may be configured to measure the frequency difference ($\Delta f$, due to run time) between the transmitted and received echo signal for calculating the distance. In some cases, the FMCW radar SSI system may also measure the Doppler frequency (due to the Doppler effect) for calculating the speed of the object. In some cases, the FMCW radar may be configured to emit frequency modulated continuous radio waves from a transmitter antenna and receive the reflected signal from the target, a receiving antenna. The output of the receiving antenna may be given to a mixer stage of the receiver via a pre-amplifier. In the mixer circuit, a part of the frequency-modulated transmitted signal may be mixed with the received signal, producing a new signal. The new signal may be used to determine the distance and/or velocity of a speech articulator. The frequency of the new signal may be the difference between the frequency of the transmitted and received (reflected) signal. In some cases, the signal from the mixer may be output to a lowpass filter, where noise from the signal may be filtered out. For example, the noise filter from the signal may include echo signals from objects in the user's environment. In some cases, the filtered signal may pass through an amplifier or an A/D converter before being delivered to a signal processing module. The signal processing module may then calculate the distance and velocity of the object. In some cases, the radar-based SSI method may comprise using FMCW radar signal frequency modulation techniques. For example, the system may use sawtooth modulation, triangular modulation, sine wave modulation, square wave modulation, and/or stepped modulation to change the frequency pattern of the emitted radio wave.

In some cases, a system or method for silent speech may comprise one or more phased arrays. The one or more phased arrays may be configured for signal steering. In some cases, a system for silent speech may comprise one or more Rx/Tx antennas. In some cases, each Rx antenna may have a corresponding Tx antenna. In some cases, the RX/TX ratio may be 1:N, N:1, or N:N, wherein N is a number greater than 1. For example, a system for silent speech may comprise 1 TX and 2 or more RX. In another example a system for silent speech may comprise 2 or more TX and 1RX. In another example, a system for silent speech may comprise N TX and N+1 RX. Some non-limiting exemplary TX/RX ratios may include: 1:2, 1:3, 1:4, 1:5, 2:3, 2:5, 3:5, 3:10, 4:5, 4:7, 4:9, 5:7, 5:9, 6:7. It should be understood that the inverse of the presented ratio may be possible or any multiple of the exemplary ratios. In some cases, a system for silent speech may comprise a dozen or more antennas for beam shaping and angular decomposition of RF. This may be similar to Light Field technology in optics.

In some cases, a system or method for silent speech as described herein may comprising using 3D antennas to target specific speech articulators, like the lips, larynx, tongue. In some cases, a method for silent speech detection may comprise signal steering. In some cases, one or more antennas may be configured for signal steering. In some cases, a system for silent speech detection may comprise one or more steerable antenna. In some cases, a system for silent speech may control and adjust a position and location of one or more antennas. Controlling the location and position of each antenna may allow the system to change an emission or receiving direction, angle, or both for one or more antennas. In some cases, a position and location of one or more antennas may be adjusted or changed to calibrate an SSI to a user. In some cases, a position and location of one or more antennas may be adjusted or changed to target one or more different speech articulators.

Figure 8:
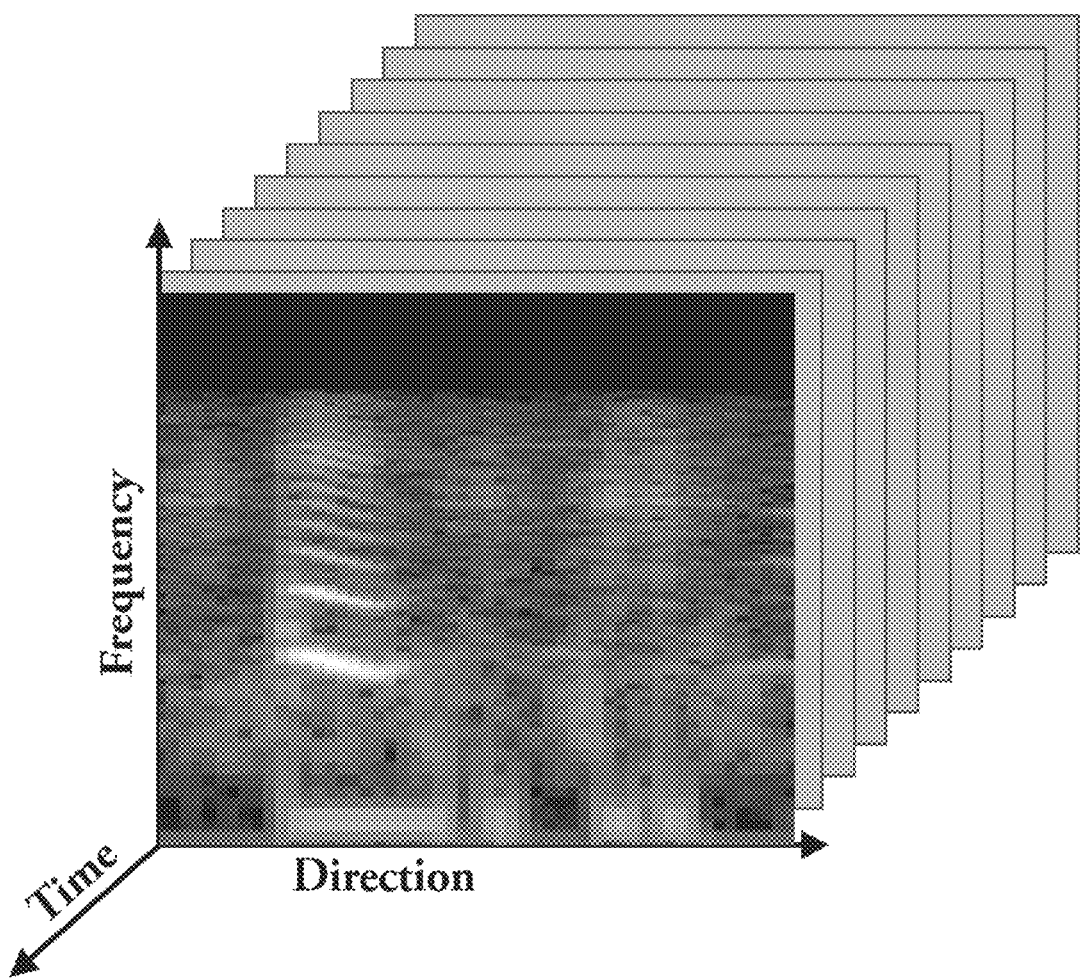
FIG. 8 illustrates collecting samples of frequency vs direction sweeps.

In some cases, a silent speech system may comprise a phased array for signal steering. In some cases, any radar-based SSI system described herein may be configured to use beamforming to target one or more target speech articulators. For example, the system may be configured for beamforming to control the direction of an emitted radio beam to target a user's lips, tongue, jaw, larynx, or any other speech articulator. In some cases, a radar-based SSI system may comprise an adaptive beamforming array. The adaptive beamforming array may be configured to dynamically control the shape and direction of an emitted radio beam to target one or more speech articulators. In some cases, a set of transmitters may be configured to emit radio waves at multiple frequencies to form a phased array from signal steering. In some cases, a radar-based SSI method may comprise using digital beamforming. For example, a silent speech detection system comprising using a MIMO radar may be configured to use digital beamforming controlling the direction of emitted and received signals. In some cases, a radar-based SSI method may comprise using analog beamforming. In some cases, a method for silent speech detection may comprise simultaneous transmission and reception of multiple RF bands and bandpass filtering for multiplexed sensing. In some cases, any system or method for silent speech as described herein may comprise using a phone or computer form factor for sensing of vocal track using dynamic beam shaping. In some cases, a method of silent speech detection comprising providing dynamic beam shaping to spatially sweep across the vocal tract. In some cases, the method further comprises creating a physical sweep in addition to a frequency sweep to generate a 3D model of the vocal tract over time as illustrated in FIG. 8. In some cases, a system for silent speech may comprise a smart surface antenna to dynamically tune wavelength and phase. In some case, the smart surface antenna, also referred to as a reconfigurable intelligent surface (RIS), comprises a surface embedded with electronic components configured to dynamically modify its electromagnetic response.

In some cases, a system for silent speech may comprise one or more waveguide(s) for restricting pathways between TX and RX antennas to relevant sensing frequencies such as microwaves. In some cases, a system for silent speech may comprise tunable waveguide(s) configured for filtering pathways between TX and RX antennas to desired frequency bandwidth. In some cases, the tunable waveguides may be configured for beam steering, beam shaping, or both. In some cases, the waveguide may be configured to reduce sidelobes of the emitted radio waves. In some cases, the one or more waveguide(s) may be implemented as a metamaterial silicon waveguide.

In some cases, a system for silent speech may comprise one or more 3D antennas configured to support multiple wavelengths with differing lobes. For example, the 3D antenna 1105 may be configured to configured to emit radio waves with a first wavelength generating a first main 1106A lobe and side lobes 1107A; a second wavelength generating a second main 1106B lobe and side lobes 1107B; and a third wavelength generating a third main 1106C lobe and side lobes 1107C.

Figure 21A:
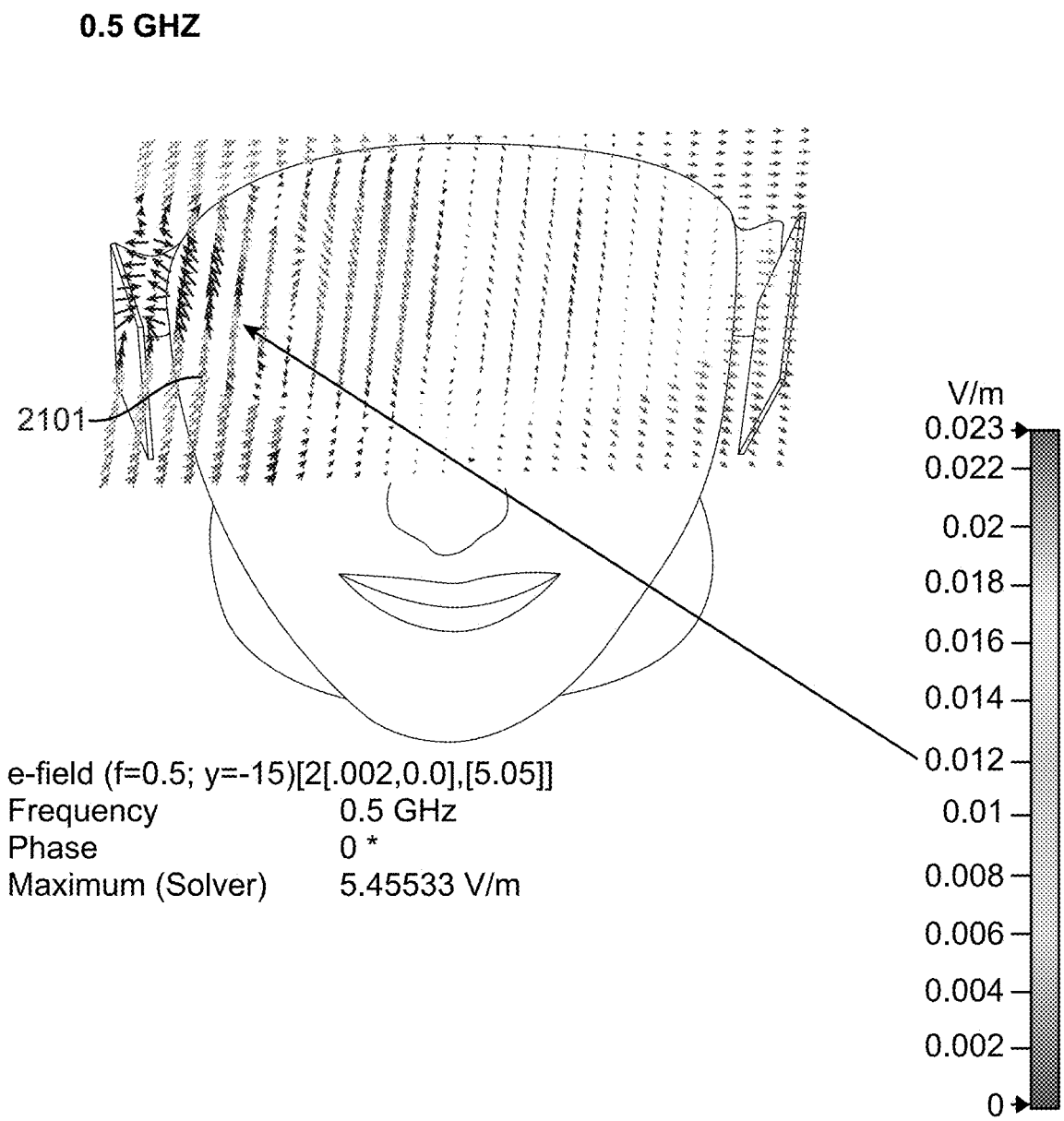
FIGS. 21A-21B illustrates a schematic showing signal propagation inside and around a subject's head at 500 MHz in accordance with some embodiments.
Figure 21B:
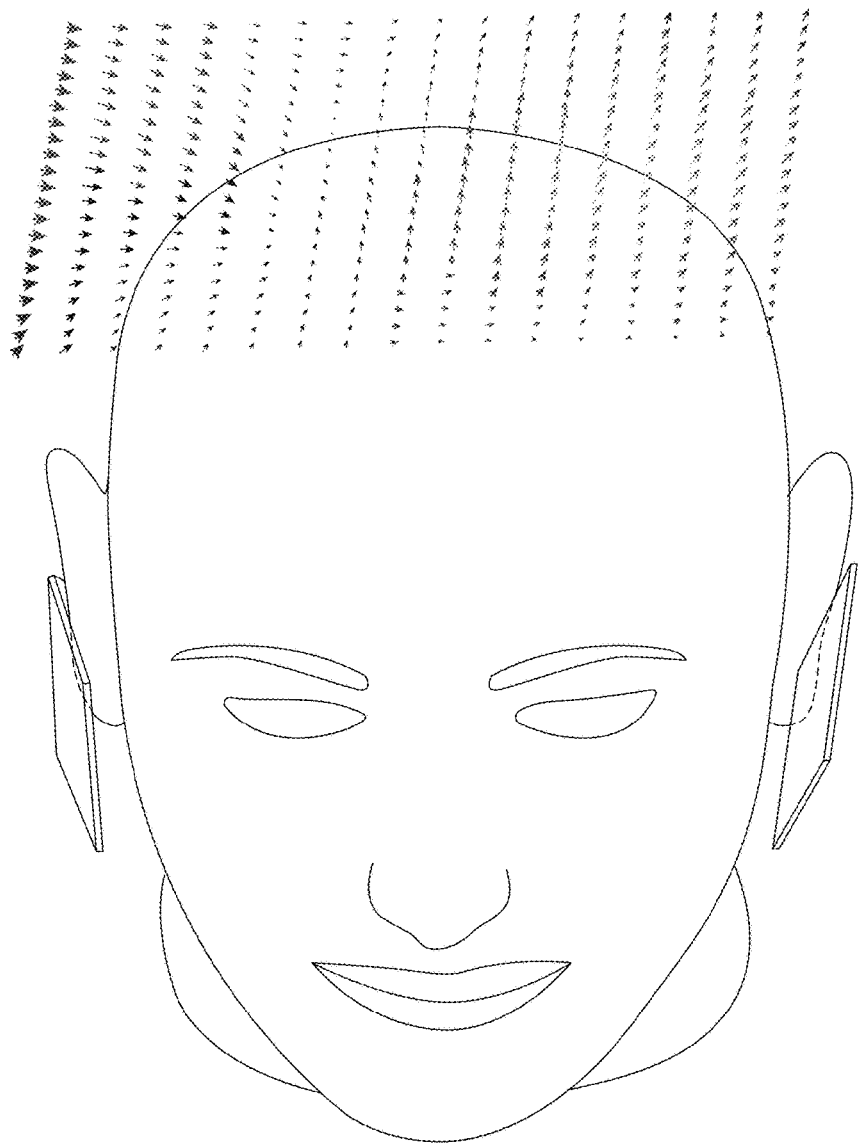
Figure 22A:
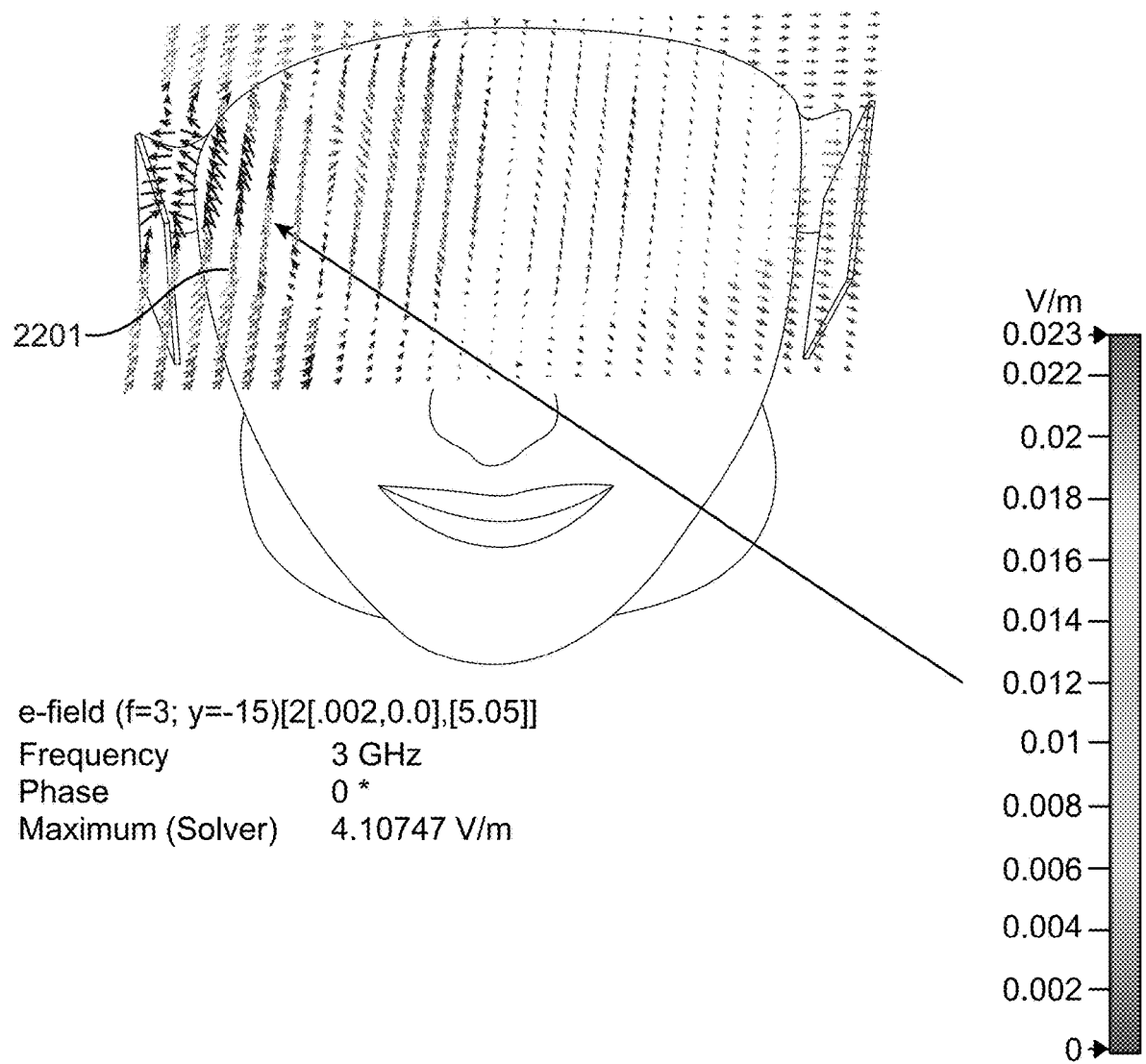
FIGS. 22A-22B illustrates a schematic showing signal propagation inside and around a subject's head at 3.0 GHz in accordance with some embodiments.
Figure 22B:
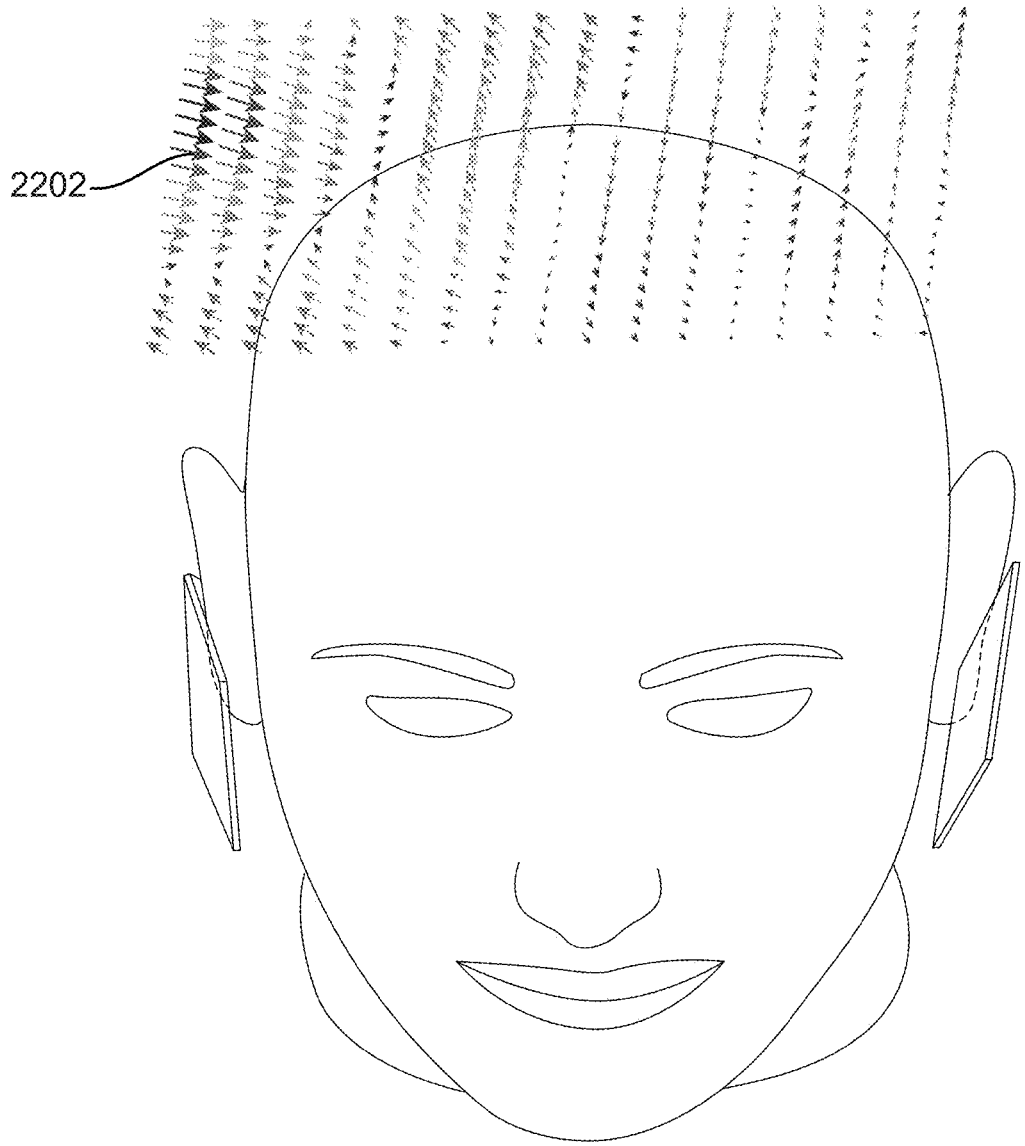

In some cases, a system for silent speech may comprise features designed to reduce unwanted contamination of the radar signals. Such unwanted contamination may comprise environmental contamination. Such unwanted contamination may comprise sounds picked up from around the head, e.g., sound that is not modulated by speech articulators. FIGS. 21A-21B illustrates a schematic showing signal propagation inside and around a subject's head at 500 MHz. At 500 MHz, the transmission path through the head may show modest strength near the receiver on the other side. 2101 indicates the area of greatest strength of signal propagation inside a subject's head, measured in V/m. FIGS. 22A-22B illustrates a schematic showing signal propagation inside and around a subject's head at 3.0 GHz in accordance with some embodiments. At 3 GHz, the RF signal through the head may be weak, and the around-the-head transmission path may dominate. 2201 indicates the area of greatest strength of signal propagation inside a subject's head at 3 GHz, measured in V/m. 2202 indicates the area of greatest strength of signal propagation around a subject's head at 3 GHz, measured in V/m. At both 500 MHz and 3 GHz, the around-the-head transmission may be significant and may result in signal strength changing due to environmental factors (e.g., reflections from the room, lifting of the arm, a bicycle helmet, a car, etc.). The presence of around-the-head transmission may motivate the use of directional antennas, absorptive materials, or other isolation techniques to reduce around-the-head transmission. Unwanted contamination may be caused by a gap between the SSI form factor and the body, e.g., an air gap. An air gap may cause reflections that distort or contaminate the RF signal due to changes in the dielectric constant. Features may be designed in the SSI system to reduce or eliminate this air gap and improve coupling of the antenna to the skin, head, or body. In some cases, a system for silent speech may comprise an antenna system configured to maximize electromagnetic coupling to human head tissue by minimizing reflection at the interface between the antenna system and the human head tissue. With an air gap, the return loss (e.g., the amount of energy reflected instead of transmitted to the intended area) may be greater than −5 dB, whereas with direct contact between the head and the antenna system, the return loss may be less than −10 dB.

In some cases, a system for silent speech may comprise one or more directional antenna, wherein one antenna is pointed at the other antenna through the head and/or vocal cavity to reduce around-the-head transmission that is not modulated by speech articulators. In some embodiments, the RF sensing device may comprise at least two directional antennas pointed at each other. In some embodiments, the at least two directional antennas may be positioned on at least two different portions of the head of the user. In some embodiments, the at least two different portions of the head of the user may comprise an auditory portion on the head of the user. In some embodiments, the at least two different portions of the head of the user may be located on opposite sides of the head of the user. In some cases, the system for silent speech may comprise an antenna headphone structure, wherein one antenna is located on one headphone and the other antenna is located on the other headphone. This antenna headphone structure may comprise absorptive materials along the sides and back of the structure. Such absorptive materials such as foam, metal sheet, metal mesh, rubberized foam, iron ball paint, Jaumann absorber, or carbon nanotubes may absorb any RF signals that propagate around the head rather than allowing those signals to transmit through the head.

In some cases, the antenna headphone structure described herein may utilize conductive or metallic barriers integrated into the headphone structure. These conductive or metallic barriers can reflect or block unwanted RF paths, minimizing environmental contamination and around-the-head transmission. For example, a flexible PCB antenna may be added above or below the padding on the ear cup. Such an antenna may be made out of, for example, silver, copper, gold, aluminum, iron, titanium, steel, brass, bronze, tin, lead, nickel, with carbon on top as a protective layer. In another example, conductive fabric may be integrated into the headphone structure. In some cases, the conductive fabric may be silver conductive fabric. In some cases, the conductive fabric may also comprise the antenna. In some cases, the conductive fabric may transfer RF from the antenna to the hair, skin, or head. In another example, a metal wire or braid may be integrated into the ear cup to serve as a loop antenna, e.g., an RF current-carrying coil that forms a loop. In some cases, the metal wire or braid may be copper. In another example, the antenna headphone structure may comprise spring-loaded metal pins or other metal components that maintain contact with the head. In some cases, the antenna headphone structure may comprise a ball joint on the antenna-containing component, which allows the antenna headphone structure to maintain contact with the head.

In some cases, the antenna headphone structure may comprise headphone earcups that use materials that match the dielectric to the head/skin such that the antenna couples to the body with minimal reflection. Such materials may include, but are not limited to, PDMS, saline agarose, glycerine, silver-doped polymer, carbon-doped polymer, PBS hydrogel, ceramic-loaded polymer, or polyurethane foam. These materials may be loaded with silver, carbon, or other materials that can modify the dielectric. Such materials may form a soft, squishy "bridge" between the antenna and the face.

In some cases, the antennas in an SSI form factor may have exchangeable covers or tips that modulate the dielectric properties to improve matching to a user's skin or head impedance. Dielectric matching may be an important factor in system performance. Improving dielectric matching between the antenna and the wearer's body may allow for improved sensing and improved system performance. Improved sensing and system performance may be seen particularly at higher frequencies, including above 1 GHz.

In some cases, the wearable form factor may comprise a graded dielectric material staircase, which may improve coupling from the antenna to the skin/hair/head. In a graded dielectric material staircase, the RF signal may pass through substrates with sequentially greater dielectric constants, until finally reaching a high-dielectric embedded antenna that is matched to the high dielectric constant of the body (an epsilon of about 50).

In some cases, an ear cup in the headphones may be used as the antenna itself. For example, the headphones may comprise ear cups made of a conductive material that is capable of being used for an antenna. In some cases, the conductive material used for an antenna may be a silicone material. In other cases, the antenna may not only be the ear cup, but may be any part of the device that touches the head. In some cases, the SSI form factor may have a structural or comfort component that can act as an antenna by incorporating conductive materials.

In some cases, a dielectric lens can be used as a static form of beam shaping. For example, a metal-dielectric-metal stack or a prismatic dielectric can be used to direct energy into the desired lobes. By designing the shape and material properties of the dielectric lens, specific beam shaping, such as focusing or spreading the beam, may be achieved. A prismatic dielectric may utilize its geometric shape and the intrinsic properties of the dielectric material to refract and reflect electromagnetic waves in a controlled manner. This refraction and reflection can steer beams in specific directions or shape them according to the prism's angular geometry.

In some cases, a loop antenna may be embedded into the part of the ear cup that goes around the speaker. In some cases, this loop antenna may be in direct contact with the face.

In some cases, the antenna headphone structure may comprise a metallic grill separating an audio driver/speaker from the antenna. A metallic grill can reduce coupling and desense. Amplifier circuits may be designed to give accurate signal gain and reproduction over a wide range of input signal levels. When the input is too strong, the amplifier may not be able to give very much gain, and the amplified signal may be distorted. This may cause the amplifier to be unable to handle weaker signals, even though the strong signal may not be on the same frequency. Having speakers in the headphones may negatively affect the antennas, and as such a microwave-like grill may be used to separate the speaker from the antenna. This grill may allow sound and air to pass through, thus allowing the speaker to work, while blocking RF fields. The grill may or may not be grounded, and may act as a ground or reflection plane for the antenna.

Figure 20:
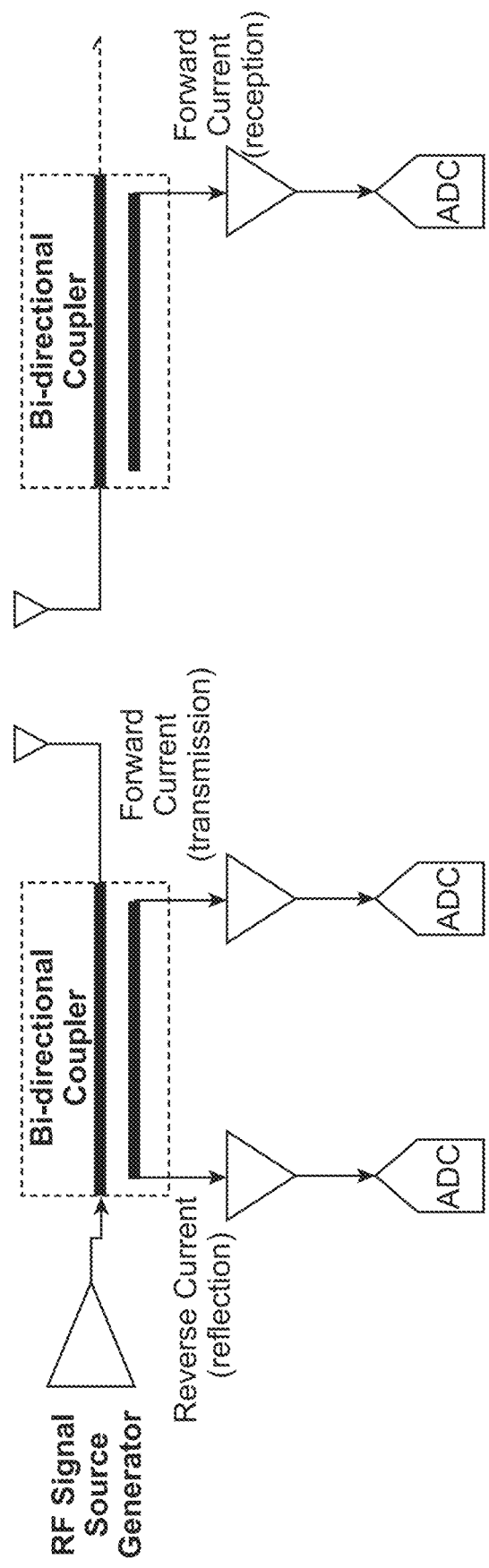
FIG. 20 illustrates a schematic for bi-directional coupler bridges used in the system described herein.

In some cases, a design based on a Vector Network Analyzer (VNA), which is an instrument that can measure amplitude and phase properties of radio waves in RF networks and is frequently used for RF design applications, may be used for silent speech detection. The design may comprise of a directional coupler bridge, which can detect emitted versus reflected power. Use of a directional coupler bridge is advantageous because it can allow the system to operate without necessitating the use of an external reference channel. FIG. 20 illustrates a schematic for bi-directional coupler bridges used in the system described herein. The left bidirectional coupler bridge in the diagram is used for generation and transmission of a signal, whereas the right bidirectional coupler bridge in the diagram is used for reception of the signal. Reverse current in the receptor bridge is assumed to be zero for the purposes of the system described herein.

In some cases, the silent speech detection system may comprise multiple frequency synthesizers configured to operate in a staggered manner, wherein at least one synthesizer is actively maintaining a specific operational frequency, while at least one other synthesizer is concurrently tuning to a subsequent adjacent frequency to that specific operational frequency. Each synthesizer may have a lock time, wherein a lock time is the period of time the synthesizer takes to reach the set frequency. The system described herein may be based on frequency hopping, e.g., frequencies are changed for every measurement step. If only a single synthesizer were used, some amount of time during measurement may be lost because of this lock time. The use of more than one synthesizer may allow the system to always have at least one synthesizer ready for use at the needed frequency.

In some cases, the silent speech detection system may comprise a communication system for maintaining optimal signal integrity across a spectrum of operating frequencies. The communication system may comprise a set of transmitters or transmission modules configured to operate over a range of frequencies, and a control unit programmed to dynamically adjust the power output of each transmitter based on the frequency of operation to achieve a substantially flat response across the given range. In some cases, the transmission power may be dynamically adjusted for each frequency to maintain signal parameters within a predefined optimal range, thereby ensuring consistent transmission quality while minimizing signal degradation due to noise floor interference or bandwidth limitations. In some cases, the system may be configured to enhance effective signal-to-noise ratio and optimize specific absorption rate (SAR) distribution across the frequency spectrum, which may improve performance in frequency bands that are susceptible to higher noise levels or require enhanced clarity.

In some cases, the silent speech detection system may comprise a selectable filter bank located between the signal generator and the antenna. This selectable filter bank may remove undesirable RF frequencies. For example, a low-pass filter may be used to remove RF harmonics, which can cause distortion in the RF signal.

In some cases, a wearable form factor may comprise a broadband pulsed radar. A broadband pulsed radar may use a large broadband pulse that samples a plurality of frequencies at the same time. For continuous wave radar, the receiver frequently needs a copy of the transmitted signal. Using a broadband pulsed radar may allow the system to not require a copy of the transmitted signal.

In some cases, a transimpedance low noise amplifier (LNA) may be used to drive an antenna coupled to greater than 50 Ohms. Human skin matching may be greater than 50 Ohms, and the output of the LNA may feed into the antenna, which allows the antenna to be matched to the LNA. A transimpedance amplifier (TIA) may be added between the LNA and the antenna to drive signals at a higher impedance value. A combined TIA and LNA may also be used. A TIA is frequently used when dealing with low impedance/small signals that need to be measured by electronics constructed to detect larger/higher impedance signals. A TIA may add a specific amplitude onto the load signal. Using a high frequency amplifier, a low impedance signal of about 50 Ohms may be converted to a voltage applied to a high-impedance-high dielectric antenna, resulting in a signal strength at the higher impedance. Because the TIA works in the voltage domain, it may effectively "auto-adjust" its output to improve transmission on any user's body, even with variability between bodies.

In some cases, a silent speech system may be created with all circuit impedance values higher than about 50 Ohms to match the skin/body, which is at approximately 80 Ohms. Creating a system like this may require custom silicon, as most chips are generally created with 50 Ohm impedance.

In some cases, power may be increased at higher frequencies to compensate for signal attenuation. Greater attenuation of signal is often seen at higher frequencies, therefore transmit strength may be increased at these higher frequencies.

In some cases, two or more synthesizers may be combined to sample two or more frequencies simultaneously. This may reduce overall frame time and increase imaging rates. Higher imaging rates may lead to better silent speech detection.

In some cases, RF frequencies may be modulated to be randomly ordered for privacy/encryption purposes. The ordering may be secure and may not be known in advance, except by the radar microcontroller on the headphones. Each user's antenna headphone device may have a separate frequency order. The frequency order can be changed dynamically by the radar microcontroller. This random distribution may make it difficult for an attacker to know which frequencies to detect to decode someone's silent speech. Such an algorithm may be similar to a Bluetooth frequency-hopping algorithm.

In some cases, phase information may be modulated in the transmission of signal (in synchrony or separately per antenna) to maximize received magnitude or signal to noise ratio on the receiver(s).

In some cases, a single pulse with varying frequency components may be used instead of an ultra-wideband pulse that covers multiple frequencies equally. This single pulse may have stronger components at more attenuated frequencies, improving overall signal to noise ratio (SNR). This may allow for better use of the limited amount of energy that can be sent into the body, as sending too much energy into the body may be harmful. Frequency-power may be picked to account for attenuation, or to give greater strength to more predictive bands.

In some cases, different frame points (e.g., frequencies) may be prioritized over others. Variables such as sampling time, intermediate frequency, and power per point may be individually controllable on a per point basis. A longer sampling time per point may reduce noise. Modifying the intermediate frequency may also reduce noise. A higher power per point may increase predictive power. In some cases, the silent speech detection system may dynamically pick sampling time and power per frame point. The system may use machine learning feedback to determine the most predictive points for that session or for a user and allocate stronger power to those points. Feedback from machine learning may also be used to detect channels that could be more predictive if noise was decreased. The system can then give more sampling time to points in those channels in order to decrease the amount of noise.

In some cases, essential electronic components, such as the RF front-end, frequency synthesizer, frequency mixer, analog-to-digital converters, processor, memory, and antenna may be integrated into a System on Chip (SoC). This integration into a SoC may significantly reduce the physical footprint of the circuitry while maintaining or reducing the power required for real-time signal processing.

In some cases, multiple integrated components (ICs) may be integrated into a System in Package (SiP). This may include the RF components, such as the transmitter, receiver, baseband processing units, digital signal processing units, and data processing units.

In some cases, the antenna(s) may be miniaturized using chip antenna(s). Chip antennas may be compact and can be directly mounted on the device's circuit boards or user-facing mounting features, significantly reducing the size and improving the aesthetics of the wearable device. By mounting the antenna on a circuit board, changes in amplitude and phase of measurement due to bending or movement of a cable carrying RF, such as a coaxial cable, may be eliminated. By mounting the antenna on user-facing mounting features, measurement error due to motion relative to the body may be minimized.

In some cases, Antenna in Package (AiP) technology may be used to further reduce footprint, improve performance, and/or reduce manufacturing cost. AiP technology may eliminate the need for external antennas by developing antennas that are integrated within the same package as other RF components. This may allow the size of the device to be further reduced, enhancing aesthetics and user comfort. AiP technology can be integrated using techniques such as passive component integration, flip-chip technology, molded interconnect device (MID) technology, embedded antenna design, electromagnetic interference (EMI) shielding, low temperature co-fired ceramic (LTCC) technology, fan-out wafer-level packaging (FOWLP), double-side molding, and/or selective molding. AiP may be used for earbuds where a hyper-compact footprint may be needed.

In some cases, data processing, wireless frontend, and antenna modules may be separated into two or more separate modules inside the earcup. In some cases, all elements of the system, up to the data processing and speech decoding, may be combined into a single module inside the earcup/headphones.

Active Sensing

In some cases, any method of system for silent speech may comprise active sensing, wherein one or more features are adjusted or changed to account for a change in the user or environment which may impact the radar signal of the radar antenna array.

In some cases, a method for silent speech detection may comprise anticipated signal steering. In some cases, one or more antennas may be configured for signal steering. In some cases, signal steering includes beam steering, beam shaping, or both. In some cases, a system for silent speech detection may comprise one or more steerable antenna. In some cases, a system for silent speech may control and adjust a position and location of one or more antennas based on an anticipated movement or location of a target speech articulator. For example, the system may adjust an orientation of a receiver or transmitter antenna to maintain focus on a speech articulator as it moves while the user speaks. In some cases, the system may be configured to anticipate a location or movement of the target speech articulator based on a word or phenome decoded by the system and adjust one or more antennas based on the predicted location or movement. In another example, the system may be configured to anticipate a location or movement of the target speech articulator based on a word or phenome recorded by the system and adjust one or more antennas based on the predicted location or movement. In some cases, a position and location of one or more antennas may be adjusted or changed to target one or more different speech articulators.

In some cases, the system for silent speech detection may comprise a control module configured to control one or more parameters of the antenna. It will be understood that the control module may be configured to dynamically control one or more elements or parameters of the system as described herein. In some cases, the control module may be configured to dynamically control one or more elements or parameters of the system based on one or more sensed signals. In some cases, a silent speech system may comprise a phased array for signal steering. In some cases, any radar-based SSI system described herein may be configured to use beamforming to target one or more target speech articulators. For example, the system may be configured for beamforming to control the direction of an emitted radio beam to target one or more speech articulators, for example, a user's lips, tongue, jaw, or larynx. In some cases, a radar-based SSI system may comprise an adaptive beamforming array. The adaptive beamforming array may be configured to dynamically control the shape and direction of an emitted radio beam to target one or more speech articulation and adjust a frequency, intensity, or angle of emitted radio beams based on a predicted location or movement of a target speech articulator. For example, the system may adjust a frequency of one or more transmitters to change a direction or shape of main lobe of a radio beam to maintain focus on a speech articulator as it moves while the user speaks. In some cases, the system may be configured to anticipate a location or movement of the target speech articulator based on a word or phenome decoded by the system and steer or shape the beam based on the predicted location or movement. In another example, the system may be configured to anticipate a location or movement of the target speech articulator based on a word or phenome recorded by the system, and steer or shape the beam based on the predicted location or movement. In some cases, a set of transmitters may be configured to emit radio waves at multiple frequencies to form a phased array from signal steering. In some cases, a radar-based SSI method may comprise using digital beamforming. For example, a silent speech detection system comprising using a MIMO radar may be configured to use digital beamforming controlling the direction of emitted and received signals. In some cases, a radar-based SSI method may comprise using analog beamforming.

In some cases, a method for silent speech detection may comprise simultaneous transmission and reception of multiple RF bands and bandpass filtering for multiplexed sensing. In some cases, any system or method for silent speech as described herein may comprise using a phone or computer form factor for sensing of vocal track using dynamic beam shaping. In some cases, a method of silent speech detection comprising providing dynamic beam shaping to spatially sweep across the vocal tract. In some cases, the method further comprises creating a physical sweep in addition to a frequency sweep to generate a 3D model of the vocal tract over time as illustrated in FIG. 8. In some cases, a system for silent speech may comprise a smart surface configured to dynamically tune a wavelength and phase of a signal.

In some cases, a system for silent speech may comprise one or more waveguide(s) for restricting pathways between TX and RX antennas to relevant sensing frequencies such as microwaves. In some cases, a system for silent speech may comprise tunable waveguide(s) configured for filtering pathways between TX and antennas to a desired frequency bandwidth. In some cases, the tunable waveguides may be configured for beam steering, beam shaping, or both. In some cases, the waveguide may be configured to reduce sidelobes of the emitted radio waves. In some cases, the one or more waveguide(s) may be implemented as a metamaterial silicon waveguide.

In some cases, a method for silent speech may comprise optimizing power and phase offset of an antenna array transmission to match a phase and power received by the corresponding antenna array across a portion of a user's body. For example, a method for silent speech may comprise optimizing power and phase offset of an antenna array transmission to match a phase and power received by the corresponding antenna array across a portion of a user's head. In some cases, a method for silent speech may comprise tracking physical motion of speech articulators or other targets in the body and focusing power on one or more speech articulators determined to be in motion. This may help the system achieve better time-resolution of the speech articulator's movements. In some cases, a method of silent speech detection may comprise preempting where muscles and actions will happen and recording in that direction. In some cases, a method of silent speech detection may comprise performing doppler-based analysis of adaptive beamforming to adjust beam direction in real time based on detected head or device movement. In some cases, a method of silent speech detection may comprise performing doppler-based analysis of and dynamic adjustment of power control based on environmental factors, battery voltage, individual users, and/or across-time variability. In some cases, a method for silent speech may comprise a gesture interface, wherein the gesture interface is configured to recognize mouth gestures as meaningful commands.

In some cases, a method of silent speech detection may comprise performing surface wave detection on human skin for shape detection. In some cases, a method of silent speech detection may comprise creating a surface EM wave on the human skin, watching how it changes, and recording it as speech. In some cases, a method of silent speech detection may comprise providing electric field tomography of speech articulators. In some cases, a method of silent speech detection may comprise using time, frequency, or channel-based multiplexing of digital communication and RBS on the same antenna(s). In some cases, a method of silent speech detection may comprise providing Frequency Division Multiple Access (FDMA) for signal multiplexing. In some cases, each antenna may broadcast a separate frequency simultaneously, enabling multiplexed measurements. For example, three different antennas may be broadcasting on 2 GHz, 5 GHz, and 7 GHz simultaneously.

In some cases, a method of silent speech detection may comprise performing doppler-based analysis of RF imaging and mapping of vocal cavity. For example, analysis of RF imaging and mapping may comprise differentiating between one or more tissue structures including, but not limited to, musculature, bone, vasculature, nerves, cartilage, or the like. In some cases, a method of silent speech detection may comprise performing reactive near-field sensing of nervous system signals including action potentials and local field potentials from the peripheral nervous system. In some cases, a method of silent speech detection may comprise reactive near-field sensing of nervous system signals including action potentials and local field potentials from the brain.

Figure 17:
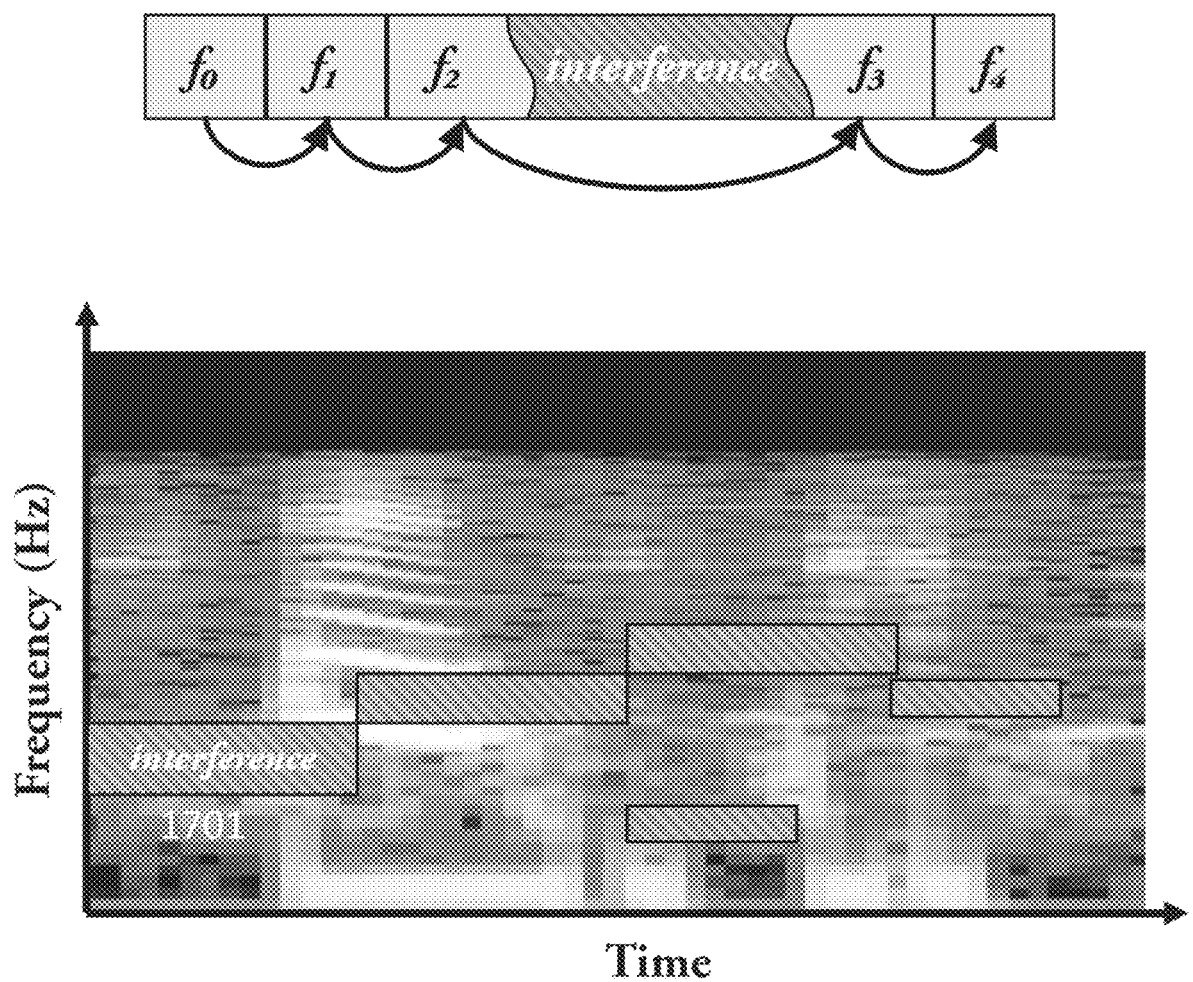
FIG. 17 shows an example of dynamic signal choosing by skipping interference frequencies, in accordance with some embodiments of the present disclosure.

The systems or methods of any example described herein may further comprise one or more techniques for reducing or canceling signal interference. The systems or methods of any example described herein may further comprises one or more techniques for denoising signals from one or more antennas. In some cases, the systems or methods for silent speech may comprise dynamically choosing frequency bands or adjusting amount of time spent on each frequency band to facilitate non-overlapping RBS and digital communication with a computer system or phone. In some cases, the systems or methods for silent speech may comprise dynamically choosing frequency bands or adjusting amount of time spent on each frequency band to minimize electromagnetic interference. In some cases, a method for silent speech detection may comprise time-interleaved sampling and calibration. In some cases, the method further comprises using frequency hopping spread spectrum (FHSS), including adaptive frequency hopping (AFH). As illustrated in FIG. 17, the system may be configured to identify interference signal frequencies and actively change or adjust a frequency scanning pattern to avoid an interference signal. For example, the system may be configured to identify a frequency of an interference signal 1701 and actively skip that frequency in a scan pattern to avoid the interference. This may help improve the SSI's resilience to variable environmental RF conditions by e.g., Bluetooth.

In some cases, a system or method for silent speech may comprise using pulse compression to increase peak energies and reduce average power usage while maintaining or boosting signal-to-noise ratio (SNR). In some cases, a system or method for silent speech may comprise using sidelobe blanking, the comparison of omnidirectional sensing with the main lobe, for noise rejection and boosting SNR. In some cases, a system or method for silent speech may comprise using RF polarization to reject ambient noise or jamming signals for transmission and reception.

In some cases, a method for silent speech detection may comprise active RF noise canceling/RF interference cancellation. For example, the system may be configured to cancel noise of ambient RF. In some cases, a method for silent speech detection may comprise online calibration of radio power to adapt to ambient environments. In some cases, a method for silent speech detection may comprise passive RF noise subtraction or passive RF interference cancellation. For example, the method may be configured to filter or cancel RF interference caused by a sample receiver without transmission turned on before and/or after sampling during transmission. In some cases, when Bluetooth frequencies are hit, instead of transmitting a standard carrier wave, the system or method of silent speech may transmit actual sampled data. For example, the actual sample data may be transmitted to a user's phone. In some cases, these frequencies may not be used for sampling, and may only be used for transmission.

In some cases, a method for silent speech detection may comprise using interleaved sampling blocks and radar calibration blocks.

In some cases, a method for silent speech detection may comprise sampling silent speech articulator positions while transmitting RF signals, and then sampling noise while not transmitting. In some cases, the noise samples may be used as post-hoc calibration in a software pipeline, for example, the ML pipeline illustrated in FIGS. 7A-7E.

In some cases, a method of silent speech detection may comprise using standard or known phrases to rapidly calibrate the system, adjusting for user-to-user variability or variability over time. In some cases, a method of silent speech detection may comprise using supervised audio calibration, wherein the supervised audio calibration uses data from microphone of verbalized audio data as feedback to the system for user training. In some cases, the method further comprises, while users wear the system, providing feedback via synthesized audio to teach the user to use the system. In some cases, a method of silent speech detection may comprise depth mapping of the vocal tract. In some cases, the method further comprises creating per-user depth maps of the vocal tract using reconstructed (tomography) 3D representation, and using it to tune a generated voice. In some cases, the method of silent speech detection may comprise using a machine learning model and LLM configured to analyze at least silent speech radar data to create per-user depth maps of vocal tract using reconstructed (tomography) 3D representation, and using it to tune a generated a synthetic voice corresponding to the silent speech radar data.

Signal Processing

Any system or method for silent speech as described herein may comprise a signal processing unit. In some cases, the signal processing unit may be configured to receive and analyze sensor data. For example, sensor data may comprise radar signal data, audio data, video data, sEMG data, accelerometer data, image data, environmental data, context data, or a combination thereof. The signal processing unit may be configured to process and analyze at least radar signal data for decoding silent speech. In some cases, a system or method of any example described herein may comprise performing spectral density estimation on the received signals using techniques including Fourier transform, Wavelet analysis, or the Multitaper method. In some cases, the received signals comprise at least recorded radar signals for measuring and tracking speech articulators.

In some cases, a radar-based SSI method for silent speech detection may comprise one or more denoising methods. In some cases, denoising methods comprise using one or more filtering techniques, wherein a model is pre-calibrated and can be used to represent the look of the SSI form factor itself in radar data (or another type of sensor data). In some cases, denoising methods may comprise indicating how likely obstruction object data, for example from a retainer or jewelry, is to appear in received radar data. The processing system can detect and filter the radar data to remove (or otherwise detect and ignore) obstruction object detections. This may improve the accuracy of the radar measurements of the speech articulators. In some cases, the performance of filtering techniques may help prevent the control system from engaging in unnecessary actions during calibration or dynamic controlling.

Any system or method for silent speech as described herein may further comprise one or more controllers configured to be operatively coupled to a radar antenna array. In some cases, the one or more controllers may be configured to use a spatial configuration of the radar antenna array and spatial information of a user while the user is in motion to generate an enhanced main lobe. For example, the user may be running, biking, driving, or the like. In some cases, spatial information of a user may include information about the position, velocity, acceleration, and other kinematic properties of the user relative to external factors. For example, external factors may include a surrounding environment, a radar antenna array, or any other static or moving point of reference. In some cases, an enhanced main lobe may be a main lobe that has increased in magnitude with respect to one or more side lobes. In some cases, an enhanced main lobe may indicate the presence of a target in a direction that the enhanced main lobe is oriented. In some cases, the enhanced main lobe may be generated by attenuating one or more side lobes relative to the main lobe, or by enhancing the main lobe relative to one or more side lobes. In some cases, attenuation of one or more side lobes may be achieved by the use of a SAR imaging algorithm. In some cases, the SAR imaging algorithm may be an image formation algorithm. In some cases, the image formation algorithm may be an algorithm that can create two-dimensional (2D) or three-dimensional (3D) images of one or more speech articulator targets using a plurality of signals received by the radar antenna array. In some cases, the plurality of signals may contain data such as phase measurements at one or more transmitting and/or receiving antennas in a radar antenna array. In some cases, the image formation algorithm may involve iterative reconstruction, algebraic reconstruction technique, compressed sensing, adaptive beamforming, delay-and-sum beamforming, and inverse synthetic aperture radar. In some cases, the image formation algorithm may be a time domain algorithm and/or a frequency domain algorithm. In some cases, the time domain algorithm may be an algorithm that constructs an image of one or more speech articulator targets by performing calculations with respect to the samples in time of the plurality of signals transmitted and/or received by the radar antenna array. In some cases, the frequency domain algorithm may be an algorithm that constructs an image of one or more speech articulator targets by performing calculations with respect to a Fourier transform of the samples in time of the plurality of signals transmitted and/or received by the radar antenna array. In some cases, the time domain algorithms may include one or more features of a global back projection algorithm, a fast back projection algorithm, a fast factorized back projection algorithm, and/or a local back projection algorithm. In some cases, the time domain algorithms may use a matched filtering process to correlate one or more radar pulses transmitted by the radar antenna array and/or transmitting antenna with one or more signals received by the radar antenna array and/or receiving antenna. In some cases, the frequency domain algorithms may include one or more features of a Fourier-domain reconstruction algorithm, chirp scaling algorithm, range migration algorithm, polar format algorithm, Omega-K algorithm, and/or a Range-Doppler algorithm. In some cases, the one or more controllers may be further configured to use the enhanced main lobe to determine the spatial dispositions or characteristics of one or more targets.

In any of the methods or systems for silent speech described herein, a controller may be further configured to differentiate between the spatial disposition and/or characteristics of the one or more speech articulator targets after attenuating one or more side lobes and/or enhancing one or more main lobes. In some cases, differentiating between the spatial dispositions or characteristics of the one or more speech articulator targets may comprise associating and/or correlating one or more spatial dispositions or characteristics with one or more distinct targets.

In some cases, a system or method for silent speech may be configured for preprocessing signal data. In some case preprocessing may comprise filtering one or more received radar signals. For example, a method for silent speech may comprise simultaneous transmission reception of multiple RF bands, wherein the signal processing comprises using bandpass filtering for multiplexed sensing. In some cases, a system for silent speech may comprise tunable waveguide(s) for filtering pathways between TX and antennas to a desired frequency bandwidth.

In some cases, a method for silent speech detection may comprise using doppler analysis of RF waves for measuring and tracking speech articulators. In some cases, a method of silent speech detection may comprise using radio-based sensing of the facial nerve or other peripheral nerves that encode speech intentions. In some cases, a method of silent speech detection may comprise doppler-based analysis of RF imaging and mapping of vocal cavity. In some cases, a method of silent speech detection may comprise doppler-based analysis of sensing nervous system signals including action potentials and local field potentials from the peripheral nervous system. In some cases, a method of silent speech detection may comprise doppler-based analysis of sensing nervous system signals including action potentials and local field potentials from the brain. In some cases, a method of silent speech detection may comprise doppler-based analysis of adaptive beamforming to adjust beam direction in real time based on detected head or device movement. In some cases, a method of silent speech detection may comprise doppler-based analysis of and dynamic adjustment of power control based on environmental factors, battery voltage, individual users, and across-time variability. In some cases, the method of silent speech detection may comprise using standard or known phrases to rapidly calibrate the system, adjusting for user-to-user variability or variability over time. In some cases, a method of silent speech detection may comprise using doppler analysis of RF waves to filter out slow or non-moving objects from recorded signal. In some cases, a machine learning model for silent speech detection comprises using doppler analysis of received RF waves to filter out slow or non-moving objects from recorded signals.

In some cases, a method for silent speech may comprise using simultaneous microphone and silent speech recordings to denoise audio in environments with acoustic contamination. In some cases, acoustic contamination may be caused by helicopters, airplanes, factory floors, windy environments, cycling, motorcycling, trains, subways, music, background conversations, air conditioning, coffee machines, or the like.

In some cases, an impact of headphone drivers and circuitry on the recorded RF signal may be accounted for or removed in signal processing. These components can cause electromagnetic interference (EMI), which may otherwise degrade performance of silent speech detection.

In some cases, a silent speech system may detect continuous speech, as opposed to just a single word. Continuous speech may be defined as a user speaking at least two words. The silent speech system may detect an unlimited number of words as a user is speaking them.

Machine Learning Model and LLM

Any system or method for silent speech as described herein may comprise a machine learning model for silent speech detection and decoding. In some cases, the machine learning model may be configured to analyze received signal data to form silent speech data. In some cases, the machine learning model for silent speech detection may comprise a supervised machine learning model. In some cases, the machine learning model for silent speech detection may comprise a reinforcement machine learning model. In some cases, the machine learning model may comprise at least a conventional neural network.

In some cases, a method of silent speech detection may comprise detecting a radar based silent speech data set and using machine learning or tomography models to recreate a spatial model of the imaged area. In some cases, a machine learning model for silent speech detection may be configured for analyzing signal modulations across different phonemes/words/mouth positions. The machine learning model may build a "silent speech interface" (SSI) based on at least received radar data. In some cases, the machine learning model may be configured to receive additional sensing data to use as context to help decode silent speech. For example, a method for silent speech detection may comprise recording delivering microphone data, camera data, or both to use as context for a machine learning models that decode silent speech. In some cases, the SSI may be configured to allow a user to silently articulate and have their utterances converted into text or speech. An utterance may be defined as a phrase, word, or sentence spoken silently or non-audibly by a user. Continuous speech by a user may comprise a series of utterances spoken silently or non-audibly by that user.

Figure 7A:
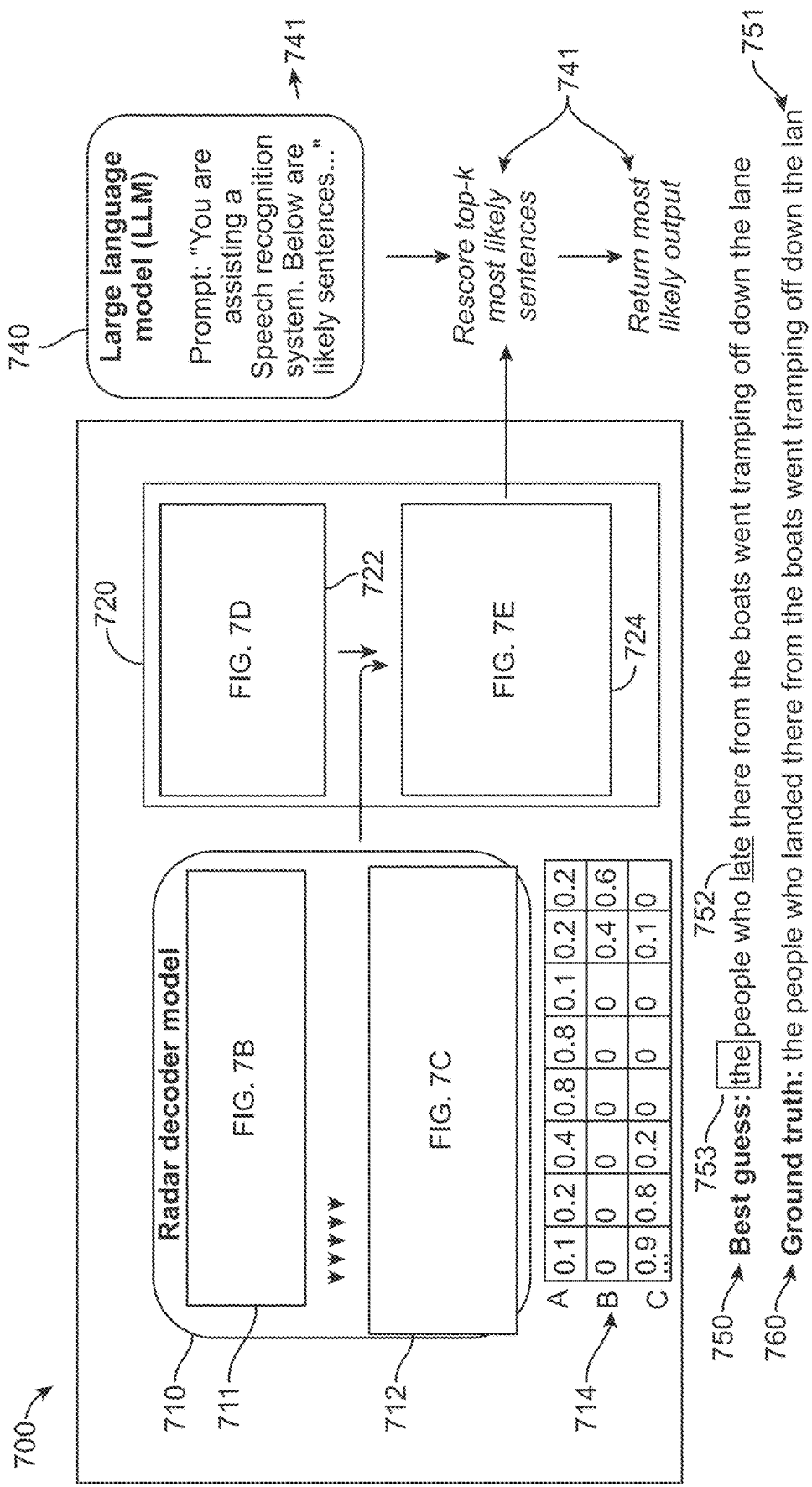
FIG. 7A illustrates an ML pipeline used in some embodiments described herein.
Figure 7B:
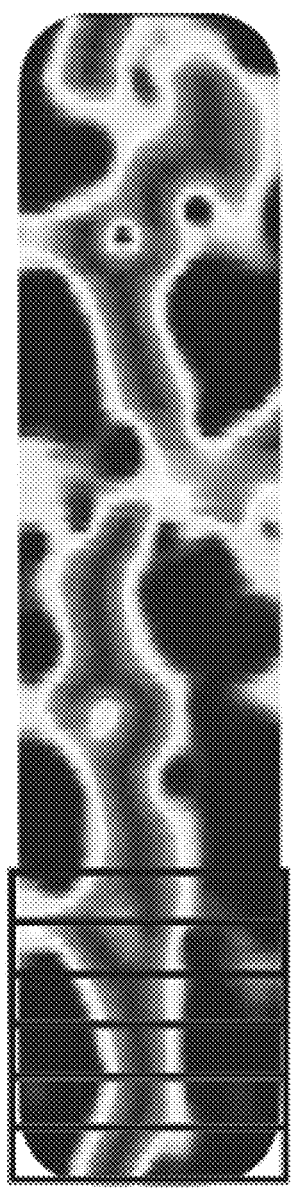
FIG. 7B illustrates a radar decoder model used in the ML pipeline shown in FIG. 7A.
Figure 7C:
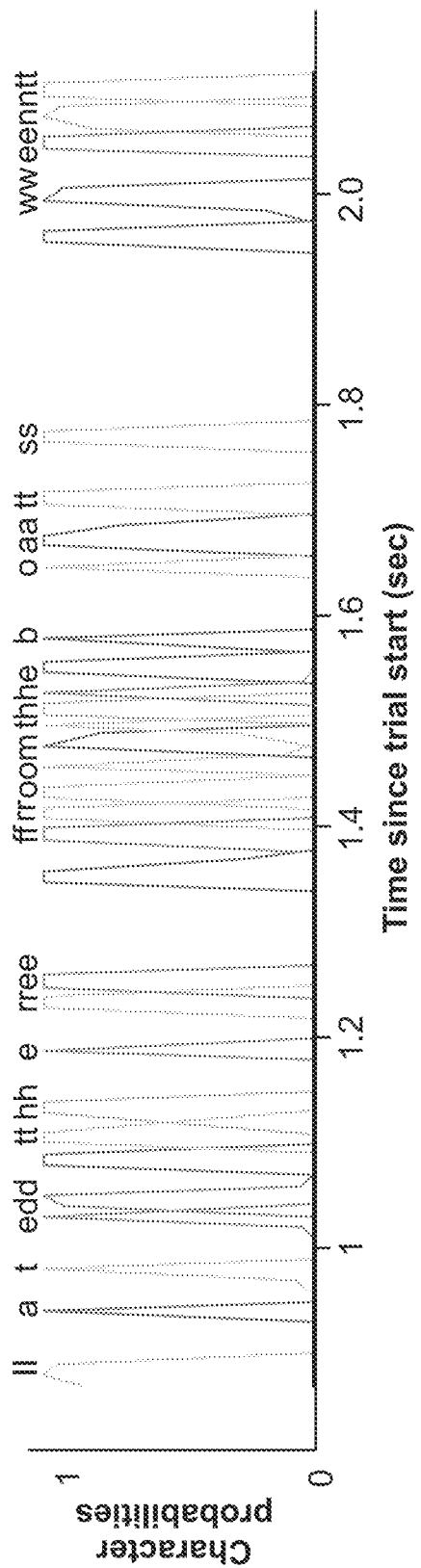
FIG. 7C illustrates character probabilities predicted by the ML pipeline shown in FIG. 7A.
Figure 7D:
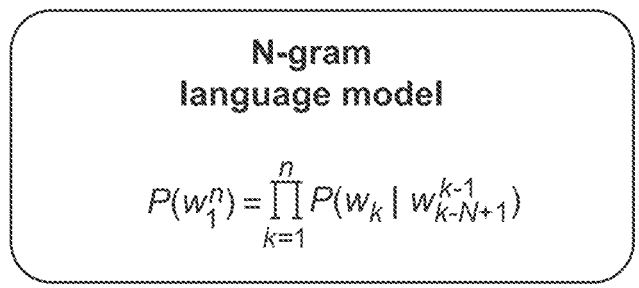
FIG. 7D illustrates a statistical language model used in the ML pipeline shown in FIG. 7A.
Figure 7E:
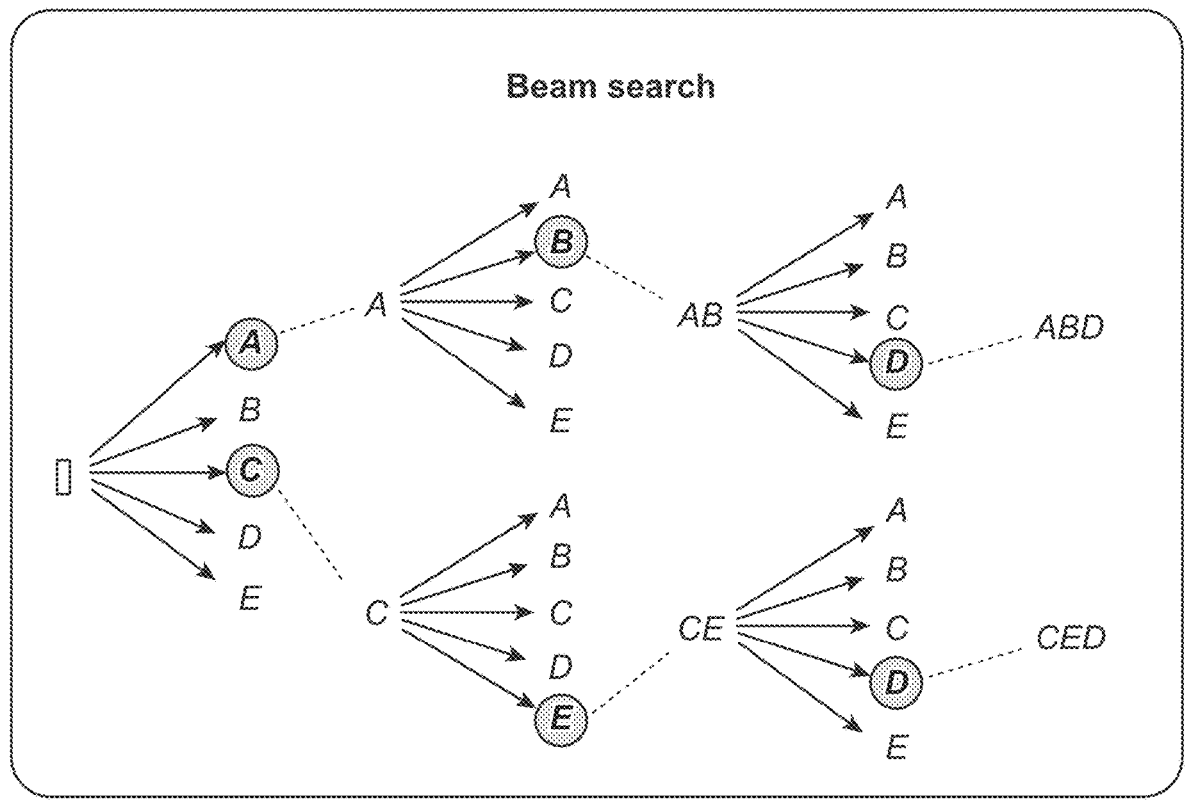
FIG. 7E illustrates an approximate search algorithm ("beam search") used in the ML pipeline shown in FIG. 7A.

FIG. 7A illustrates an example of a silent speech method comprising using a machine learning model for analysis of received radar signals for silent speech decoding and speech generation. Radar signals may be collected from the device in a time×frequency matrix. These signals may then be fed timepoint-by-timepoint into a neural network model that predicts character or phoneme probabilities. These probabilities ("logits") may then be combined with a statistical language model to select the most likely sequence of words from the observed radar data via an approximate search algorithm ("beam search"). The most likely possible translations may be fed to a large language model which chooses the best sentence. FIG. 7A also displays an example sentence result, wherein the non-circled, non-underlined text corresponds to true words. After the LLM correction model, one mistake circled is fixed while another (underlined) remains. Note this is a synthetic example that was not decoded from real radar data (instead meant for visual aid). FIG. 7A also shows an example T'×N matrix of phoneme/character level probabilities at each timestep for language prediction. The method may comprise collecting radar signal data 711 (also shown in FIG. 7B) from one or more antennas of an SSI. The radar signal data may be collected and processed in a time×frequency matrix of amplitude and/or phase. In some cases, the radar signal data collected by the SSI antennas may be delivered to a remote computing system. For example, a computer or smart phone may pair to the SSI device for signal processing and computational analysis. The radar signal data 711 may be delivered to a radar decoder model 710. In some cases, the data is delivered to the decoder 710 as T (time)×C ("channels", or underlying radar features) matrix of data. The matrix of data may be continuously streaming from a wireless sensing SSI earpiece to the decoder model. In some cases, signal data may be transmitted via Bluetooth to a nearby smartphone or computer for processing as described below. For example, each channel may record a magnitude of each frequency band after being emitted from a transmitter, traveling through the orofacial cavity of a user, and being received by an antenna, wherein the transmission spectra of each signal is measured. In some cases, the device may additionally measure the reflection spectra on the same earpiece as the transmitter(s), wherein the device measures the magnitude of frequency of a signal as it bounces back. In another example, each channel may measure a potentially nonlinear mathematical transformation of the underlying radar data. Methods for measuring a potentially nonlinear mathematical transformation of the underlying radar data may comprise using statistical processing techniques. The statistical processing techniques may include, but are not limited to, Principal Component Analysis (PCA), which returns a low-dimensional linear representation of the transmission and/or reflection spectra, or a nonlinear optimization, e.g., a transformation of the data obtained via a learned autoencoder network or via nonlinear dimensionality reductions tools such as t-SNE or UMAP. The radar decoder model 710 may predict character or phoneme probabilities (logits) 712 (shown in FIG. 7C), corresponding to the radar signal data 711. In some cases, the decoder model 710 may output a T'×N matrix 714 of phoneme/character level probabilities at each timestep, wherein T' is a new time length and N is a dimensionality (tokens)+1. In some cases, there may be a specific entry for each token that records its probability at each timestep. For example, at each timestep (column), we obtain 26 different probabilities, one for each letter (token) of the English alphabet. In some cases, the model additionally obtains a probability of a silence token, which denotes nothing being said at that time step. In some cases, a special blank token is also obtained to be used during training of the model. The special blank token may be discarded when doing predictions outside of training methods. In some cases, T' may not be the same length as T. For example, the neural network may receive data sampled at 500 Hz and return an output at 100 Hz.

In some cases, the decoder model 710 may deliver the logits 712 to a language integration model 720 determine a most likely sequence of words corresponding to the received radar signal data 711. In some cases, the logits 712 may be deliver as a T'×N probability matrix 714. The language integration model 720 may comprise a statistical language model 722 (shown in FIG. 7D) to comprising an approximate search algorithm 724 (shown in FIG. 7E) to determine and a set of potential text transcriptions along with their probabilities, using the logits 712, 714.

In some cases, the language integration model 720 may comprise a "lexicon" configured to specify allowed words in a vocabulary and how to spell them using our tokens. For example, the lexicon may process the word "cab" and break it down to the corresponding letter tokens c, a, b. In some cases, the language model 722 may be configured to specify the likelihood of a given word using some preceding context. For example, the language model 722 may comprise using an n-gram model configured to model a next-word probability given the prior words that have been seen (e.g., $P(X_k|X_{k-1}, X_{k-2}, X_{k-n})$). In some cases, the language model 722 may be a neural language model. In some cases, the neural network may be a trained neural network. In some cases, the approximate algorithm 724 may comprise a greedy search algorithm or a beam search algorithm.

In some cases, the set of potential text transcriptions along with their probabilities may be delivered to a large language model (LLM) 740. In some cases, the language integration model delivers a Top-k most likely candidate sentences and their probabilities. In some cases, the language integration model delivers a threshold number of candidate sentences having the highest probability. In some cases, the language integration model delivers all candidate sentences having the probability above a threshold value. For example, the probability threshold may be any candidate greater than 40%, 50%, 60%, 70%, 80%, 90%, 95%, or 99%. In some cases, the LLM may receive a prompt 741 for analyzing the set of potential text transcriptions and their probabilities to construct and deliver a best sentence corresponding 750 to the radar signal data 711. In some cases, the prompt 741 may comprise a task-independent prompt. For example, the prompt may comprise, "You are assisting a speech recognition system. Below are a set of possible sentences and their probabilities. Please select the most appropriate sentence given the information provided and your own intuition:" In some cases, the prompt may comprise a task dependent prompt. In some cases, the LLM 740 may further receive and use additional input data or context data for the prompt 741 to most effectively generate silent speech text and sentences. For example, the LLM 740 may generate a sentence 750 wherein the plain text 751 corresponds to true words, the underlined term 752 corresponds to a corrected mistake by the LLM 740 and the boxed text 753 corresponds to a non-corrected mistake compared to a grounded truth sentence 760. In some cases, a method for silent speech detection may comprise utilizing generated sentences 750 versus truth sentences 760 to at least improve, train, or calibrate, a machine learning model 700, LLM 740, or both. In some cases, the generated sentences 750 versus truth sentences 760 may be provided to a user to provide feedback based on the edits made or missed by the LLM 740.

In some cases, the systems and methods for silent speech described herein may have access to a word bank. In some cases, the word bank may comprise a dictionary for one or more languages. In some cases, the word bank may be configured to access the Internet to learn and accumulate new words. In some cases, a user may add custom words, phrases, and vocabulary to the word bank. In some cases, a silent speech interface may access the word bank of one or more silent speech interfaces connected to the same network. In some cases, a silent speech interface may access one or more databases comprising one or more word banks. The one or more word banks may comprise all known words of one or more languages. In some cases, the word bank may comprise all words in the Oxford English dictionary and the Merriam-Webster dictionary.

In some cases, the output from the LLM 740 may be delivered to another LLM engine with a task specific prompt. For example, a best sentence generated by a first LLM 740 may be delivered to a second LLM for language translation comprising a prompt for automatic language translation. The prompt automatic language prompt may read, "Please translate the following English text into Spanish:"

In some cases, LLM 740 maybe be configured to perform one or more tasks. For example, LLM 740 may be configured to perform both sentence transcription and translation. The prompt for performing both task may read "You are assisting a speech recognition and translation system. Below are a set of possible sentences and their probabilities. Please select the most appropriate sentence given the information provided and your own intuition and translate it into Spanish:" Here the LLM would be configured to perform both speech recognition and translation together and output the translated phrase. In some cases, a second LLM may be part of a third part application. In some cases, a second LLM may be part of the SSI.

In some cases, a method for silent speech may employ prompt engineering techniques to generate a prompt to the LLM. In some cases, a data input module may be configured to generate a prompt based on one or more of a user's communication style, conversation topic, desired task, language, conversational tones, a user's relationship to a recipient during communication, or past speech data and recordings of each user. In some cases, the input data module may generate custom prompt templates based on user input. In some cases, the prompt template may be based at least in part on the task of the SSI, such as translation, dictation, silent phone call, etc., or a topic of communication selected by the user. In some cases, a method for silent speech may comprise using grammar models that may be dynamically loaded or unloaded to modify the structure (i.e., sentence structure) of possible utterances. In some cases, a method for silent speech may comprise dynamically loading lexicons to change the number of candidate decodable words. In some cases, a system or method for silent speech, as described herein, may be configured to allow a user to add new words to the vocabulary via a command word, phrase, or gesture. In some cases, a system for silent speech may be configured to use a continuous command recognition mode, wherein commands can be spoken or chained together without requiring pauses.

In some cases, the input model may automatically generate a custom prompt without any explicit user input based on sensed or received context data. In some cases, the data input module may be configured to generate a custom prompt template based on context and input data provided by the user before activating the SSI. In some cases, the data input module may be configured to generate a custom prompt template based on context and input data provided by the user before initiating a task. In some cases, the input data module may be configured to retrieve a prompt template from a remote device. For example, a user may select a prompt on a display to provide to the LLM for generating silent speech. The selected prompt template may be retrieved from a set of pre-existing prompts each corresponding to desired tasks or topic. In some cases, a custom generated prompt template may be incorporated into an LLM prompt to be delivered to an LLM of the system. In some cases, the system and method may construct a prompt to the LLM engine using the prompt template. In some cases, a prompt template 220 may comprise template sections including for a user recoding section comprising a recorded or decoded speech, an additional task prompt, enrichment data, and contextual data.

In a non-limiting example, a method for silent speech may comprise delivering a prompt to the LLM engine to help facilitate a conversation between two or more users. The LLM prompt may be engineered to edit or improve an audio or text output from an intended speech to help a user communicate about a specific topic. A first user may be a student who wants to email a teacher regarding a disagreement over grades. The student may include the relationship between the user and the receiver of the email. The student may additionally provide context regarding the class or project they would like to discuss. The user and receiver relationship may be provided by selecting from a selection menu or the LLM engine may automatically extract the relationship context data from the previous correspondence between the user and the receiver. When the student drafts the email, the user may ask the LLM engine to review and edit the email to improve the message and tone of the email. In some cases, the LLM engine may automatically generate an LLM prompt based on the message and/or past messages between the user and receiver. In some cases, the LLM engine may retrieve an existing prompt template from an LLM database. The prompt may comprise including the email and additionally a conditional prompt to be included in the prompt template. For the email between the student and teacher on the topic of a grade disagreement, the conditional prompt may provide instructions such as "Help me respectfully express why I disagree with the teacher's grade." The conditional prompt may provide further direction and context to the LLM engine to help improve edits and suggest changes to the email or message generated by the LLM engine.

In some cases, the prompt engineering employed by the input data module may comprise learning and gaining insights as the user communicates through the SSI. The prompt engineering employed by the input data module may comprise gaining and learning insights for each individual user's communication styles and/or vocabulary. This can allow the system to improve and learn without requiring additional onboarding. In some cases, the input data module may utilize a prompt engineering algorithm to generate and/or retrieve a personalized LLM prompt template configured to optimize silent speech decoding and synthetic audio or text generation. The personalized LLM prompt template may allow the SSI to more effectively and efficiently decode and construct accurate synthetic audio or text based on the radar data. In some cases, the user may provide a prompt for conditional audio or text synthesis. For example, a user may prompt the SSI to "speak in iambic pentameter." In some cases, a command word or phrase may be used to select an LLM prompt to use for processing the subsequent text or data. For example, "Shakespeare <words to transform to iambic pentameter>", where 'Shakespeare' is a command word. In some cases, an AI engine may transform a style of subsequent silent speech before generating audio or text based on the user's conditional prompt. In some cases, a user may provide a conditional prompt to allow the SSI to edit or alter a user's speech based on a desired tone or outcome. For example, if a user curses during a conversation with their boss the LLM or AI engine may automatically replace one or more words or phrases to prevent the user from coming off as inappropriate during a work call. In some cases, the LLM or AI engine may automatically reword or paraphrase a user's intended speech based on a conditional prompt. In some cases, silent speech may be used as a prompt to generate text with an LLM or AI engine. For example, the user may use silent speech to tell an LLM or AI engine, "write an email that politely asks for an in-person meeting". The LLM or AI engine may respond with the message "Dear Ben, I'd love to meet in person to discuss our go-to market strategy. How's Thursday at 4 pm?"

In some cases, a machine learning model for silent speech detection may comprise one or more artificial neural networks configured to analyze magnitude and phase information of each transmitted frequency band (S11, S12, S21, S22, . . . S44, etc.) to synthesize audio, speech, or both based on at least radar data.

In some cases, a machine learning model for silent speech detection may comprise a device position-aware neural network configured for session adaptation. In some cases, a machine learning model for silent speech detection may be configured for adapting radar signals depending on an angle of the array with respect to body orientation. In some cases, the machine learning model for silent speech detection may be configured for adapting radar signals depending on an angle of the array with respect to a one or more speech articulator's orientation. For example, a method for silent speech detection may comprise sensing and providing a machine learning model with array orientation data with respect to the body to provide it a way to learn what signals look like for different orientations. For example, the method may comprise measuring at least an angle and distance from the center of the head or the lips of a user and training the machine learning model on the orientation data. In some cases, a silent speech decoder may work more immediately on a new session. For example, a new session may begin where the user's device may have a different angle with respect to the head.

In some cases, the machine learning model for silent speech detection may be configured for performing a per-user static calibration. In some cases, a user may be instructed not to move mouth, and the machine learning model may be adapted to user-specific features like face geometry, tissue thickness, presence of retainer or metal tooth implants. In some cases, the machine learning model for silent speech detection may comprise nonlinear machine learning for automatic electric calibration of an RF measurement system. In some cases, the RF measurement system may be a radar-based SSI.

In some cases, the machine learning model for silent speech detection may be configured for tracking speech articulators and silent speech detection.

In some cases, the machine learning model for silent speech detection may be configured for determining between a method of silent speech detection or a method of voiced speech detection. This may help the SSI with power saving. For example, a machine learning model for silent speech detection may comprise a low-power neural network to detect if a user is silently speaking vs engaging in overt speech. The low-power neural network may be configured to run continuously to detect if a user is silently speaking or engaging in overt speech. In some cases, for a method of silent speech detection, if silent speech is detected, a silent speech decoder model may be turned on and may begin transcribing the user's silent speech. In some cases, the silent speech decoder model may comprise a larger, more power-intensive model. In some cases, a similar technique is employed to detect presence of speech or no-speech conditions, so that a decoder model is turned on during speech conditions and otherwise turned off.

In some cases, a machine learning model for silent speech detection may comprise a multi-user speech decoder model. In some cases, the machine learning model for silent speech may comprise a vector embedding model and storage module configured for embedding user specific data and storing the user-specific embeddings. The user specific data may include but is not limited to, conversation history recordings, user demographical data, user speech data, images, video recording, or the like. In some cases, the multi-user speech decoder model may receive user-specific embeddings as an input. In some cases, a machine learning model for silent speech detection may comprise a neural network encoder for each user. In some cases, a machine learning model for silent speech detection may comprise a separate neural network encoder for each user. In some cases, a neural network encoder may be configured to adjust for user-specific differences before data is fed into a common silent speech decoder.

In some cases, a method for silent speech may comprise predictively pulling up information as a user is voicing words and displaying additional info live.

In some cases, a machine learning model for silent speech may be configured to predictively pull up information as a user is voicing words and display additional info live.

In some cases, any system for silent speech as described herein may comprise at least one brain-machine interface (BMI). In some cases, the at least one brain machine interface may comprise an invasive BMI. In some cases, the at least one brain machine interface may comprise a non-invasive BMI.

In some cases, a machine learning model for silent speech detection may comprise using at least a statistical language model for correcting radar decoder outputs.

In some cases, a machine learning model for silent speech detection may comprise using a large language model(s) (LLM) configured for prompting to select the best possible sentence outputs from one or more radar decoders. In some cases, a machine learning model for silent speech detection may comprise using a background RF spectrum configured to determine a radar device orientation with respect to a user's head. In some cases, a machine learning model for silent speech detection may comprise at least a recurrent neural network(s) configured for real-time synthesis of voicing/text from radar data. In some cases, a machine learning model for silent speech detection may comprise using transformer network(s) for real-time synthesis of voice, text, or both from radar data. In some cases, an audio clip or vector representing an audio style may be input alongside with radar data to allow for "voice cloning," or synthesizing audio with semantic content based on radar and voicing in style of the prompt.

In some cases, a machine learning model for silent speech detection may be configured to use unsupervised recalibration of a radar-to-text/speech decoder across time. In some cases, a machine learning model for silent speech detection may comprise users using self-training. In some cases, a machine learning model for silent speech detection may comprise using doppler analysis of radar data to filter out slow or non-moving objects from recorded signal.

In some cases, a system or method for silent speech may be configured for emotion recognition via radar signal analysis of the face and speech articulators. In some cases, the system or method for silent speech may comprise a machine learning model configured to perform emotion recognition via radar signal analysis of the face and speech articulators. In some cases, an emotion recognition via radar signal can be used for reinforcement learning from human feedback (RLHF). In some cases, RLHF from RBS is used to train or finetune an LLM.

In some cases, a system or method for silent speech may be configured for eye opening state detection via radar signal analysis of the face and speech articulators. In some cases, a system or method for silent speech may comprise a machine learning model configured to perform eye opening state detection via radar signal analysis of the face and speech articulators. In some cases, RBS may be used to estimate eye position or orientation. In some cases, eye movement may be detected using doppler-based analysis of RF. In some cases, RBS of the eyes may be used for cursor or pointer control for a computer, phone, tablet, augmented reality, or virtual reality display. In some cases, RBS of eye gaze may be used in conjunction with camera data for a machine learning system to understand where a user is looking. In some cases, a machine learning model for silent speech may be a trained machine learning model. In some cases, the machine learning model for silent speech may utilize online active learning. In some cases, any example machine learning model described herein may store difficult examples where the speech-to-text model from vocalized audio diverges from the radio-to-text model from speech articulator data. In some cases, the stored difficult example may be used to fine-tune the model in real-time or offline.

In some cases, a method for silent speech may comprise recording audio and radar data of a user. For example, voice audio and corresponding radar data may be recorded during the day or at night, or when a user is alert or asleep, for memory archiving. In some cases, a method for silent speech may comprise recording subvocalizations of a user. For example, subvocalization audio and corresponding radar data may be recorded during the day or at night, or when a user is alert or asleep, for memory archiving. In some cases, a method for silent speech may comprise recording verbal, silent, intended, and/or attempted speech.

Figure 15:
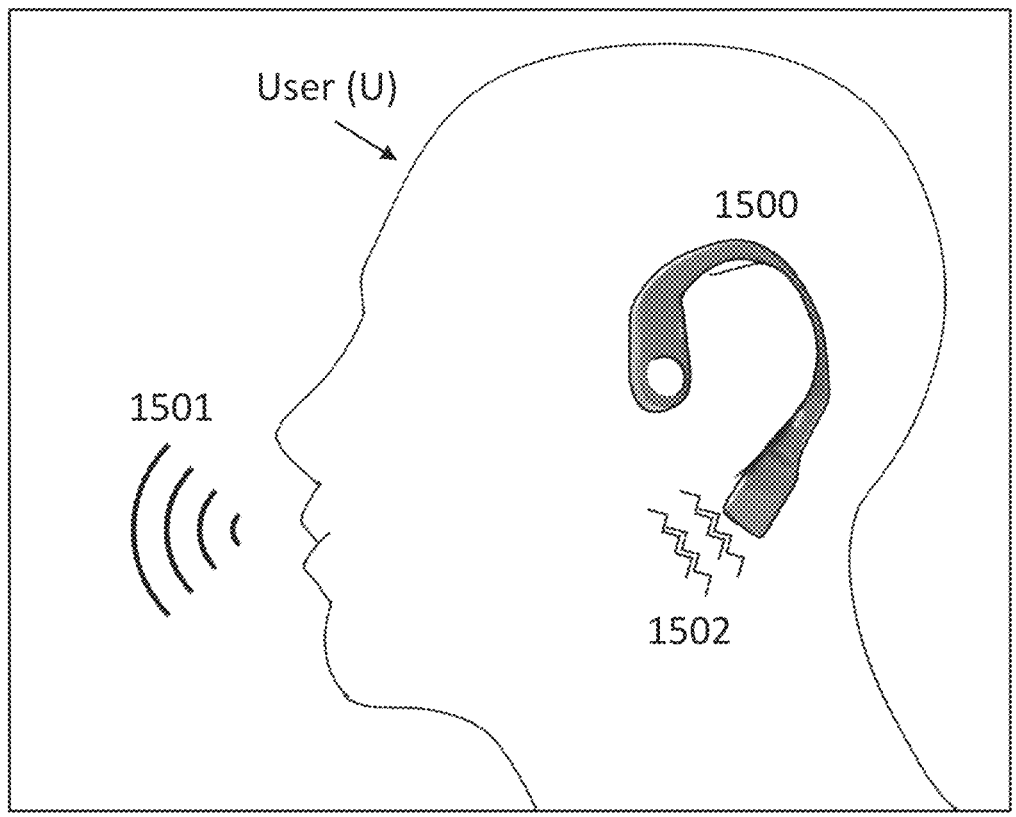
FIG. 15 illustrates a silent speech system recording voiced speech using a microphone and recording speech articulators using a Silent Speech Interface, in accordance with some embodiments of the present disclosure.

The system or method of any example herein may further comprise an onboarding or calibrating protocol. In some cases, the onboarding protocol may be configured to train one or more machine learning models of the silent speech system. In some cases, the onboarding protocol may be configured to train at least a silent speech decoder algorithm. In some cases, the onboarding protocol may be configured to train at least a large language model. In some cases, the onboarding protocol may be configured to calibrate an SSI to a user. For example, the onboarding protocol may comprise turning on an SSI (i.e., a headset), a user putting on the headset, and requesting a user to consent to microphone recording. The microphone recording may be used to help finetune the system. In some cases, the onboarding protocol may instruct a user to go about their day normally and vocally talking while wearing and using the device to collect user data to train the machine learning model(s). For example, the system may collect recording and sensor data throughout the on-boarding protocol. In some cases, the onboarding protocol may collect audio recordings and radar data of a user for a training period. For example, FIG. 15 illustrates an SSI 1500 configured to record voiced speech 1501 while simultaneously recording radar data tracking and measuring the speech articulators of the user (U). The recoded audio and radar data may be used as sample training sets to train a machine learning model. The machine learning models and LLM may be trained by comparing synthetic generated text or audio by the SSI to recorded audio at the same time as radar data analyzed by the SSI to generate the synthetic text or audio, similar to the ML workflow illustrated in FIGS. 7A-7E. In some cases, the training period of the onboarding protocol may be at least 1 minute, 5 minutes, 10 minutes 30 minutes, 1 hour, 2 hours, 6 hours, 12 hours, 24 hours, or 1 week. In some cases, the training period may be a continuous period of time. In some cases, the training period may be split up into one or more training periods. For example, if an onboarding protocol requires the system to collect at least 2 hours of audio and radar training data, the system may collect recording data and radar data during 4 separate 30-minute training periods, wherein the 30-minute periods may be taken on 4 different days. This may help diversify the training data used to train the machine learning models. In some cases, the onboarding protocol may comprise informing a user when silent speech system is ready or almost ready. In some cases, the system may determine that it is ready after the machine learning model and LLM perform above a threshold accuracy level. For example, the system may inform the user that the silent speech system is ready after the machine learning model generates synthetic text, audio, or both with at least 50% accuracy, at least 60% accuracy, at least 70% accuracy, at least 75% accuracy, at least 80% accuracy, at least 90% accuracy, at least 95% accuracy, or at least 99% accuracy. In some cases, the system may determine that it is ready after a threshold amount of training data has been collected and used to train the machine learning model and LLM. For example, the system may determine that the system is ready after recording at least 2 hours of active audio and corresponding radar data.

In some cases, the system may inform the user after a period of time has passed from the start of the on-boarding protocol. In some cases, a user is informed after the system has collected a sufficient amount of training data during the on-boarding protocol.

In some cases, the on-boarding protocol may comprise prompting a user to "repeat after me." It should be understood that the user may be prompted to repeat any phrase in addition to or in place of the phrase "repeat after me." In some cases, a user may read text prompts out loud or silently speak. In some cases, the onboarding protocol may comprise prompting a user to repeat one or more phrases in one or more volumes. For example, the onboarding protocol may comprise requesting the user to speak in a whisper, in a normal speaking volume, in a yelling volume, etc. In some cases, the on-boarding protocol may comprise prompting a user to repeat one or more sounds, words, phrases, sentences, or the like. In some cases, the on-boarding protocol may comprise prompting a user to say one or more commonly used phases. For example, a user may be prompted to say things including but not limited to, "please call Sarah," "read unread text messages," "what is the weather like in New York City," or the like. In some cases, the one or more phrases a user is prompted to repeat may be personalized to each user. For example, the user may be asked to repeat names of a user's phone contact, nearby city and street names, etc. The personalized prompts may be based on user input data. For example, user input data may include context data extracted from a user's text messages, emails, phone data, location data, historical audio recordings, or a combination thereof. In some cases, the on-boarding protocol may comprise prompting a user to, say one or more similar sounding words or phrases. For example, the user may prompt a user to repeat the words "tree," "free," "me," or "she." In another example the user may be prompted to repeat the words "caught," "brought," "bought," and "not." In some cases, the on-boarding protocol may comprise prompting a user to, say one or more variations of a sentence. For example, a user may first per promoted to say, "I'm headed to the store," followed by "I am going to the store" or similar sentences. In some cases, a user may be prompted to repeat a sound, word, phrase, or sentence more than once to help train a machine learning model and LLM. In some cases, a user may be prompted to read a book or longer passages. In some cases, a user may provide feedback to the system for silent speech detection and synthetic audio or text generation to improve and train the machine learning model and LLM. In some cases, a user may initiate a new training session in response to the SSI making mistakes. In some cases, a user may initiate a new training session in response to the SSI repeatedly making one or more mistakes. For example, is the SSI continuously misinterprets a user silently speaking the name "Jason" as "Jackson," the user may initiate a targeted training session to train the SSI on one or more specific words, phrases, or sentences. the on-boarding protocol may comprise prompting a user to repeat one or more sounds or phenomes. For example, the user may be prompted to say "ah," "aw," "shh," "st-ah," "st-eh," or the like. In some cases, the on boarding protocol may comprise prompting a user to repeat one or more sounds, phenomes, words, phrases, sentences, or a combination thereof one or more times to help calibrate and train the device. For example, the user may be prompted to repeat a word at least two times, at least three times, at least four times, at least five times, or at least ten times. In some cases, the onboarding protocol may comprise prompting a user "to repeat after me, while silently mouthing words" to repeat one or more sounds, phenoms, words, phrases, sentences, or a combination thereof, one or more times to help calibrate and train the device. In some cases, the system may use active learning to determine which sounds, phonemes, words, phrases, sentences, or combination thereof should be repeated, based on the words, phrases, or sounds that are most difficult for the model to decode. For example, if it is difficult for the model to distinguish /p/ and /b/, the user may be prompted to say, "potatoes are barely baked in proper portions". In some cases, the onboarding protocol may comprise first prompting a user "to repeat after me" then prompting the user to "repeat the same while silently mouthing words." In some cases, feedback may be given based on user performance to coach mouthing. For example, the system may instruct or coach the user to "remember to move lips and tongue." In some cases, a user may be prompted to repeat after me, while "talking without moving lips." After one or more of the above steps, the system may have collected sufficient training data as well as the user coaching to perform imperceptible Silent Speech. FIG. 16 illustrates an onboarding protocol workflow 1600 using an interface 1610. The protocol 1600 may comprise a training period composing recording silent speech data 1620. A user may initiate an onboarding protocol 1600 wherein the interface 1610 prompts the user to record client speech. For example, the interface 1610 may prompt the user to "Mouth the words: 'Hello World'"1611 to record silent speech data 1620. The silent speech data may comprise at least radar data for training and calibrating the silent speech system. The onboarding protocol 1600 may further comprise passively recoding audio data including voiced speech 1630 and speech articulator data 1640. The passively recorded speech articulator data 1640 may comprise at least radar data. In some cases, the speech articulator data may further comprise sEMG data, accelerometer data, additional imaging data, or a combination thereof. The recorded voiced speech data 1630 and recorded speech articulator data 1640 to train a synthetic voice model and a silent speech articulator model 1650. In some cases, the system may comprise at least recording additional silent speech data 1660 to retrain and finetune one or more machine learning models 1670 of the system. In some cases, the interface 1610 may provide a status indicator 1612 to show the user how much time is left in the training period. It should be understood that one or more of these steps may be performed, removed, or repeated during the onboarding protocol. It should also be understood that these steps are not limited to being performed in any particular order.

In some cases, gesture sequences may be used to calibrate the system. For example, the system may ask the user to move their tongue up or down, move their jaw up or down, or move other muscles in the face. This may assist in optimizing the system for that user for improved silent speech decoding.

In some cases, data may be stored on a per-user basis. This data may be used to improve a larger, multi-person machine learning model for use on a particular user. For example, the initial hidden state of a recurrent neural network (RNN) may be different between people. In some cases, a different "context" vector may be used for each individual as an input to a neural network. In some cases, a token for a transformer may represent a particular person.

In some cases, user or context-specific language models may be used in the system. For example, a user-specific vocabulary or word bank may be created based on what the user says. A user-specific language model may be finetuned based on the user's speech. The system may comprise different language models for silent speech versus audible speech.

In some cases, a model used for text decoding or speech synthesis may be fine-tuned for an individual user. This finetuning results in improved performance as data becomes available for a specific user, and this fine-tuned model may then be used by that user. This allows for a single foundation model to specialize for each individual.

In some cases, a user-specific layer or module may be used in a neural network. This layer may be trained or fine-tuned to improve accuracy for an individual user. For example, the first layer of the network may differ for each user.

In some cases, the architecture may be designed to process data in a streaming manner, wherein inputs are continuously received and outputs are generated in real-time or near-real-time. This may be done in a causal fashion, e.g., that the system's outputs at any given time are dependent only on past and present inputs, not future data.

Figure 29:
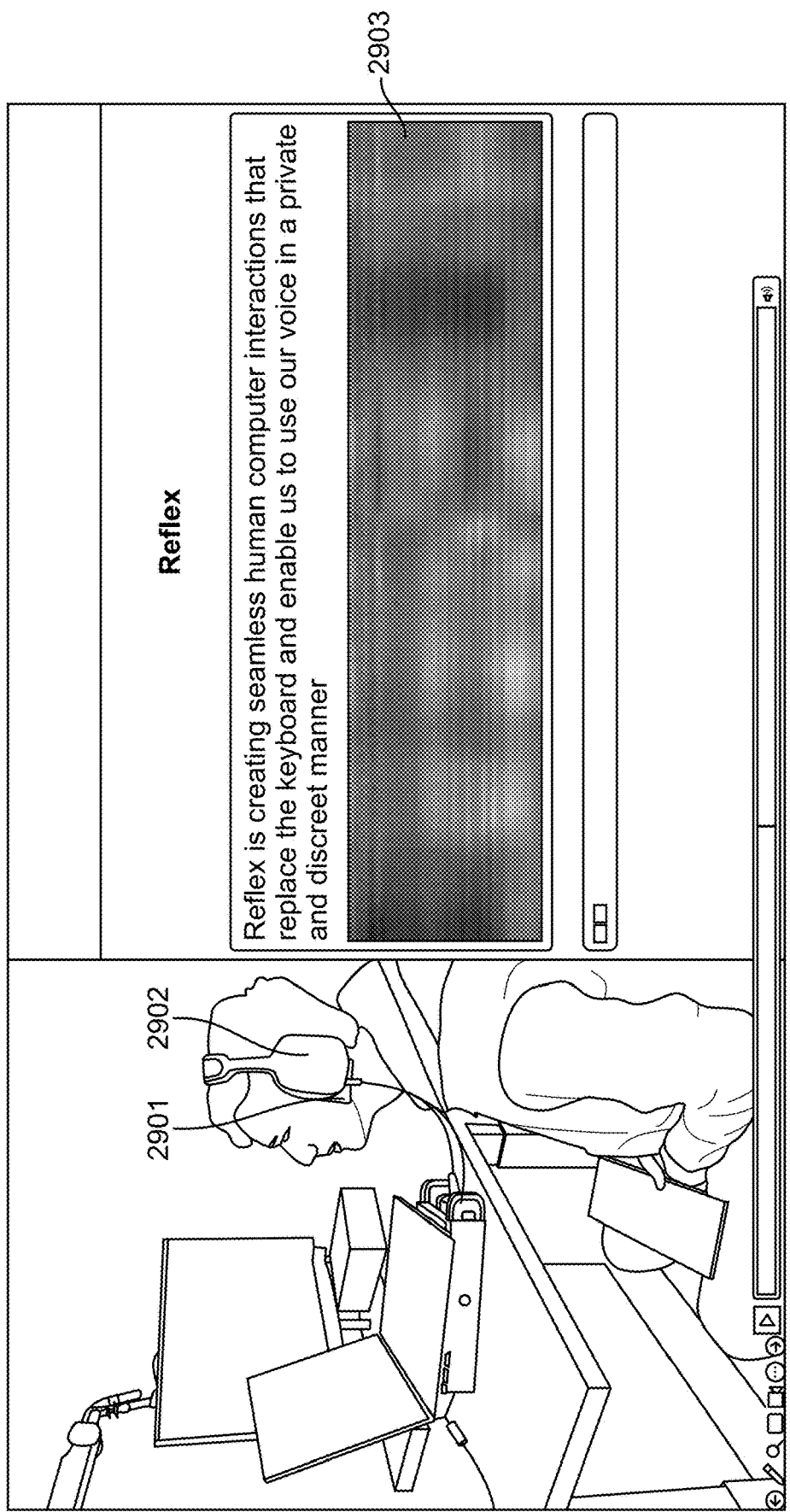
FIG. 29 shows an example of continuous speech being decoded in real time.

FIG. 29 shows an example of continuous speech being decoded in real time. On the left, a subject is seen wearing prototype headphones 2902 with PCB board antennas 2901. A live screen capture 2903 is shown on the right, showing S21 signal magnitude. In this graph, the y-axis comprises 101 points ranging from 500 MHz at the top to 1.5 GHz at the bottom. The x-axis comprises time. Each step is 4 ms.

In some cases, smoothing or trajectory estimation of the radar SSI signal may be performed using, e.g., rolling Gaussian filtering or Kalman filtering. This smoothing detrends the data, removing drift, seasonality, and/or offsets that may otherwise reduce SSI performance/accuracy.

In some cases, the system may prompt recalibration or retraining of the model for a particular user. For example, if the system is found to be performing worse than a specified amount on audio or SSI decoding, the system may prompt the user to recalibrate or repeat onboarding.

In some cases, user calibration may involve real time user placement feedback based on radar SSI signal, accelerometer data, and/or camera information. For example, a user may be told to adjust the device's contact with the skin based on S21 transmission spectra characteristics from the radar signal, absolute position with respect to the ears from the camera signal, or angle with respect to the ground from the accelerometer signal.

In some cases, RF sensor data from a user may be anonymized and encrypted before transmission over the internet, removing at least one identifying characteristic or metadata. In some cases, sensor data may be transformed into information that aids in training a machine learning model for silent speech without requiring accompanying audio data or text data to be transmitted to a remote server. In some cases, a silent speech device may backpropagate the loss on a machine learning model and send gradient updates, rather than user data itself, from a device or computer to the cloud. This allows for one or more processors on a server to aggregate updates from many users in a privacy-preserving fashion.

A system or method for silent speech as described herein may comprise a machine learning model for silent speech detection. The machine learning model for silent speech detection may comprise a supervised machine learning model. The machine learning model for silent speech detection may comprise a reinforcement machine learning model.

A system or method for silent speech as described herein may be configured to update and improve performance of at least a machine learning model for silent speech recognition, silent speech decoding, synthetic speech audio and text generation, synthetic singing audio, or a combination thereof. In some cases, a system or method for silent speech as described herein may be configured to update and improve performance of at least an LLM. In some cases, a system or method may comprise providing additional training data to the system. In some cases, additional training data may comprise user specific training data. In some embodiments the system may prompt a user each day when the user puts on the device, to say known phrases that teach them about new features. In a non-limiting example, the system may prompt the user to: "Try silently saying, 'Please summarize today's top headlines.'" User may then say this phrase, which can be used to finetune or update the model's radio-to-text performance, while also teaching the user a new feature.

In some cases, a method of silent speech detection may comprise using standard or known phrases to rapidly calibrate the system, adjusting for user-to-user variability or variability over time. In some cases, a method of silent speech detection may comprise using supervised audio calibration, wherein the supervised audio calibration uses data from microphone of verbalized audio data to the feedback system for user training. In some cases, the method further comprises, while users wear the system, providing feedback via synthesized audio, to teach them to use the system and allow for monitoring of decoded audio. In some cases, a method of silent speech detection may comprise depth mapping of vocal tract. In some cases, the method further comprises creating per-user depth maps of vocal tract, using reconstructed (tomography) 3D representation, and using it to tune a generated voice. In some cases, the method of silent speech detection may comprise using a machine learning model and LLM configured to analyze at least silent speech radar data to create per-user depth maps of vocal tract, using reconstructed (tomography) 3D representation, and using it to tune a generated a synthetic voice corresponding to the silent speech radar data.

In some cases, a system for silent speech detection may comprise a gesture interface. The gesture interface may be configured to recognize mouth gestures as meaningful commands. For example, a gesture interface may be configured to determine a user's mouth is closed, wherein a closed mouth means "mute." In some cases, the gesture interface may comprise a gesture recognition machine learning model configured to determine a motion of a user's speech articulators, such as the mouth. In some cases, a system of silent speech detection may comprise a privacy mode where decoded speech may not be saved for training data.

In some cases, a system for silent speech detection may combine radar data with camera data or non-audible murmur integration. For example, if a user is sitting at a computer and using a silent speech detection application or looking at a mobile phone for a video call, the system for silent speech detection may integrate lip-reading or small audio signals into speech decoding or voice synthesis. This may improve performance of silent speech detection.

In some cases, a machine learning model for silent speech detection may be configured for adaptive learning of speech styles.

In some cases, a method of silent speech detection may comprise receiving dynamic placement feedback. In some cases, the dynamic placement feedback may comprise notifying a user if they need to adjust or readjust the placement of one or more antenna. For example, the user may be notified to adjust an earpiece SSI on the ear. In some cases, the dynamic placement feedback may be based on at least calibration sensing. In some cases, an onboarding protocol may comprise dynamic placement feedback. In some cases, an onboarding protocol may comprise one or more calibration methods as described herein.

In some cases, a method of silent speech detection may comprise combining radar-based detection with sEMG, EEG, or in-ear EEG to augment machine-learning training.

In some cases, a silent speech system may be used to collect data for training LLM or other AI models. In some cases, a user may mouth words corresponding to a thought, and the silent speech system may pick up these signals. In some cases, a silent speech system may be used to collect data based on a user's facial expressions or emotions. Such data may be used to train an LLM or other AI model.

In some cases, a method of silent speech detection may comprise, a voice synthesis training protocol. For example, a user may be prompted to read various text or "repeat after me out-loud" in a quiet environment. In some cases, audio and speech articulator data may be simultaneously recorded to finetune a speech synthesis machine learning model, create a "context" audio clip or latent representation that may be used by a contextual speech synthesis model that generates synthesized speech from the current radio data or the speaker context data, or both. In some cases, a system for silent speech is configured for voice cloning. In some cases, voice cloning comprises synthesizing audio in the style of a person's voice. In some cases, voice cloning may be powered by silent speech. In some cases, synthesized speech generated by the speech synthesis model may comprise singing. In some cases, a system or method for silent speech as described herein may be integrated with or into MIDI technology, wherein the integration may help with pitch tuning and musicality.

A machine learning model for silent speech, the machine learning model comprising; using online active learning. In some cases, any example machine learning model described herein may store difficult examples where the speech-to-text model from vocalized audio diverges from the radio-to-text model from speech articulator data. In some cases, examples the stored difficult example may be used to fine-tune the model in real-time or offline.

A method for silent speech, the method comprising; predictively pulling up information as a user is voicing words and displaying additional info live.

A machine learning model for silent speech, the machine learning model configured to predictively pull up information as a user is voicing words and display additional info live.

Examples of Machine Learning Methodologies

As used in this specification and the appended claims, the terms "artificial intelligence," "AI," "artificial intelligence techniques," "artificial intelligence operation," and "artificial intelligence algorithm" generally refer to any system or computational procedure that may take one or more actions that simulate human intelligence processes for enhancing or maximizing a chance of achieving a goal. The term "artificial intelligence" may include "generative modeling," "machine learning" (ML), "state-space modeling," or "reinforcement learning" (RL).

As used in this specification and the appended claims, the terms "machine learning," "machine learning techniques," "machine learning operation," and "machine learning model" generally refer to any system or analytical or statistical procedure that may progressively improve computer performance of a task. In some cases, ML may generally involve identifying and recognizing patterns in existing data in order to facilitate making predictions for subsequent data.

ML may include a ML model (which may include, for example, a ML algorithm). Machine learning, whether analytical or statistical in nature, may provide deductive or abductive inference based on real or simulated data. The ML model may be a trained model. ML techniques may comprise one or more supervised, semi-supervised, self-supervised, or unsupervised ML techniques. For example, an ML model may be a trained model that is trained through supervised learning (e.g., various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principal component regression, least absolute shrinkage and selection operation (LASSO), least angle regression, canonical correlation analysis, factor analysis, independent component analysis, linear discriminant analysis, multidimensional scaling, non-negative matrix factorization, principal components analysis, principal coordinates analysis, projection pursuit, Sammon map-ping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, transformers, auto-encoders, variational auto-encoders, structured state spaces for sequence modeling (S4), state-space models (SSM), long short-term memory (LSTM), stable diffusion, contrastive learning, or generative adversarial networks.

Training the ML model may include, in some cases, selecting one or more untrained data models to train using a training data set. The selected untrained data models may include any type of untrained ML models for supervised, semi-supervised, self-supervised, or unsupervised machine learning. The selected untrained data models may be specified based upon input (e.g., user input) specifying relevant parameters to use as predicted variables or other variables to use as potential explanatory variables. For example, the selected untrained data models may be specified to generate an output (e.g., a prediction) based upon the input. Conditions for training the ML model from the selected untrained data models may likewise be selected, such as limits on the ML model complexity or limits on the ML model refinement past a certain point. The ML model may be trained (e.g., via a computer system such as a server) using the training data set. In some cases, a first subset of the training data set may be selected to train the ML model. The selected untrained data models may then be trained on the first subset of training data set using appropriate ML techniques, based upon the type of ML model selected and any conditions specified for training the ML model. In some cases, due to the processing power requirements of training the ML model, the selected untrained data models may be trained using additional computing resources (e.g., cloud computing resources). Such training may continue, in some cases, until at least one aspect of the ML model is validated and meets selection criteria to be used as a predictive model.

In some cases, one or more aspects of the ML model may be validated using a second subset of the training data set (e.g., distinct from the first subset of the training data set) to determine accuracy and robustness of the ML model. Such validation may include applying the ML model to the second subset of the training data set to make predictions derived from the second sub-set of the training data. The ML model may then be evaluated to determine whether performance is sufficient based upon the derived predictions. The sufficiency criteria applied to the ML model may vary depending upon the size of the training data set available for training, the performance of previous iterations of trained models, or user-specified performance requirements. If the ML model does not achieve sufficient performance, additional training may be performed. Additional training may include refinement of the ML model or retraining on a different first subset of the training dataset, after which the new ML model may again be validated and assessed. When the ML model has achieved sufficient performance, in some cases, the ML may be stored for present or future use. The ML model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of ML models may be stored for generating predictions under different sets of input data conditions. In some cases, the ML model may be stored in a database (e.g., associated with a server).

Figure 30:
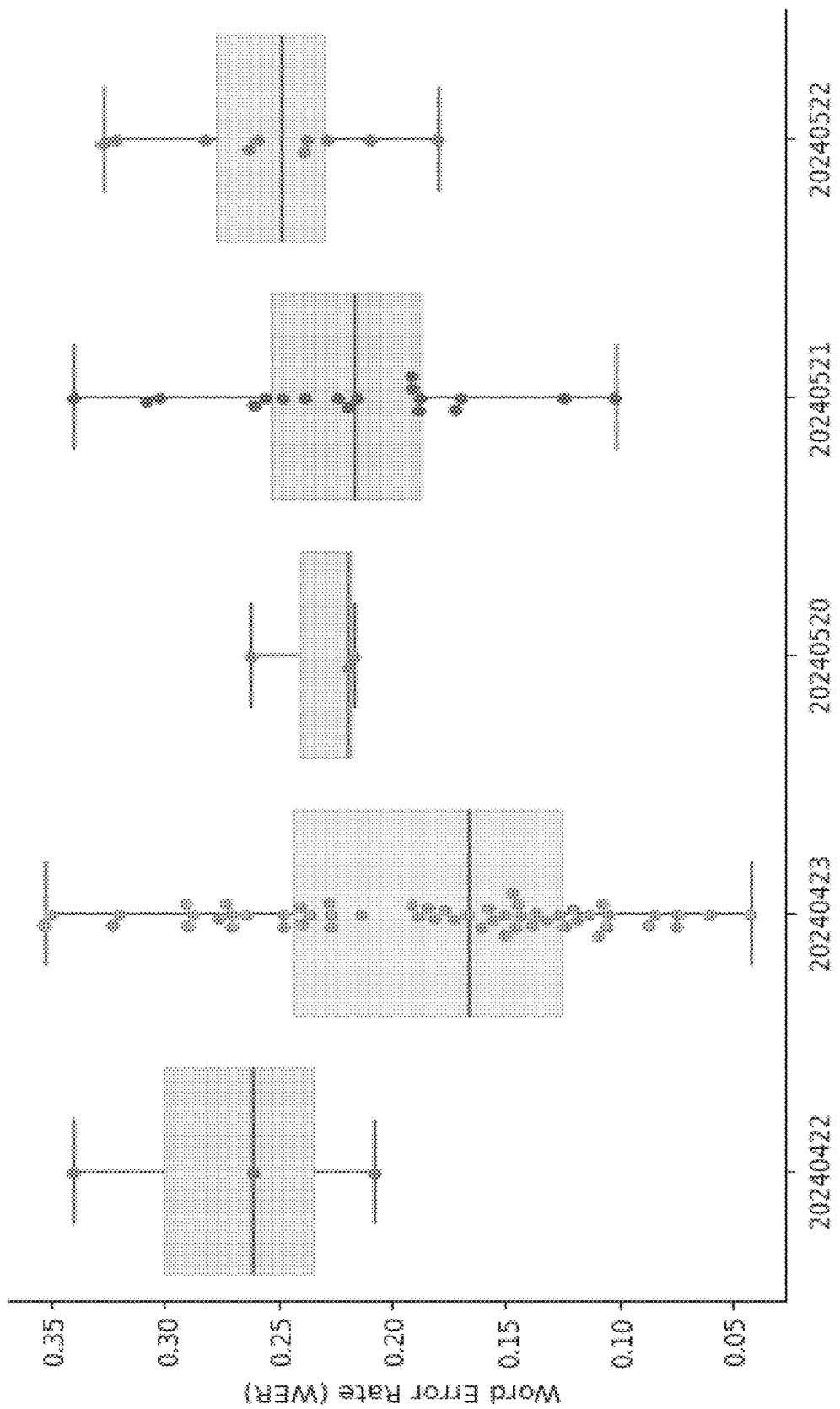
FIG. 30 shows the validation performance of a silent speech system as described herein at the end of machine learning training.

FIG. 30 shows the validation performance of a silent speech system as described herein at the end of ML training. The graph shows the word error rate fraction for each measurement on a specific date. The average word error rate seen was 21%. FIG. 31 shows an example performance of the silent speech system as described herein on various sentences. The sentence predicted by the system is shown next to the true sentence.

FIG. 32 shows some of the top errors in speech sounds made by a prototype of the silent speech system. The intended sound is shown on the X-axis, while the predicted output sound is shown on the Y-axis. For example, the speech sound "d" is mistakenly output as "t" 35 times in the test set. In this example, "d" occurs 729 times in the test set. In another example, the speech sound "t" is mistakenly output as "n" 22 times in the test set.

In some cases, a silent speech system as described herein may differentiate speech sounds, such as "t" and "d", based on vocal fold vibrations. These vocal fold vibrations may be known as either "voiced" or "unvoiced". The silent speech system may effectively distinguish these sounds, even in a non-audible/silent speech condition.

TABLE 1

Frequency of system mistakes between unvoiced/voiced and voiced/unvoiced speech sounds.

|  | Voiced | Unvoiced |
|---|---|---|
| Frequency in Test Set | 62.2 | 37.8 |
| Voiced | 96.75 | 3.25 |
| Unvoiced | 5.36 | 94.64 |

As shown in Table 1, the frequencies that the silent speech system mistakes voiced speech sounds for unvoiced speech sounds and vice versa are only about 5.36% and 3.25%.

Figure 33A:
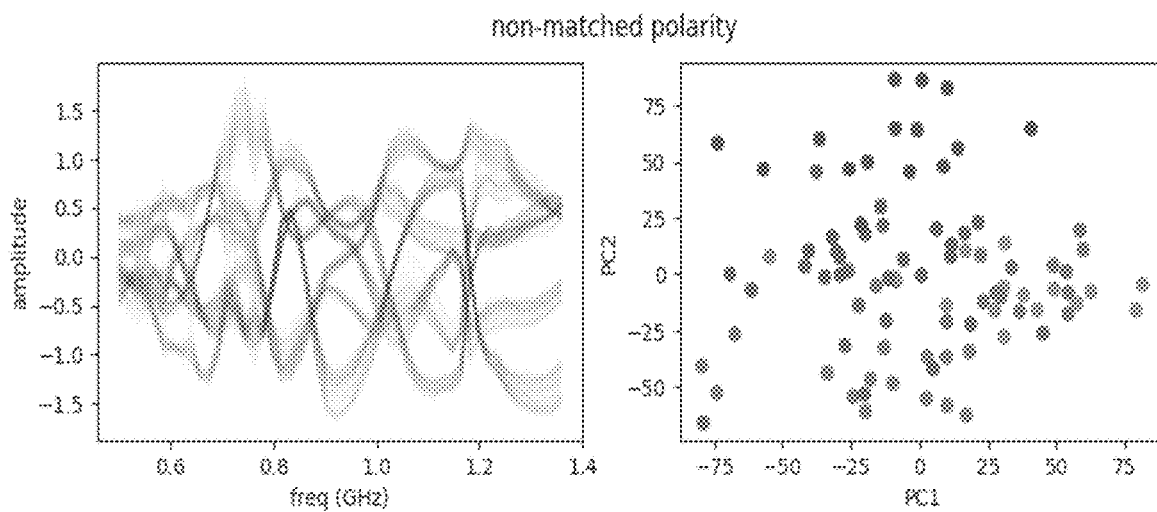
FIGS. 33A-33B show graphs of phoneme separability under different antenna conditions.
Figure 33B:
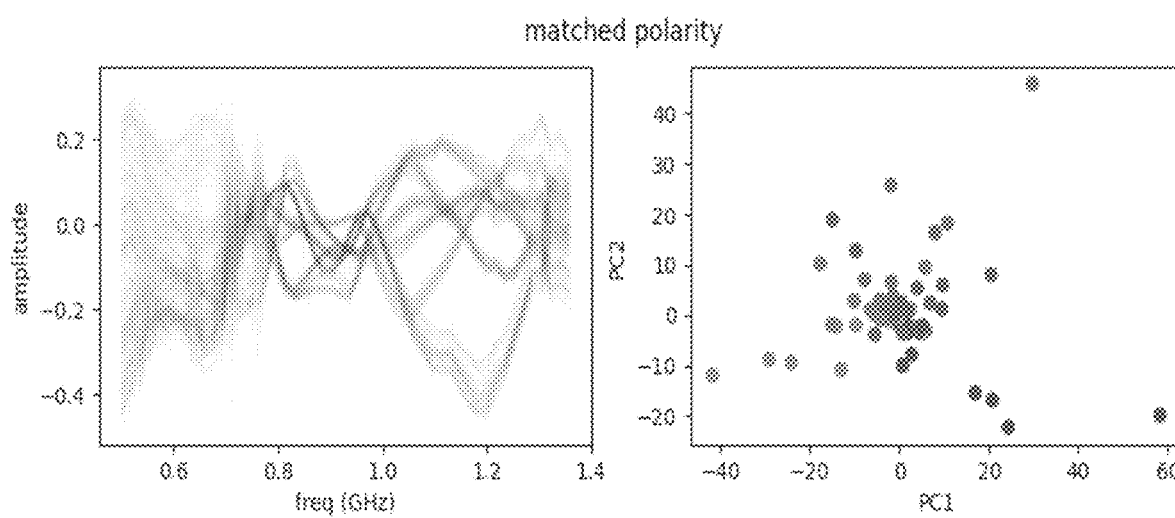

FIGS. 33A-33B show graphs of phoneme separability under different antenna conditions. FIG. 33A shows results for antennas with non-matched polarity. An amplitude vs. frequency plot is shown on the left side of FIG. 33A. On the right side, a principal component analysis graph is shown for the same conditions. The principal components are scattered widely over the graph.

FIG. 33B shows results for antennas with matched polarity. An amplitude vs. frequency plot is shown on the left side of FIG. 33B. On the right side, a principal component analysis graph is shown for the same conditions. The principal components are mostly localized to a single area on the graph.

Applications

In some cases, a method for silent speech may comprise recording, verbal, silent, intended, and/or attempted speech. In some cases, a method for silent speech may comprise detecting if speech is vocalized or silent. In some cases, a method for silent speech may comprise gated activation of decoding into audio or text wherein activation may only occur when non-vocal speech is detected.

In some cases, a system for silent speech may be configured to detect command words or speech articulator gestures for changing a mode of an SSI. For example, sensing a closed mouth may mean "mute", swiping the tongue to right may mean "speak faster", swiping the tongue to the left may mean "slow down." In some cases, RBS may be used to track tongue movements for control of a cursor or pointer like a computer mouse. In some cases, RBS may be used to track eye movements for control of a cursor or pointer like a computer mouse. In some cases, command words or speech articulator gestures include but are not limited to pursing of lips to activate tongue, palette, & larynx centric silent speech decoding, silent utterance of the word "text" to activate silent speech to text mode, silent utterance of the word "speak" to activate silent speech to synthesized voice mode, etc. In some cases, a system for silent speech may be configured to connect (i.e., via Bluetooth, physical cable, or Wi-Fi) to a speaker for synthesis of audio or speech from the SSI. In some cases, the system may be connected to the speaker through a wireless connection. In some cases, the system may be connected to the speaker through a wired connection. In some cases, the speaker may be located on, in, or around the user's ear so that the user can privately hear the speech decoded by the system.

In some cases, a system for silent speech may comprise a key-value store, wherein a given word, phrase, or specific speech articulator movements acts as the retrieval key, and the value is a performed action like retrieving/typing text, synthesizing audio/speech, or triggering an action. In some cases, the system for silent speech, may further comprise a key-value memory bank configured to allow a user to store and retrieve information (i.e., personal information). For example, a user may save details like "my sister's address" or "restaurants I like in Seattle," This may allow a user to quickly access stored information whenever required.

In some cases, a system for silent speech may comprise an application. In some cases, any SSI as described herein may be configured to connect to an application. In some cases, on more applications may provide a user access to one or more other products, systems, and software configured to improve or expand the function of the silent speech system. In a non-limiting example, the application may allow a user to install a calendar application configured to allow a user to create, modify, and accept invitations to events using the SSI. In some cases, the SSI system may be configured to integrate with a third party offering. For example, the third-party offering may comprise an application comprising a reminder application. The reminder application may be configured to provide time or location-based audio reminders using the SSI to the user, for example through headphones. In some cases, the application may be configured to provide reminders through a remote device. For example, the application may be configured to send reminder to a remote device including but not limited to, a user's phone, email, text messaging platform, or a combination thereof. In some cases, the reminder may comprise an audio reminder, an image reminder, a textual reminder, or a combination thereof. In some cases, a system or method of any example herein configured to allow a user control of computer, smartphone, or tablet via virtual accessories, including mouse, keyboard, touch, gesture, stylus, and trackpad. In some cases, a system for silent speech may comprise a thought notebook, wherein the thought notebook may enable thoughts to be instantly recorded, categorized, and recalled. In some cases, a though notebook may further permit the addition of reminders or ideation on a project's whiteboard. This may be performed without any vocalization or disruption.

In some cases, one or more applications may be configured to be turned on or off for a certain amount of time. This may allow the application(s) to access and/or receive contextual information. For example, contextual information may include but is not limited to microphone data, audio data, video data or text transcripts from nearby speakers, audio data, video data, or text transcripts of the user's recent silent or vocalized speech, specific data from databases and corpuses as determined by the user, or a combination thereof. In some cases, the system or application may be configured to automatically turn on or off. In some cases, the system or application may be configured to automatically determine resources from which to pull contextual information.

In some cases, one or more applications may be proactive. For example, an application may be configured to anticipate a user's need and provide feedback to the user and/or the system based on the determined need of the user. In some cases, one or more applications may be reactive. For example, an application be configured to only activating upon user query or command. In some cases, a user may control whether an application is configured to be proactive or reactive. In some cases, an application may be configured to be proactive during one or more first set time periods, and reactive for one or more second set of time periods. For example, an application may be configured to function proactively during the daytime (e.g., 9 am-5 pm) and function reactively during the nighttime (e.g., 6 pm-4 am). In some cases, the user may set guidelines for when to run applications using natural language, like "always run auto-diary if I am silently speaking at home after 9 pm", where 'auto-diary' may be an application that appends summarized text from silent speech to a text-based diary.

In some cases, any method or system as described herein wherein the silent speech interface may be configured to integrate with a voice assistant. In some cases, the voice assistant may be configured as an AI powered voice assistant. In some cases, a method for silent speech may comprise interacting with conversational AI, wherein a user's recent dialogue context and an ambient sound captured by the microphone (including speech from others) influences the AI's responses. In some cases, a machine learning model for silent speech may comprise an AI engine, where the AI engine is configured to analyze recent dialogue context and an ambient sound captured by the microphone (including speech from others) to generate responses.

In some cases, any method or system for silent speech as described herein wherein the silent speech interface may be configured to integrate with other devices to understand the context in which a user is speaking. In some cases, a store can broadcast a signal to the device, allowing the user to search through its inventory using silent speech or wherein a home appliance can broadcast its signal, letting users control it with silent speech. In some cases, the silent speech interface enables a user to control one or more remote devices through silent speech commands.

In some cases, the silent speech interface enables the user to control one or more applications through silent speech commands. In some cases, the silent speech interface is configured to deliver and intended speech to control one or more remote devices. In some cases, the silent speech interface is configured to deliver and intended speech to control one or more applications. For example, the silent speech interface may enable user to provide the silent command "turn off lights" to control one or more lights in a house without waking someone sleeping nearby. In some cases, the silent speech interface can be coupled to a voice activated control system. The user may activate the control system silent speech allowing the user to command that voice activated control system without requiring the user to speak aloud. In some cases, the voice activated control system may be an AI system. For example, in Alexa, Watson, or Siri.

Water Consumption

In some cases, a user may use a system or method for silent speech as described herein, to set a schedule for one or more participating application to run. For example, a user may use the SSI to instruct an application to "please remind me if I have not drunk water in more than two hours." The user's instruction may trigger a system response, "I will notice when you drink water and say something to you if you haven't in more than two hours, is that what you want?" In some cases, when the user confirms the instruction, for example by replying "yes," an application will run in the background to monitor for signals characteristic of water consumption, record times of water consumptions (i.e., the most recent time the user drinks), and trigger a notification once a threshold amount of time (i.e., two hours) have passed since the user has drank, and resetting the count after each drink. In some cases, a user may set the threshold time for drinking. In some cases, the system may be configured to automatically set a threshold time based on contextual data taken from a user's historical data, data from other users, and/or from information and data retrieved from external sources (i.e., databases, medical websites and journals, etc.). In some cases, a system from silent speech as described herein may be configured to determine an amount of volume of a fluid (e.g., water) consumed by a user based on the monitored and recorded signals characteristic. In some cases, a system from silent speech may be configured to determine type of fluid consumed by a user based on the monitored and recorded signals characteristic. In some cases, a system from silent speech may be configured to track the amount of time a user is drinking. In some cases, a system from silent speech may be configured to track a volume of the fluid being drank over a period of time.

Oral History

In some cases, a system or method for silent speech as described herein may be configured to record and store all silent and vocalized speech recorded data by the system. In some cases, the system may record and store for a period of time. In a non-limiting example, the system may store data only from the last 2 months. In some embodiments data recorded before a set period of time (e.g., before 2 months ago) may be stored on an external memory module. In some cases, data recorded during a set period of time (e.g., within the last 2 months ago) may be stored on a local memory module. In some embodiments all stored data may be stored on a local and/or external memory module. In some embodiments the stored data may be accessed through one or more applications. In some cases, the stored data may be labeled Oral History. The stored data may include audio and/or text files.

In some cases, a system or method for silent speech may be configured to use conversational AI or other applications. In some cases, the AI or other applications may be configured to use the stored data used as context data or to derive context data from.

Automatic Language Translation

In some cases, a system or method for silent speech as described herein may be configured to register and transmit continuous speech for any number of words in lexicon. In some cases, a system or method for silent speech as described herein may be configured to decode one or more languages. In some cases, the system or method for silent speech may further be configured for automatic translation of silent speech in one language to another, wherein the translation may be produced in text or sound.

In some cases, a system or method for silent speech as described herein may be configured to automatically translate a user's silent speech or spoken speech from a first language to a second language. In some embodiments the second language is a language that the user may not be able to understand or communicate in effectively or at all.

In some cases, some embodiments, a system or method for silent speech as described herein may be configured to automatically translate a person communicating with a user from a first language to a second language. In some embodiments the first language is a language that the user may not be able to understand or in effectively or at all. The second language may be a language the user understands.

In some cases, a system or method for silent speech may be configured to automatically detect the language of a person the user is communicating with. In some cases, system may automatically translate the user's silent or vocal speech into the detected language of the person communication with the user. In some cases, the system may generate an audio or textual translation of the user or other person to facilitate communication. In a non-limiting example, the system may send an audio signal to the other person's headphones, over a speaker. In a non-limiting example, the system may send the translation as a textual message, such as a text message, to the user or directly to the person communicating with the user. This may improve communication between individuals how have difficulty communicating verbally. For example, when a user travels to another country for work or vacation.

In some cases, a user may need to make a request, for example, "please translate everything I say into Spanish." The system may ask the user to confirm the request, for example the system may prompt the user, "Please confirm that you want to audibly speak in Spanish?" The user may confirm the request, for example by saying "yes." Upon confirmation, the system may automatically translate their silently or verbally spoken English into synthesized speech in Spanish. In some cases, the system may not require a user's confirmation to perform a request.

In some cases, a system for silent speech may use a large language model to create semantic or tone filters for a user's speech. For example, a user may ask the system to convert angry speech to calm speech. In some cases, a system for silent speech may remove stutter or filter words (e.g., "um", "like", "you know"). In some cases, a system for silent speech may process the user's silent speech to alter their accent, e.g., from an American English accent to a British English accent. In some cases, a system for silent speech may correct for a speech affect, accent, or speech disorder.

Notifications

In some cases, a system or method for silent speech may comprise a notification system. The notification system may be configured to automatically determine when and/or how to notify a user. The system may include an adaptive algorithm to determine when and/or how to notify a user. The adaptive learning algorithm may comprise a reinforcement learning algorithm. The reinforcement learning algorithm may be configured to receive, analyze, and learn from human feedback.

In some cases, a system or method for silent speech may be configured such that applications and/or other users may permissively send notifications to a given user. In some embodiments the system may comprise a ML algorithm configured to determine when and/or how to deliver a notification to a user. In a non-limiting example, when a notification is delivered, a user may responds implying that they do not want to receive the notification, for example by silently speaking "no thanks," then the algorithm may determine to deliver fewer of these kinds of notifications to the user in the future. Alternatively, a user may respond implying that they want to receive the notification, for example by silently speaking "thanks," then the algorithm may determine to continue delivering these kinds of notifications in the future. In some cases, the algorithm may be configured to be use contextual information when making decisions. The algorithm may analyze contextual to determine when and/or how specific prompting can be used to decide what notifications to deliver. The contextual data may include but is not limited to, message meta data, message text, a user's calendar data, a detected an emotional state of a user, or a combination thereof. For example, a user could silently say "Only notify me about phone calls or other urgent topics during my next meeting," and notifications would be dynamically sorted using contextual data and notification criteria by the algorithm. In some cases, a Large Language Model may power the algorithm.

Email Application

In some cases, a system or method for silent speech as described herein may be configured to help a user receive, send, and manage emails. In a nonlimiting example, a user may provide a request to the system by silently or audibly saying "What are my most important emails?"

In some cases, the system may read one or more emails determined to be important: to the user. The system may be configured to provide context of each email to the user before reading. In some cases, the system may be configured to analyze and summarize an email to the user. For example, the system may say to the user 'Mark from Company XYZ is asking if it is OK to proceed with the purchase order. Your colleague Lisa is wondering if you are available for lunch tomorrow. Justin emailed to cancel your 1 o'clock meeting."

The user may then silently or vocally instruct the system to do one or more actions in response to the emails. For example, the user may silently speak to the system and instruct the system to "Please tell Mark that it's OK to proceed, check my calendar for tomorrow and either book Lisa then or suggest an alternate available day. Respond to Justin and ask to reschedule for later this week, suggesting times based on my availability."

The systems or methods for silent speech described herein, may be configured to gather the requisite information, and then write and/or send one or more emails based on a user's prompt, also referred to herein and throughout as a request. In some cases, the system may read the drafts to the user and asks for approval before sending.

Context-Aware Silent Speech Assistant

Current voice assistants are generally stateless and their information about a user's question or statement is dependent on the words contained within that statement (and historical training data used to build the model). These models can be supplemented with access to a user's address book or phone clock time but generally lack the ability to use previous context to guide their outputs.

A system or method for silent speech as described herein may comprise an SSI-enabled conversational assistant.

In some cases, an SSI-enabled assistant may be configured to leverage past information to help perform one or more functions/requests for a user. In some cases, an SSI-enabled assistant may monitor information from ongoing silent speech and identify contextual information from the silent speech (e.g., names of people, user environments throughout the day, time of day). In some cases, the system may extract contextual information write or store the context information to a memory log. The memory log may be stored on a database. An SSI-enabled assistant may be configured to access the memory log (i.e., query the database) to receive and analyze contextual information to better assist when responding to a user. In some cases, an SSI-enable assistant may be configured to update stored contextual information based on new information. In some cases, the old contextual information may be removed from the database as the updated contextual information is stored to the database. In some cases, older information may be dropped with increasing frequency to help bias the model toward the new or more recent information.

Exemplary Use Cases

Recording Setup

In one example of the system described herein, a vector network analyzer may be used to sweep over 51 frequencies from 500 MHz to 1.5 GHz. 1 dBM (1 mW) of average power at each frequency may be broadcast from antenna 1 (on left ear and part of left cheek) and received by antenna 2 (on right ear and part of right cheek), and the magnitude at antenna 2 recorded. The gain in decibels may be calculated, which may correspond to 521. For example, the gain in decibels may be −30 dB for a particular measurement at a particular frequency. The sweep over the 51 frequencies may have a sweep rate of 200 Hz, with a frequency being recorded every 5 seconds. The audio data, radar data, and associated timestamps may be recorded as a user reads a sentence. The data may then be saved to disk, e.g., a solid-state drive.

Inference

In one example of the system described herein, real-time inference may be performed. To perform real-time inference, radar measurements may be grouped into chunks of 1 second (e.g., a in matrix of 200 by 51, corresponding to time by frequencies). A rolling z-score may be used to normalize the data in a causal fashion, which allows for use in real-time inference of text or audio. When a new utterance begins, the first one second of data may be fed into a model to predict a probability of a sequence of phonemes, and this probability of a sequence of phonemes may then be fed into a beam search. The beam search may use a lexicon file that defines a sequence of phonemes that make up each word in a vocabulary. The most likely sequence of words may then be returned/displayed. Once two seconds of data are available, the data will be again fed into the model, and the prediction of phonemes and beam search run again. The most likely sequence of words may then again be displayed, replacing the previously decoded text. This loop may then be continued until the utterance is finished (after approximately 5 seconds). The final text prediction may then be displayed based on all available recorded data during the utterance. At the end of the utterance, the data cache may be reset, and the system may wait until the next utterance, when the process is then repeated.

Training

In one example of the system described herein, metadata about each recording session may be stored, including information about the user, the frequency range of the recording session, and the number of points in the recording session. For each utterance, a start and stop time, prompted text, audio data, and radar data may be recorded. For each session, a session-specific layer may be used to map all data into the same number of dimensions (e.g., one session may have 201 points while another has 51 points, and these may be mapped into the same number of points). The model may then be trained to predict the correct sequence of words from the radar data.

Silent Speech Command and Dictation

In one example of a method of using a system for silent speech as described herein, a user Alice may be using an SSI while cycling. Alice may get a text message from her friend Bob. The notification may appear as a pop-up on her phone and/or an audio notification from a bone conduction microphone. The bone conduction microphone may be part of an SSI worn by Alice. Rather than stopping her ride to check Alice may voice a command such as "playback text." The audio signal may be hopelessly noisy due to wind. The radar data streaming from her SSI device may be free of audio contamination.

Alice's utterance intention may be noticed by an activity detector, wherein the activity detector may then route the signals to a text decoder. A conversational assistant may then identify the recent message and transmit a text-to-speech audio transcript via the microphone. In some cases, the conversation assistant may comprise an LLM. The assistant may then query if Alice would like to respond. Alice may confirm with a vocal or silent yes, and then proceed to speak her reply. With "summarization mode" activated, the conversational assistant may clean up the noisy, radar-decoded transcript. The conversation assistant may fix grammatical errors and then rewrite the text in Alice's style. This style may be obtained via prompting the model, which is fine-tuned on Alice's past device usage.

Silent Phone Call

In some cases, any system for silent speech described herein may be configured to enable a privacy-preserving mode, wherein a user may make silent phone calls. In some cases, the system for silent speech may be configured to perform synthesize synthetic audio for a silent phone call. In an example use case, a user, Bob, may be studying in a library. Bob may receive a call from his friend Alice while in the library. Rather than stepping outside, Bob may accept the call using his hands or through a silent speech command. Bob's phone may recognize that he has an SSI (i.e., an SSI headphone setup). The SSI may begin to emit radio waves through one or more antennas of the SSI, wherein the SSI streams synthetic voicing generated directly from his silent mouth movements tracked by the radio waves. The SSI may generate the synthetic through the phone based on Bob's voice movements. In some cases, the SSI may play the voice back to Bob, (i.e., through the headphones) with minimal latency. In some cases, the latency may be less than 10 seconds. In some cases, the latency may be less than 10 seconds. In some cases, the latency may be less than 9 seconds. In some cases, the latency may be less than 8 seconds. In some cases, the latency may be less than 7 seconds. In some cases, the latency may be less than 6 seconds. In some cases, the latency may be less than 5 seconds. In some cases, the latency may be less than 4 seconds. In some cases, the latency may be less than 3 seconds. In some cases, the latency may be less than 2 seconds. In some cases, the latency may be less than 1 second. This may enable Bob to monitor his own speech for biofeedback purposes. The synthetic voice may also be transmitted to Alice as if Bob were talking.

In some cases, the synthetic generated voice may be constructed to sound like Bob's natural voice. In some cases, the synthetic generated voice may be constructed to sound different from Bob's natural voice.

In some cases, if Bob's voice playback is too loud, so he may turn down his voice playback using one or more controls. The controls may include a volume control on his phone, a volume control on his SSI headphone set up, a mouth-based gesture like slowly moving the tongue up or down to control volume, or the like.

In some embodiments Bob may turn on a "dynamic playback loudness" option configured to adjust the playback volume based on the ambient audio loudness. For example, since Bob is in a quiet library, the system may put his play-back volume low. Alice's voice may be set at the phone audio level.

In some cases, a system for silent speech may be configured to configured to transmit audio from one SSI to another via internet. In some cases, a system for silent speech, may be configured to transmit silent speech synthesized audio from one SSI to another via direct radio transmission. In some cases, the transmission of silent speech from one user to a second user may function as a form of functional telepathy. In some cases, a system for silent speech, may be configured to broadcast silent speech synthesized audio from one SSI to other nearby SSI using radio transmission.

In some cases, when multiple SSI conversations are taking place within the same area, loudness of the conversation may be proximity-based. For example, the users in one SSI conversation may not be able to hear another SSI conversation in the same area, as sound loudness will drop off between the two conversations.

In some cases, a system for silent speech, may be configured to broadcast silent speech synthesized audio from one SSI to many nearby SSIs using a mesh network.

In some cases, a method for silent speech may comprise vocal tract authentication, wherein a user is authenticated by detecting if the current user is the authorized user. In some cases, authentication comprising comparing radio or radar data like amplitude, phase, distance/range, angle, polarization, or spectral in-formation to a stored authentication dataset of the authorized user. In some cases, the authentication method comprises using a machine learning classifier to compare data. In some cases, a system for silent speech may comprise a Speak to Unlock function, wherein silently speaking or audibly speaking a particular word, phrase, password or passphrase may unlock the SSI. In some cases, a system for silent speech may comprise a Speak to Authorize function, wherein silently speaking or audibly speaking a particular word, phrase, password or passphrase in order may authorize an action. In some cases, the action may include but is not limited to a purchase, download, or settings change.

In some cases, a system for silent speech may be configured for proximity sensing to determine if the SSI is currently being worn to save battery when not in use.

In some cases, a silent speech system may present to a computer as if it were an external device such as a mouse, trackpad, keyboard, microphone, or headphones. This connection could be made as one or more USB devices, one or more Bluetooth devices, or one or more wireless connections. For example, radar signals from a radar-based silent speech system may be converted into key presses, clicks, selections, audio, etc. This allows for a silent speech system to interact with computing devices like desktop computers, laptops, mobile phones, tablets, virtual reality (VR) headsets, augmented reality (AR) headsets, and wearable computers by emulating the behavior of devices like the mouse, keyboard, microphone, or headphones that are widely supported. In some cases, this eliminates the need to install custom software to support interacting with a computing device using an SSI. This system may provide hands-free control of an electronic device. In some cases, control of external devices may be performed using silent or audible speech. In some cases, a user may be able to open a text box and type using silent speech. In some cases, data may be logged locally on a device and then uploaded later when the device has WiFi access.

In some cases, a SSI system may be used to interact with a computer system, smartphone, or other electronic device. For example, an SSI system may be coupled to a sound or keyboard device. An SSI system could also be used as a dispatcher for apps on a device based on user intent, e.g., a user may use an SSI command to open a desired app. An SSI could also be used for macros/shortcuts on an electronic device. An SSI could be used for keywords or macro-based dispatch. For example, a macro might open an application like a music player on a computer and start playing a Liked Songs playlist when a user says "Play my liked songs," or types a user's email address when a user says "paste work email." In some cases, an SSI may be used to query device status, e.g., to check battery life or connectivity. In some cases, an SSI may be used to compose a message silently to send on the device. In some cases, an SSI may be used to interrogate user status.

In some cases, silent speech may be detected while a user is inhaling. Unlike with vocalized speech where a user must be exhaling in order to speak, with silent speech an SSI system may decode speech even while a user is inhaling. This allows for continuous speech without pauses while a user continues to breathe.

In some cases, lip movement may be predicted or tracked with an SSI device. Predicted lip movement could then be visualized in a virtual reality (VR) or augmented reality (AR) application. This allows for a digital avatar of user to display realistic lip movements during video calls or metaverse interactions.

In some cases, an SSI system may decode or synthesize a voice without needing perceptible lip movement.

In some cases, a user may be able to find their SSI device using a phone or other electronic device based on radar signatures emitted by the SSI device. The electronic device may provide instantaneous feedback to the user to help them find the device, such as "warmer/colder" or a visualization of the location of the device.

In some cases, a silent speech system may be used to create a graphical representation of a user's silent speech throughout a specified period of time, such as a day. A user may speak to the system, and a machine learning model may associate speech utterances with one another based on semantic similarities or metadata such as location or time of day. This may allow location or context-based representation of a user's thoughts.

In some cases, a silent speech system may be used for detection or analysis of mood or emotion. For example, a silent speech system may be used for detection of grimacing, frowning, laughter, speech rate, word choice, or more. Mood or emotion data may be integrated with a "thought bank" or mood journal that may use analytics to associate emotions with user behaviors. The system could then provide digestible insights about a user's mood or emotions. A silent speech system may detect head nodding or shaking. Emotion or head movement information may be used to provide user feedback to a digital assistant, e.g., a digital assistant may alter or change its output based on emotion or head movement information.

In some cases, a silent speech system may detect tongue movement. In some cases, the silent speech system may use radar to detect tongue movement. Tongue movement may be used, for example, for visual GUI scrolling on a screen. Headphones in a silent speech system may be used to provide haptic or audio feedback to the user regarding tongue gesture control. In some cases, a silent speech system may decode tongue movement during silent speech when the lips are not perceptively moving. This may be useful for discreet communication.

In some cases, a silent speech system may be used for singing or music performance, wherein a user controls pitch of the synthesized singing or music. For example, the user can use their voicing intention to control a trumpet synthesizer. In some cases, the output of the silent speech system may be encoded using a Musical Instrument Digital Interface (MIDI).

In some cases, a silent speech system may be water or moisture-resistant, allowing for use in, e.g., a shower.

In some cases, a user may train an AI or robotic device to perform an action using a silent speech command or phrase. For example, a user may silently say "learn to turn off kitchen lights" and then instruct the AI or robotic device how to open an application for smart lights and turn off the kitchen smart lights. Subsequently, the AI or robotic device may be trained to perform this command, so a user may say this command or phrase and the action may take place.

In some cases, an SSI system may store knowledge locally, e.g., by using cached queries, such that information like the current date, weather, calendar events, contacts list, etc. are available to improve text decoding, speech synthesis or conversational AI responses.

In some cases, a silent speech system may monitor user health or sickness progression by analyzing congestion and/or tissue inflammation of the sinuses. Fluid accumulation or structural changes in sinus cavities may be monitored, as measured by changes in the propagation of an EM wave through the sinuses from antennas in a wearable form factor.

Communication

In some cases, a system for silent speech may be used to communicate with nearby individuals. This may be accomplished using speech synthesis and/or audio generation.

In some cases, a system for silent speech may be used to communicate with individuals remotely. This may be accomplished using text decoding, text generation, speech synthesis, and/or audio generation. For example, a user may be able to send a text message, email, chat message, or social media post. A user may be able to send a voice message. A user may be able to participate in a silent phone call. A user may be able to participate in a silent video call. A user may be able to participate in a silent walkie-talkie system, i.e. a system wherein a user can send or receive live voice messages continuously.

In some cases, a system for silent speech may be used to communicate with computers or conversational AI agents. This may be accomplished using text decoding. For example, a system for silent speech may play back audio from an LLM or conversational AI response. A system for silent speech may display text from an LLM or conversational AI response, e.g., using augmented reality glasses. A system for silent speech may be used to issue commands or guidance to shape the work of an AI agent working on the user's behalf. For example, an SSI system may be used to issue commands to an AI or robotic agent to, e.g., buy a plane ticket, order food, perform manual/robotic labor, conduct research, or perform work.

In some cases, a system for silent speech may be used with a nearby device comprising a screen. This may be accomplished using text decoding and/or text generation. For example, silent speech may be used for text entry and/or input as an alternative to on-screen keyboards, virtual keyboards, or typing on a physical keyboard. In some cases, a system for silent speech may be used to generate text/keyboard input based on silent speech input. For example, the system may use the context of the text on the screen, previous data, and/or retrieval augmented generation linking the LLM output to authoritative sources along with an instruction or prompt from the silent speech system to generate text/keyboard input.

Gaze Tracking Integration

In some cases, a system for silent speech may use gaze tracking or orientation tracking combined with silent speech detection to decode a silent message from a user to another user. This may be achieved using a radio beacon and a directional beam, a camera with visual tracking (e.g., infrared imaging or gaze tracking), and/or radar sensing for eye tracking. Radar sensing for eye tracking may use antennas mounted to capture eye movements.

In some cases, gaze tracking may be combined with silent speech detection to control one or more external devices. For example, a user may be able to look at a smart device or software application and give a silent command. This may be achieved using a radio beacon and a directional beam, a camera with visual tracking (e.g., infrared imaging or gaze tracking), and/or radar sensing for eye tracking. Radar sensing for eye tracking may use antennas mounted to capture eye movements. In some cases, control over a smart device may be achieved using a device API with voice integration (e.g., the system may feed a synthetic user voice to a smart home device, such as an Amazon Echo Dot or Google Nest). In some cases, control over a smart device may use a large language model trained to interact with a device API. For example, a user may send a command and device information to a large language model, and the large language model may then format the prompt appropriately to interact with the device.

In some cases, a silent speech detection system may be combined with gaze tracking to create an annotation system for objects viewed by the user. In some cases, a user may be able to add annotations with audible or silent speech for an object identified with gaze tracking. For example, a user may be looking at a television that was recently set up and can ask whether any installation steps were forgotten. The user may then receive a response from a digital assistant integrated with the silent speech detection system based on user-provided annotations (e.g., voice notes added during setup).

In some cases, silent speech detection may be used for a silent voice or phone call. In some cases, gaze tracking and silent speech detection may be combined to allow a silent video call.

In some cases, gaze tracking and silent speech detection may be combined to determine what silent speech a user can hear.

In an aspect, the present disclosure provides a method for enabling communications between a user and one or more recipients, the method comprising: (a) using one or more sensors to track at least one position or motion characteristic of the user thereby generating sensor data, wherein the at least one position or motion characteristic is associated with an eye or head of the user; (b) processing the sensor data to identify the one or more recipients with whom the user intends to communicate; and (c) processing data associated with non-audible speech of the user to generate one or more utterances, wherein the one or more utterances comprise audio or text intended by the user for the one or more recipients. This method may allow two users to communicate silently or non-audibly. This method may allow two users to communicate privately during a larger meeting or conference. A position or motion characteristic may be a position or motion of the head, face, or eyes detected by gaze tracking or other sensors. A motion characteristic may be obtained by measuring a position characteristic as a function of time.

In some embodiments, the method further comprises transmitting the one or more utterances to the one or more recipients, based at least in part on a gaze direction of the user towards the one or more recipients. In some embodiments, the one or more recipients comprise a first recipient and a second recipient, wherein the one or more utterances comprise a first utterance intended by the user for the first recipient and a second utterance intended by the user for the second recipient. In some embodiments, the method further comprises transmitting the first utterance to the first recipient without the second recipient having access to or information about the first utterance, or transmitting the second utterance to the second recipient without the first recipient having access to or information about the second utterance. In some embodiments, the method further comprises transmitting the first utterance to the first recipient and transmitting the second utterance to the second recipient, with the first recipient having access to or information about the second utterance, and the second recipient having access to or information about the first utterance. In some embodiments, the method further comprises transmitting the first utterance to the first recipient and transmitting the second utterance to the second recipient, with the first recipient having access to or information about the second utterance, and without the second recipient having access to or information about the first utterance. In some embodiments, the one or more recipients are in physical or visual proximity to the user permitting the one or more sensors to track the at least one position or motion characteristic of the user. In some embodiments, the method further comprises providing a graphical display comprising one or more graphical elements representative of the one or more recipients, wherein the gaze direction of the user is directed towards the one or more graphical elements representative of the one or more recipients.

In some embodiments, the one or more utterances by the user comprise at least 5 words. In some embodiments, the one or more utterances by the user comprise at least 10 words. In some embodiments, the one or more utterances by the user comprise at least 20 words. In some embodiments, the one or more utterances by the user comprise at least 50 words. In some embodiments, the one or more utterances by the user comprise at least 100 words. In some embodiments, the one or more utterances by the user comprise at least 500 words.

In some embodiments, the method further comprises transmitting the one or more utterances comprising the audio or the text to the one or more recipients with a time delay of no more than 1 second. In some embodiments, the method further comprises transmitting the one or more utterances comprising the audio or the text to the one or more recipients with a time delay of no more than 2 seconds. In some embodiments, the method further comprises transmitting the one or more utterances comprising the audio or the text to the one or more recipients with a time delay of no more than 3 seconds. In some embodiments, the method further comprises transmitting the one or more utterances comprising the audio or the text to the one or more recipients with a time delay of no more than 4 seconds. In some embodiments, the method further comprises transmitting the one or more utterances comprising the audio or the text to the one or more recipients with a time delay of no more than 5 seconds. In some embodiments, the method further comprises transmitting the one or more utterances comprising the audio or the text to the one or more recipients with a time delay of no more than 10 seconds. In some embodiments, the method further comprises transmitting the one or more utterances comprising the audio or the text to the one or more recipients with a time delay of no more than 20 seconds. In some embodiments, the method further comprises transmitting the one or more utterances comprising the audio or the text to the one or more recipients with a time delay of no more than 30 seconds.

In some embodiments, the method further comprises generating the one or more utterances comprising the audio or the text in one or more languages based at least in part on a preferred language of each recipient of the one or more recipients. In some embodiments, the method further comprises generating the one or more utterances comprising the audio or the text in one or more communication styles or formats, based at least in part on a preferred communication style or format of each recipient of the one or more recipients. In some embodiments, the method further comprises using a display or a speaker to communicate the text or the audio to the one or more recipients. In some embodiments, the one or more sensors comprises at least one of a radio beacon, a camera, or a radar sensor. In some embodiments, the non-audible speech comprises silent speech. In some embodiments, the non-audible speech comprises non-audible murmur. In some embodiments, the method further comprises, prior to processing data associated with non-audible speech of the user, using a radio frequency (RF) sensing device coupled to a head of the user to collect the data associated with the non-audible speech of the user.

Performance of Different Frequency Bands and Sampling Rates

Figure 23:
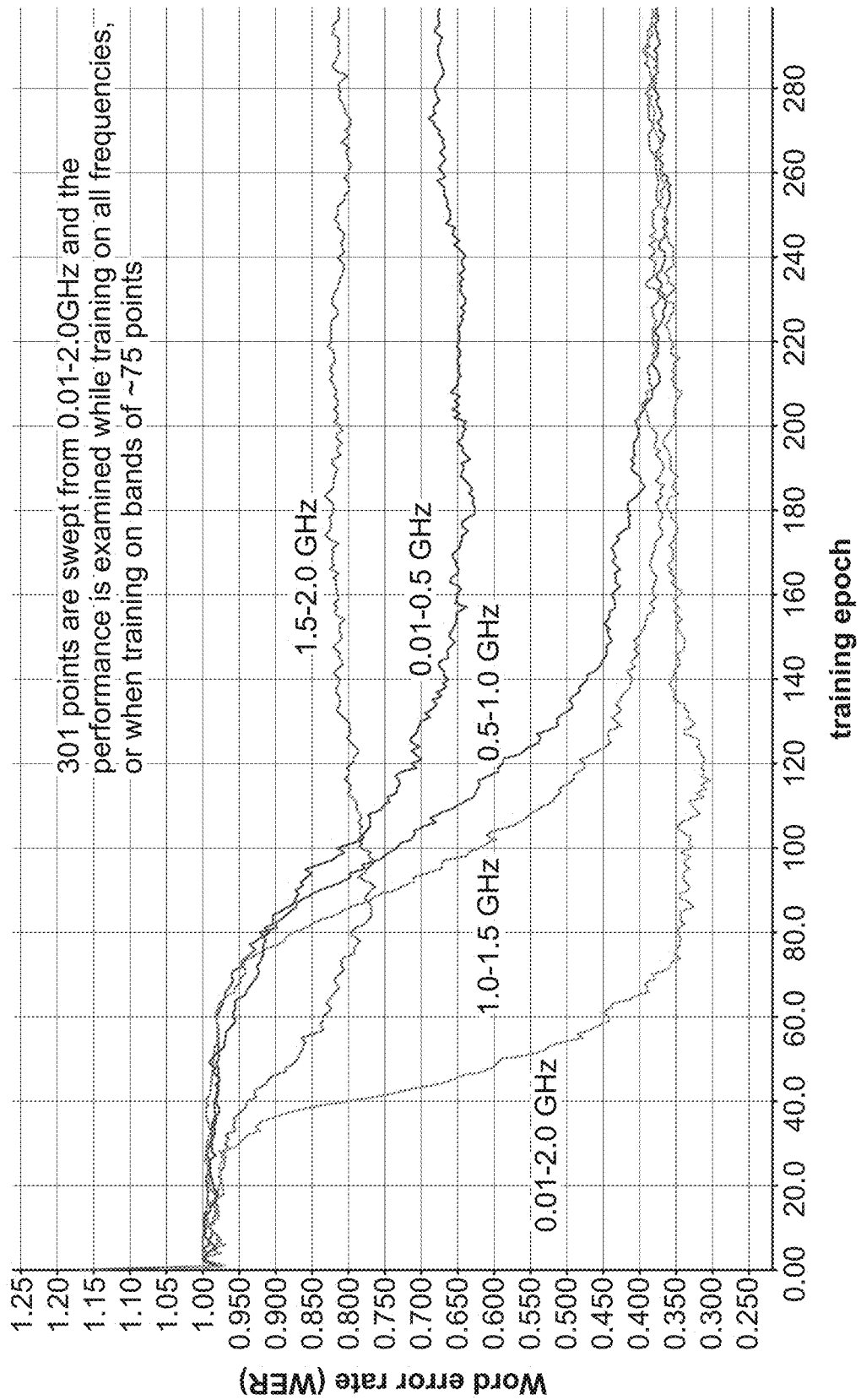
FIG. 23 is a graph showing the performance of different frequency bands in accordance with some embodiments.

FIG. 23 shows a graph displaying the performance of different frequency bands in accordance with some embodiments. It was found that 500 MHz-1 GHz was a useful frequency band for some embodiments described herein. The antenna used in some embodiments was 4 cm in length. The wavelength of 500 MHz is 60 cm. RF antennas are frequently no smaller than 14 of the wavelength of the frequency used, so this finding was unexpected. A partial explanation may be that the wavelength of 500 MHz in the skin is approximately $60 \text{ cm}/\sqrt{25*\text{relativepermativity}} = 12$ cm, so 14 of the wavelength would be only 3 cm.

Figure 24:
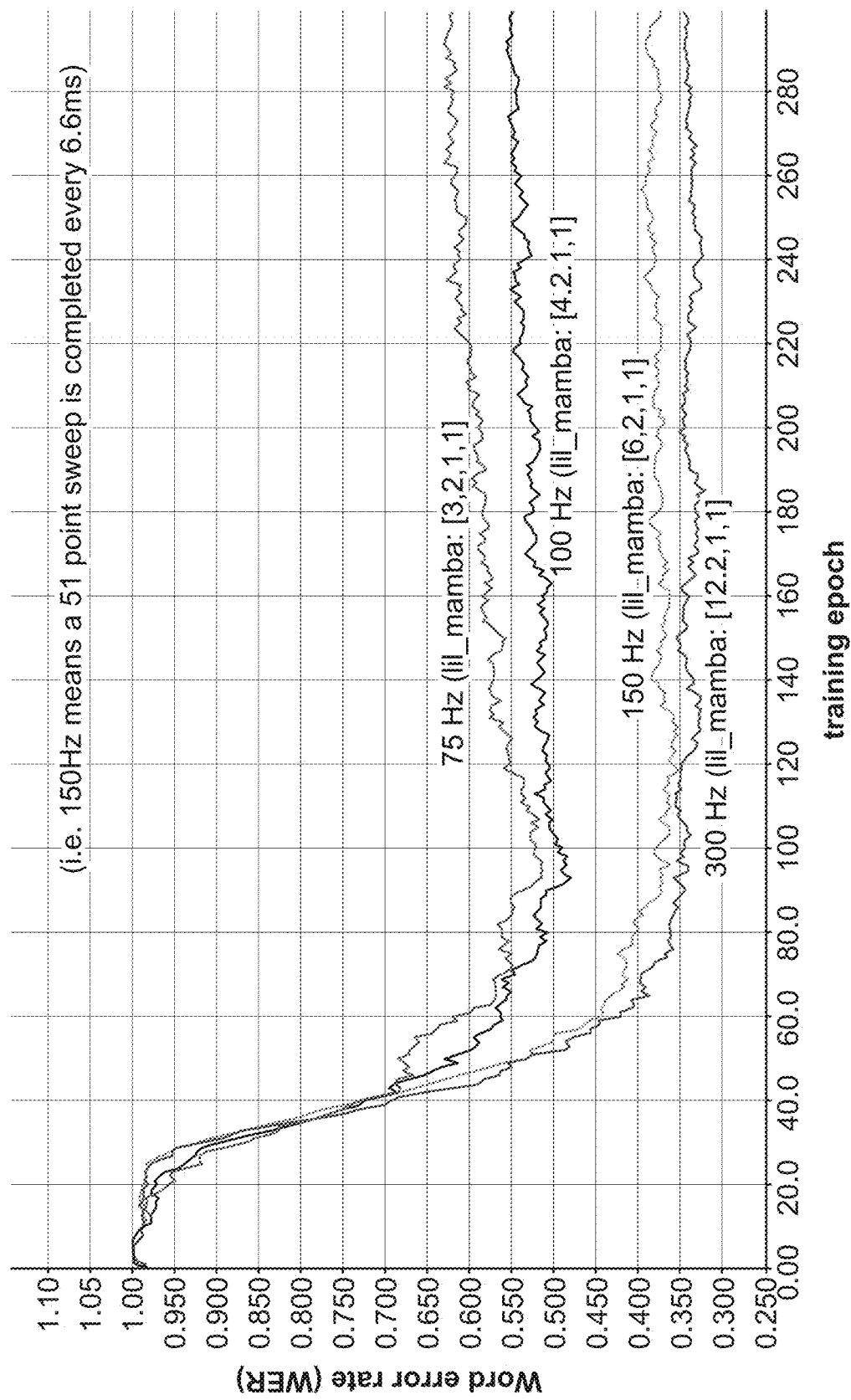
FIG. 24 is a graph showing the performance of different sampling rates in accordance with some embodiments.

FIG. 24 shows a graph illustrating the performance of different sampling rates in accordance with some embodiments. It was found that a sweep rate of greater than or equal to 100 Hz was advantageous for some embodiments of the present disclosure. This was unexpected, as previous work with radar-based sensing for silent speech only sampled up to sweeps of 100 Hz. Substantial improvements were seen when sweeping faster than this. This was surprising because phonemes typically last around 75-200 ms, with the shortest durations, like stops, having a duration of about 20 ms to about 50 ms. The Nyquist theorem would suggest that a 100 Hz sampling rate is sufficient, but it was discovered that faster than that is useful.

System Setup and Capabilities 1 mW of power was used. Over 100 words per minute were able to be decoded. A vocabulary size of over 4,000 words was detected. A word error rate of under 40% was observed. Under 2 second latency was observed.

Figure 25:
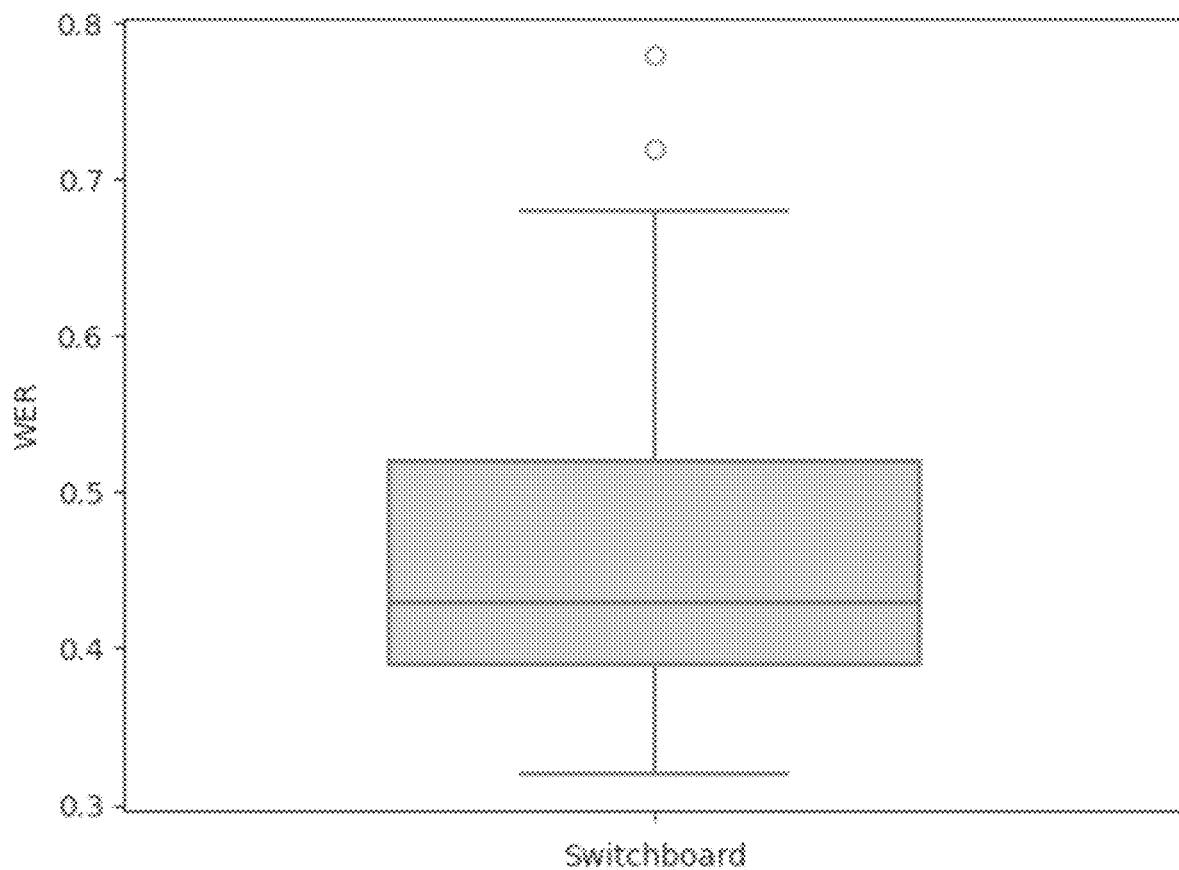
FIG. 25 shows a graph of the distribution of model error test rates.

FIG. 25 shows a distribution of model test error rates. It shows model performance across different blocks of held-out sentences from the Switchboard corpus. Error is evaluated here using word error rate (WER).

FIG. 26 shows example sentences and phrases decoded by a system as described in some embodiments herein. Ground-truth utterances ("True:") are shown alongside model predictions ("Predicted:").

Unique Aspects of Device

In some cases, the antenna is placed on/near the ear and radio waves are transmitted through the head. This placement may generally not be expected to work.

Frequency modulated continuous wave radar may be used, rather than only a specific wavelength.

Miniaturization of the RF processing electronics may be used, which supports frequency modulation while fitting inside of headphones.

Measures may be taken to reduce around-the-head transmission (direct coupling to head/skin, directional antennas, shielding, etc), which is important for resilience in decoding across different environments (eg people walking by, size of room, other objects in room, etc)

Software and machine learning systems that enable real-time decoding with capacity for general English/general language, not just "natural language commands", were developed.

Silent speech may be decoded in absence of lip movements, relying solely on tongue, vocal folds, soft palate, jaw, and other speech articulators that do not include the lips.

Applications like Look to Type, Look to Speak, and automatic language translation may be used with some embodiments herein.

Computer Systems

Figure 10:
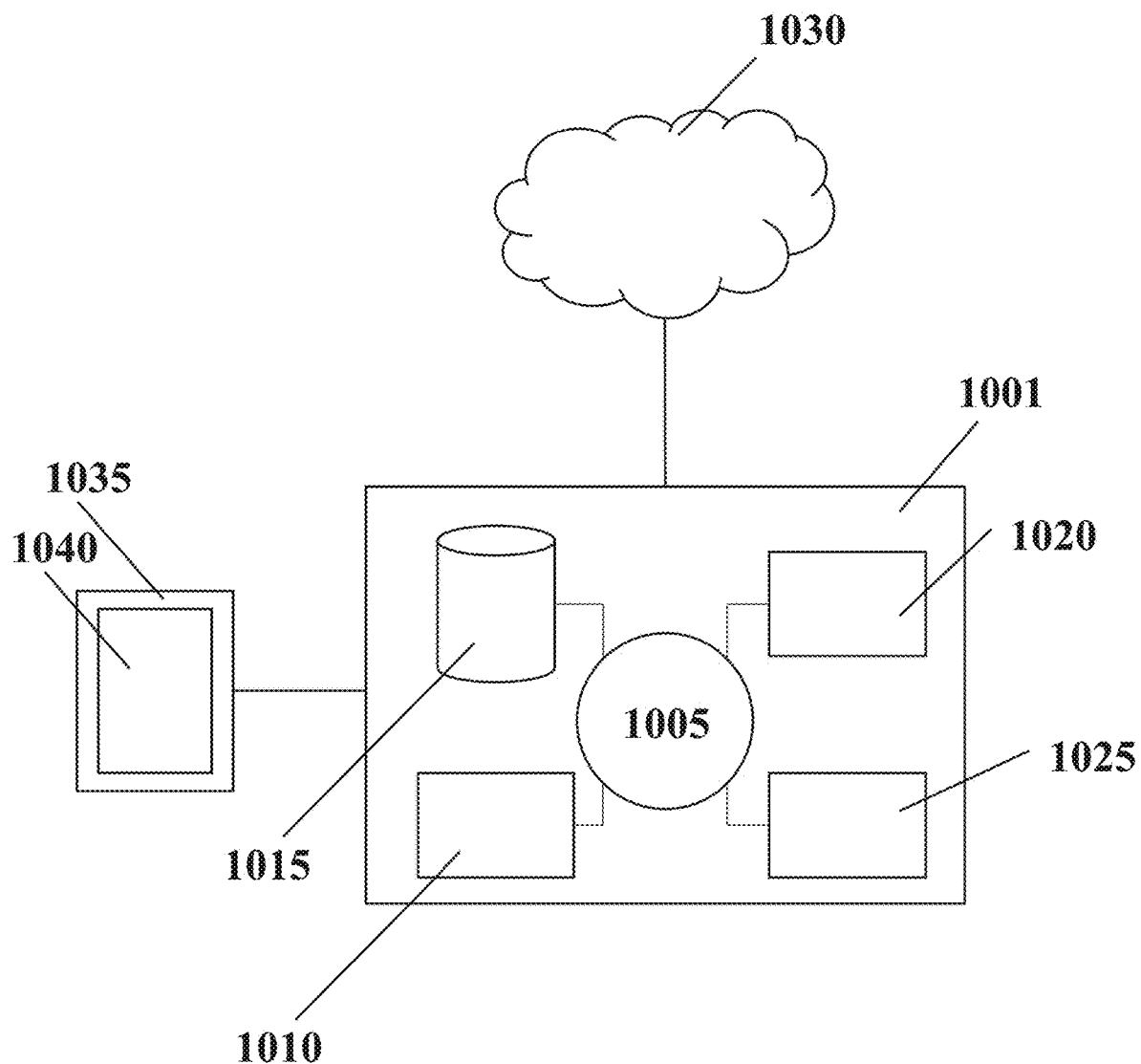
FIG. 10 shows a computer system that is programmed or otherwise configured to implement methods provided herein.

The present disclosure provides computer systems that are programmed to implement methods of the disclosure. FIG. 10 shows a computer system 1001 that is programmed or otherwise configured to implement methods and/or control systems of the present disclosure. The computer system 1001 can regulate various aspects of a system for silent speech of the present disclosure. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine-readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005.

While preferred embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the invention. It is therefore contemplated that the present disclosure shall also cover any such alternatives, modifications, variations, or equivalents. It is intended that the following claims define the scope of the present disclosure and that methods and structures within the scope of these claims and their equivalents be covered thereby.

What is claimed is:

1. A method for detecting and outputting speech of a user, wherein the speech comprises continuous non-audible speech, the method comprising:
   (a) providing a radio frequency (RF) sensing device comprising a first portion having one or more antennas for transmitting a plurality of RF signals and a second portion having one or more antennas for receiving RF signal data, wherein the RF sensing device is worn externally on a head or a neck of the user;
   (b) using the RF sensing device to collect the RF signal data, wherein the RF signal data comprises one or more RF signals of the plurality of RF signals subjected to modulation or modification via interaction with one or more speech articulators of the user;
   (c) processing the RF signal data collected in (b) to determine the non-audible speech of the user by at least in part analyzing the modulation or modification of the one or more RF signals caused by movement of the one or more speech articulators; and
   (d) outputting or facilitating an output comprising conversion of the non-audible speech of the user determined in (c), wherein conversion comprises decoding the non-audible speech of the user into at least one of audible speech or a text transcription,
   wherein the plurality of RF signals is transmitted according to one or more radiation patterns, wherein the one or more radiation patterns comprises electromagnetic propagation paths or spatial distributions of electromagnetic field intensity that vary in response to the interaction with the one or more speech articulators of the user,
   wherein the one or more antennas for transmitting the plurality of RF signals scan at least one speech articulator of the one or more speech articulators via the one or more radiation patterns, and
   wherein the RF signal data is received by the one or more antennas for receiving the RF signal data at the second portion of the RF sensing device after the plurality of RF signals is transmitted from the first portion of the RF sensing device through the one or more speech articulators, wherein the one or more speech articulators comprise at least one speech articulator within a vocal cavity of the user.

2. The method of claim 1, wherein the conversion of the non-audible speech has a word error rate of less than about 50%.

3. The method of claim 1, wherein the one or more radiation patterns comprises one or more frequency-dependent radiation patterns.

4. The method of claim 1, wherein the modulation or modification of the one or more RF signals is proportional to an overlap between the one or more speech articulators and the one or more radiation patterns.

5. The method of claim 1, further comprising using the one or more antennas for transmitting the plurality of RF signals to target the one or more speech articulators by individually scanning each speech articulator of the one or more speech articulators across a range of frequencies to effect a change in the one or more radiation patterns.

6. The method of claim 5, wherein the change in the one or more radiation patterns results in one or more overlaps between the one or more speech articulators and the one or more radiation patterns.

7. The method of claim 1, further comprising using the one or more antennas for transmitting the plurality of RF signals to dynamically shape the one or more radiation patterns.

8. The method of claim 1, further comprising using the one or more antennas for receiving RF signal data to dynamically shape at least one of an RF reception or an RF sensitivity pattern of the RF signal data.

9. The method of claim 1, wherein the first portion having the one or more antennas for transmitting the plurality of RF signals and the second portion having the one or more antennas for receiving RF signal data comprise at least two directional antennas pointed at or towards each other.

10. The method of claim 1, wherein the first portion having the one or more antennas for transmitting the plurality of RF signals and the second portion having the one or more antennas for receiving RF signal data comprise a plurality of antennas positioned on at least two different parts of the head or the neck of the user.

11. The method of claim 1, wherein the first portion and the second portion of the RF sensing device are located and worn on opposite sides of the head of the user.

12. The method of claim 1, wherein the RF sensing device has a headphone form factor.

13. The method of claim 1, wherein the RF sensing device is worn externally on the head or the neck of the user absent of contact with a mouth, lip, chin, jaw or cheek of the user.

14. The method of claim 1, wherein the RF sensing device is worn externally on the head or the neck of the user by being supported on the ears of the user.

15. The method of claim 9, further comprising using the at least two directional antennas to maximize transmission of the one or more RF signals of the plurality of RF signals through the one or more speech articulators.

16. The method of claim 15, wherein the transmission of the one or more RF signals is maximized based at least in part on a relative positioning between the at least two directional antennas.

17. The method of claim 1, wherein the non-audible speech of the user comprises a vocabulary of at least 50 words.

18. The method of claim 1, wherein the non-audible speech of the user has no substantial temporal or semantic breaks between word articulations.

19. The method of claim 1, wherein (c) and (d) are performed substantially in real-time.

20. The method of claim 19, wherein the conversion of the non-audible speech has a word delay of no more than about 10 words.

21. The method of claim 19, wherein the conversion of the non-audible speech has a time delay of no more than about 5 seconds.

22. The method of claim 1, wherein the conversion in (d) comprises processing one or more chunks of the non-audible speech, wherein each chunk of the one or more chunks has a defined length of time.

23. The method of claim 22, wherein each chunk of the one or more chunks comprises a corresponding data sample from the RF signal data.

24. The method of claim 1, wherein the non-audible speech comprises non-audible murmur.

25. The method of claim 1, wherein (b) comprises using the RF sensing device to form and shape the one or more RF signals of the plurality of RF signals to target the one or more speech articulators, which one or more speech articulators include a lip, tongue, jaw, larynx or vocal tract of the user.

26. The method of claim 1, wherein the RF sensing device is in contact with the head or the neck of the user absent an air gap therebetween.

27. The method of claim 1, wherein the conversion in (d) is generated using at least in part a large language model (LLM).

28. The method of claim 1, further comprising providing the conversion as an input to an artificial intelligence (AI) assistant to perform a task for the user.

* * * * *